(12) United States Patent
Suzuki et al.

(10) Patent No.: US 8,120,726 B2
(45) Date of Patent: Feb. 21, 2012

(54) SURFACE LIGHT SOURCE DEVICE AND DISPLAY

(75) Inventors: Hiromasa Suzuki, Tokyo (JP); Motosuke Ohmi, Tokyo (JP); Kanji Yokomizo, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/000,895

(22) PCT Filed: Jun. 17, 2009

(86) PCT No.: PCT/JP2009/060995
§ 371 (c)(1),
(2), (4) Date: Dec. 22, 2010

(87) PCT Pub. No.: WO2009/157352
PCT Pub. Date: Dec. 30, 2009

(65) Prior Publication Data
US 2011/0109533 A1 May 12, 2011

(30) Foreign Application Priority Data

Jun. 23, 2008 (JP) ................. P2008-163165

(51) Int. Cl.
*G02F 1/1335* (2006.01)
(52) U.S. Cl. ............... 349/61; 349/56; 349/62; 349/65; 349/67; 349/84; 362/600; 362/606
(58) Field of Classification Search .............. 349/56, 349/61, 62, 65, 67, 84, 104, 113; 362/600, 362/606
See application file for complete search history.

(56) References Cited

U.S. PATENT DOCUMENTS 5,550,676 A 8/1996 Ohe et al.
(Continued)

FOREIGN PATENT DOCUMENTS

JP 2710465 10/1997
(Continued)

OTHER PUBLICATIONS

International Search Report dated Jul. 8, 2009, for corresponding Patent Application No. PCT/JP2009/060995.

*Primary Examiner* — Jennifer Doan
(74) *Attorney, Agent, or Firm* — K&L Gates LLP

(57) ABSTRACT

There is provided a surface light source device having a configuration where light sources are arranged on both of a pair of side surfaces of a light guide plate and allowed to independently form nonuniform light emission intensity distributions in which light emission intensity is lower and higher at places closer to and farther from each of the light sources. Light guide control sections controlling guiding of light from light sources are arranged on a reflection surface of a light guide plate. The light guide control section is configured of concave sections, and the concave sections include inclined surfaces facing the light source and inclined surfaces facing the light source, respectively, and the heights of the concave sections increase with increasing distance from the light source. A nonuniform light emission intensity distribution in which light emission intensity is lower and higher at places closer to and farther from the light source is formed by lighting of the light source. As the inclined angles of the inclined surfaces are larger than the inclined angles of the inclined surfaces, an influence of the light guide control section on light from the light source is reduced.

20 Claims, 38 Drawing Sheets

U.S. PATENT DOCUMENTS

| | | |
|---|---|---|
| 6,467,923 B1 | 10/2002 | Umemoto |
| 7,465,084 B2 | 12/2008 | Kawashima et al. |
| 7,490,971 B2 * | 2/2009 | Iwasaki .................. 362/628 |
| 7,575,358 B2 * | 8/2009 | Suzuki et al. ............ 362/613 |
| 2006/0109686 A1 * | 5/2006 | Sugiura .................. 362/620 |
| 2008/0151578 A1 | 6/2008 | Hiraishi et al. |

FOREIGN PATENT DOCUMENTS

| | | |
|---|---|---|
| JP | 2001-147329 | 5/2001 |
| JP | 2003-077322 | 3/2003 |
| JP | 2006-190622 | 3/2003 |
| JP | 2005-135843 | 5/2005 |
| JP | 2006-202639 | 8/2006 |
| JP | 2007-123130 | 5/2007 |
| JP | 2007-227405 | 9/2007 |
| JP | 2007-293339 | 11/2007 |
| JP | 2008-066014 | 3/2008 |

* cited by examiner (B)　　　　　　　　(A)　　　　　　　　(C)

SURFACE LIGHT SOURCE DEVICE AND DISPLAY

CROSS REFERENCE TO RELATED APPLICATIONS

The present application is a National Stage of International Application No. PCT/JP2009/060995 filed on Jun. 17, 2009 and which claims priority to Japanese Patent Application No. 2008-163165 filed on Jun. 23, 2008, the entire contents of which are being incorporated herein by reference.

BACKGROUND

The present disclosure relates to a surface light source device performing surface light emission with use of a light guide plate, and a display including such a surface light source device.

In recent years, so-called partial driving (or local diming) in which the in-plane intensity distribution of a backlight applied to a liquid crystal display or the like is partially changed is performed (for example, refer to PTL 1). In such partial driving, in the case where a region with high light emission intensity and a region with low light emission intensity are adjacent to each other, a boundary therebetween may look unnatural. For example, in the case where a plurality of light guide plates are aligned to design one surface light source device, and partially driving is performed with use of one light guide plate as one partial drive lighting region, the intensity at the juncture of the light guide plates changes abruptly, so that the boundary therebetween looks unnatural.

CITATION LIST

[PTL 1] Japanese Unexamined Patent Application Publication No. 2007-293339
[PTL 2] Japanese Unexamined Patent Application Publication No. 2005-135843
[PTL 3] Japanese Unexamined Patent Application Publication No. 2006-202639
[PTL 4] Japanese Patent No. 2710465

SUMMARY

As one technique for solving this issue, it is considered that a light source is arranged on each of a pair of side surfaces of each light guide plate, and each light source is designed to have one of the following nonuniform light emission intensity distributions (1) and (2). In any of the cases, nonuniform light emission intensity distributions of the light sources are formed independently by light emission from the light sources, and these nonuniform light emission intensity distributions are superimposed on each other to form an arbitrary light emission intensity distribution as a whole emission surface. Thus, the boundary between the light guide plates is allowed to look natural.

(1) Light emission intensity is higher and lower at places closer to and farther from a light source, respectively.

(2) Light emission intensity is lower and higher at places closer to and farther from a light source, respectively.

On the other hand, as a method of emitting light from an emission surface of a light guide plate, for example, the following techniques (A) to (C) are applicable. For example, there is proposed a technique in which a plurality of prisms are arranged along a light guide direction at one and the same height and equal intervals on a reflection surface of the light guide plate so as to uniformly emit light from the positions of the light guide plates (for example, refer to PTLs 2 to 4).

(A) Engraving, dot processing, prism processing or the like is performed on a reflection surface or an emission surface of a light guide plate.

(B) A material with light-scattering properties or light diffusion properties is used as a material of a light guide plate.

(C) The thickness of a light guide plate changes along a light guide direction.

Now, in the case of the above-described distributions (1) and (2), a configuration for achieving an arbitrary light emission intensity distribution with all light guide plates by superimposing nonuniform light emission intensity distributions on one another will be considered below. First, in the case of the above-described light emission intensity distribution (1), the light guide plate is designed so that light is emitted sequentially from a side closer to a light source and the total light amount reaching to a certain point decreases with increasing distance from the light source. Therefore, the configurations of the light guide plates for one light source and the other light source may be designed independently by the above-described techniques (A) to (C) so as to emit a larger amount of light from a position closer to the light source, and the light guide plates may be combined to form the configuration. At this time, in the configuration of the light guide plate for the one light source, the amount of emission light decreases with increasing distance from the one light source, that is, with decreasing distance from the other light source; therefore, the configuration of the light guide plate for the one light source have little effect on the configuration of the light guide plate for the other light source. Therefore, it is easily achievable to independently form the above-described nonuniform light emission intensity distributions (1) and superimpose them on one another.

On the other hand, in the case of the above-described distribution (2), it is necessary to emit a minimum amount of light on a side closest to each light source and to emit a larger amount of light with increasing distance from each light source. However, when the configurations of the light guide plate for the light sources are independently designed and are combined in the same manner as in the case of the above-described distribution (1), a configuration for emitting light on a side far from one light source may cause light emission on a side close to the other light source. Therefore, it is extremely difficult to independently form the above-described nonuniform light emission intensity distributions (2) and superimpose them on one another.

However, in the above-described distribution (2), compared to the above-described distribution (1), nonuniform light emission at the junctures of the light guide plates or nonuniform light emission near a light source (so-called uneven fluorescence) is allowed to be effectively reduced; therefore, the junctures are allowed to look more natural. Therefore, it is desirable to achieve a surface light source device allowed to independently form nonuniform light emission intensity distributions in which light emission intensity is lower and higher at places closer to and farther from a light source, respectively.

The present embodiments provide a surface light source device and a display having a configuration where light sources are arranged on both of a pair of side surfaces of a light guide plate and allowed to independently form nonuniform light emission intensity distributions in which light emission intensity is lower and higher at places closer to and farther from each of the light sources.

In an embodiment, a first surface light source device includes: a light guide plate including a light emission surface, a reflection surface and a pair of facing side surfaces; a first light source and a second light source arranged on the pair of side surfaces of the light guide plate; a plurality of first inclined surfaces arranged on one or both of the light emission surface and the reflection surface of the light guide plate and facing the first light source; and a plurality of second inclined surfaces arranged on one or both of the light emission surface and the reflection surface of the light guide plate and facing the second light source. Herein, the heights of the first inclined surfaces gradually increase with increasing distance from the first light source, and the heights of the second inclined surfaces gradually increase with increasing distance from the second light source.

Note that "facing the first light source" means being directed toward the first light source in the light guide plate. Likewise, "facing the second light source" means being directed toward the second light source in the light guide plate.

In an embodiment, a first display includes; the above-described first surface light source device performing surface light emission; and a display section displaying an image by modulating light from the first surface light source device based on an image signal.

In the first surface light source device and the first display embodiment, as the first inclined surface facing the first light source and the second inclined surface facing the second light source are arranged on one or both of the light emission surface and the reflection surface of the light guide plate, light from the first light source and light from the second light source are reflected from the first inclined surface and the second inclined surface, respectively. At this time, as the heights of the first inclined surfaces increase with increasing distance from the first light source, a larger amount of light from the first light source is emitted from the light emission surface at a place farther from the first light source. Likewise, as the heights of the second inclined surfaces increase with increasing distance from the second light source, a larger amount of light from the second light source is emitted from the light emission surface at a place farther from the second light source.

For example, the above-described light guide plate includes a plurality of concave sections or convex sections (a first light guide control section) each having the first inclined surface and a plurality of concave sections or convex sections (a second light guide control section) each having the second inclined surface. At this time, in the first light guide control section, each concave section or each convex section includes the first inclined surface and a third inclined surface, and the third inclined surface faces the second light source, and the inclined angle of the third inclined surface is smaller than that of the first inclined surface; therefore, the first light guide control section exerts less influence upon light from the second light source. Likewise, in the second light guide control section, each concave section or each convex section includes the second inclined surface and a fourth inclined surface, and the fourth inclined surface faces the first light source, and the inclined angle of the fourth inclined surface is smaller than that of the second inclined surface; therefore, the second light guide control section exerts less influence upon light from the first light source.

Alternatively, it is desirable that the light guide plate has a configuration in which in addition to the above-described changes in height in the first and second inclined surfaces, height differences between the first inclined surface and the light emission surface (or the reflection surface) are changed between the pair of side surfaces, and height differences between the second inclined surface and the light emission surface (or the reflection surface) are changed between the pair of side surfaces. Accordingly, in the light emission surface (or the reflection surface), a surface shape is allowed to be formed without using an inclined surface other than the first and second inclined surfaces.

A second surface light source device embodiment includes: a light guide plate including a light emission surface, a reflection surface and a pair of facing side surfaces; a first light source and a second light source arranged on the pair of side surfaces of the light guide plate; a plurality of first inclined surfaces arranged on one or both of the light emission surface and the reflection surface and facing the first light source; and a plurality of second inclined surfaces arranged on one or both of the light emission surface and the reflection surface and facing the second light source. Herein, the first inclined surfaces are arranged more closely with increasing distance from the first light source, and the second inclined surface are arranged more closely with increasing distance from the second light source.

In a second embodiment, a second display embodiment includes: the above-described second surface light source device performing surface light emission; and a display displaying an image by modulating light from the second surface light source device based on an image signal.

In the embodiment, second surface light source device and the second display embodiment, as the first inclined surface facing the first light source and the second inclined surface facing the second light source are arranged on one or both of the light emission surface and the reflection surface of the light guide plate, light from the first light source and light from the second light source are reflected from the first inclined surface and the second inclined surface, respectively. At this time, as the first inclined surfaces are arranged more closely with increasing distance from the first light source, in the light emission surface, a larger amount of light from the first light source is emitted at a place farther from the first light source. Likewise, as the second inclined surfaces are arranged more closely with increasing distance from the second light source, in the light emission surface, a larger amount of light from the second light source is emitted at a place farther from the second light source.

In an embodiment, a third surface light source device includes: a light guide plate unit including a pair of facing side surfaces and a light emission surface and configured by arranging a plurality of light guide sections; and light sources arranged on both of the pair of side surfaces of the light guide plate unit. Herein, each of the light guide sections includes first and second side surfaces facing each other, has a shape in which the thickness thereof gradually decreases from the first side surface to the second side surface, and is configured so that a light emission amount increases with increasing distance from the first side surface. The light source is arranged on the first side surface of each of the light guide sections, and the plurality of light guide sections include a first light guide section configured by arranging the first side surface and the second side surface on one and the other of the side surfaces of the light guide plate unit, respectively, and a second light guide section configured by arranging the second side surface and the first side surface on the one side surface and the other side surface of the light guide plate unit, respectively.

In an embodiment, a third display includes: the above-described third surface light source device performing surface light emission; and a display section displaying an image by modulating light from the third surface light source device based on an image signal.

In the third surface light source device and the third display embodiments, in the light guide plate unit, a plurality of light guide sections with a configuration in which the thickness thereof gradually decreases from the first side surface to the second surface and the light emission amount increases from the first side surface to the second side surface are arranged, and the plurality of light guide sections include a first light guide section configured by arranging the first side surface on one of the side surfaces of the light guide plate unit and a second light guide section configured by arranging the first side surface on the other side surface. In such a configuration, as the light source is arranged on the first side surface of each of the light guide sections, in the light emission surface of each of the light guide sections, an emission amount is smaller and larger at places closer to and farther from the light source, respectively.

According to the first and second surface light source device embodiments, the first and second inclined surfaces are arranged so as to face the first and second light sources arranged on a pair of side surfaces of the light guide plate, respectively, and the heights of the first and second inclined surfaces increase with increasing distance from the first and second light sources, respectively; therefore, a nonuniform light emission intensity distribution in which light emission intensity is lower and higher at places closer to and farther from the first light source and a nonuniform light emission intensity distribution in which light emission intensity is lower and higher at places closer to and farther from the second light source are allowed to be formed independently. Moreover, a desired light emission intensity distribution as the whole light guide plate is allowed to be formed by superimposing these nonuniform light emission intensity distributions on each other, and in the first and second displays, display image quality is allowed to be improved accordingly.

According to the third surface light source device, in the light guide plate unit, a plurality of light guide sections having a configuration in which the thickness thereof gradually decreases from the first side surface to the second side surface and the light emission amount increases with increasing distance from the first side surface are arranged, and as the plurality of light guide sections, the first light guide section configured by arranging the first side surface on one of the side surfaces of the light guide plate unit and the second light guide section configured by arranging the first side surface on the other side surface of the light guide plate unit are arranged. When the light source is arranged on the first side surface of each of the light guide sections, in a configuration in which the light sources are arranged on both of the pair of side surfaces of the light guide plate unit, nonuniform light emission intensity distributions in which light emission intensity is lower and higher at places closer to and farther from the light source are allowed to be formed independently. Moreover, a desired light emission intensity distribution as the whole light guide plate unit is allowed to be formed by superimposing these nonuniform light emission intensity distributions on one another, and in the third display, display image quality is allowed to be improved accordingly.

Additional features and advantages are described herein, and will be apparent from, the following Detailed Description and the figures.

DETAILED DESCRIPTION

Embodiments will be described in detail below referring to the accompanying drawings.

First Embodiment

Figure 1:
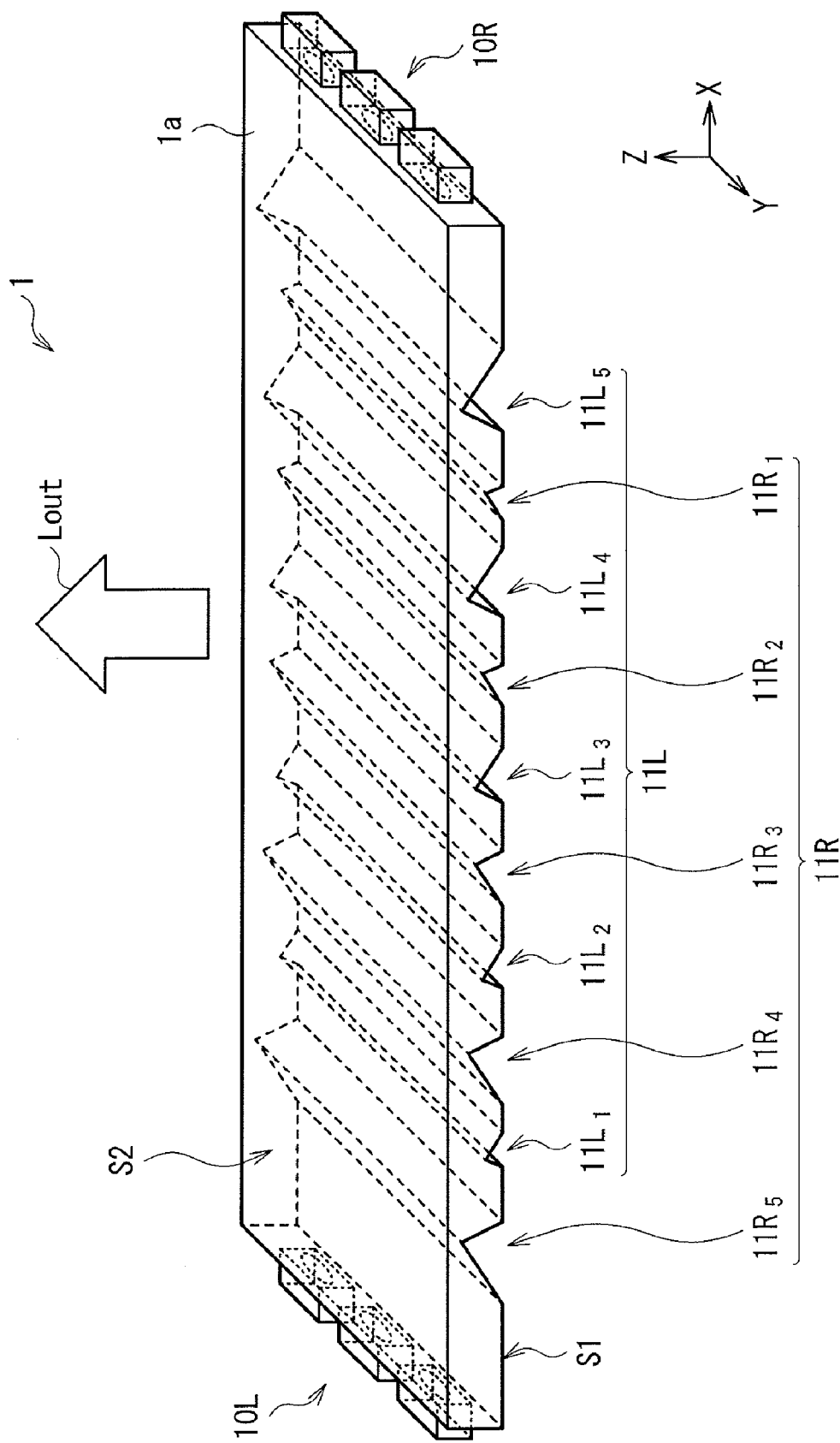
FIG. 1 is a perspective view illustrating a schematic configuration of a surface light source device according to a first embodiment.

FIG. 1 is a perspective view illustrating a configuration of a main part of a surface light source device (a surface light source device 1) according to a first embodiment. For example, an arrangement of a plurality of the surface light source devices 1 is used as a backlight for a liquid crystal display or the like, and each surface light source device 1 configures a partial lighting region in partial driving.

The surface light source device 1 is configured, for example, by arranging a light source 10L (a first light source) and a light source 10R (a second light source) on a pair of facing side surfaces, respectively, along an x direction of a flat light guide plate 1a. In the light guide plate 1a, a reflection surface S1 and a light emission surface S2 which faces the reflection surface S1 and emits emission light Lout are formed. In the embodiment, a light guide control section 11L (a first light guide control section) and a light guide control section 11R (a second light guide control section) are arranged on the reflection surface S1.

The light guide plate 1a is an optical member for allowing light from the light sources 10L and 10R to propagate therethrough to the light emission surface S2, and is made of a glass material or the like. However, the light guide plate 1a may be made of any other material allowing light from the light sources 10L and 10R to propagate therethrough. For example, the light guide plate 1a may be made of not only a material with high transparency but also a light-scattering material or a light-diffusion material in which fine light-scattering particles are dispersed. As a material of such fine light-scattering particles, any material allowing the light emission surface to obtain desired optical characteristics may be used. Note that the shape or size, the refractive index, the concentration, the concentration distribution and the like of the light guide plate 1a may be arbitrarily adjusted so as to obtain desired characteristics.

A plurality (three in this embodiment) of light sources 10L and a plurality (three in this embodiment) of light sources 10R are arranged on a pair of side surfaces of the light guide plate 1a, respectively. The light sources 10L and 10R are configured of, for example, LEDs (Light Emitting Diodes). Note that the numbers of the light sources 10L and 10R for each light guide plate 1a may be adjusted according to, for example, the length of the side surfaces of each light guide plate 1a, and the numbers of the light sources 10L and 10R are not specifically limited.

The light guide control section 11L controls guiding of light entering the light guide plate 1a from the light source 10L side, and is configured of a plurality (five in this embodiment) of concave sections (concave sections $11L_1$, $11L_2$, $11L_3$, $11L_4$ and $11L_5$ in order from a side closer to the light source 10L). The light guide control section 11R controls guiding of light entering the light guide plate 1a from the light source 10R side, and is configured of a plurality (five in this embodiment) of concave sections (concave sections $11R_1$, $11R_2$, $11R_3$, $11R_4$ and $11R_5$ in order from a side closer to the light source 10R). Such light guide control sections 11L and 11R have a configuration in which the concave sections of the light guide control section 11L and the concave sections of the light guide control section 11R are alternately arranged. However, the concave sections of the light guide control sections 11L and 11R are not necessarily arranged alternately. It is because, for example, as in the case of Modification Example 4 which will be described later, in the case where the concave sections are arranged at different intervals, it is difficult to alternately arrange the concave sections.

Now, referring to FIGS. 2(A) and (B), specific configurations of the above-described light guide control sections 11L and 11R will be described below. The surface light source device 1 is equivalent to a configuration formed by superimposing a configuration (refer to FIG. 2(A)) in which the light guide control section 11L is provided for the light source 10L and a configuration (refer to FIG. 2(B)) in which the light guide control section 11R is provided for the light source 10R on each other.

Figure 2:
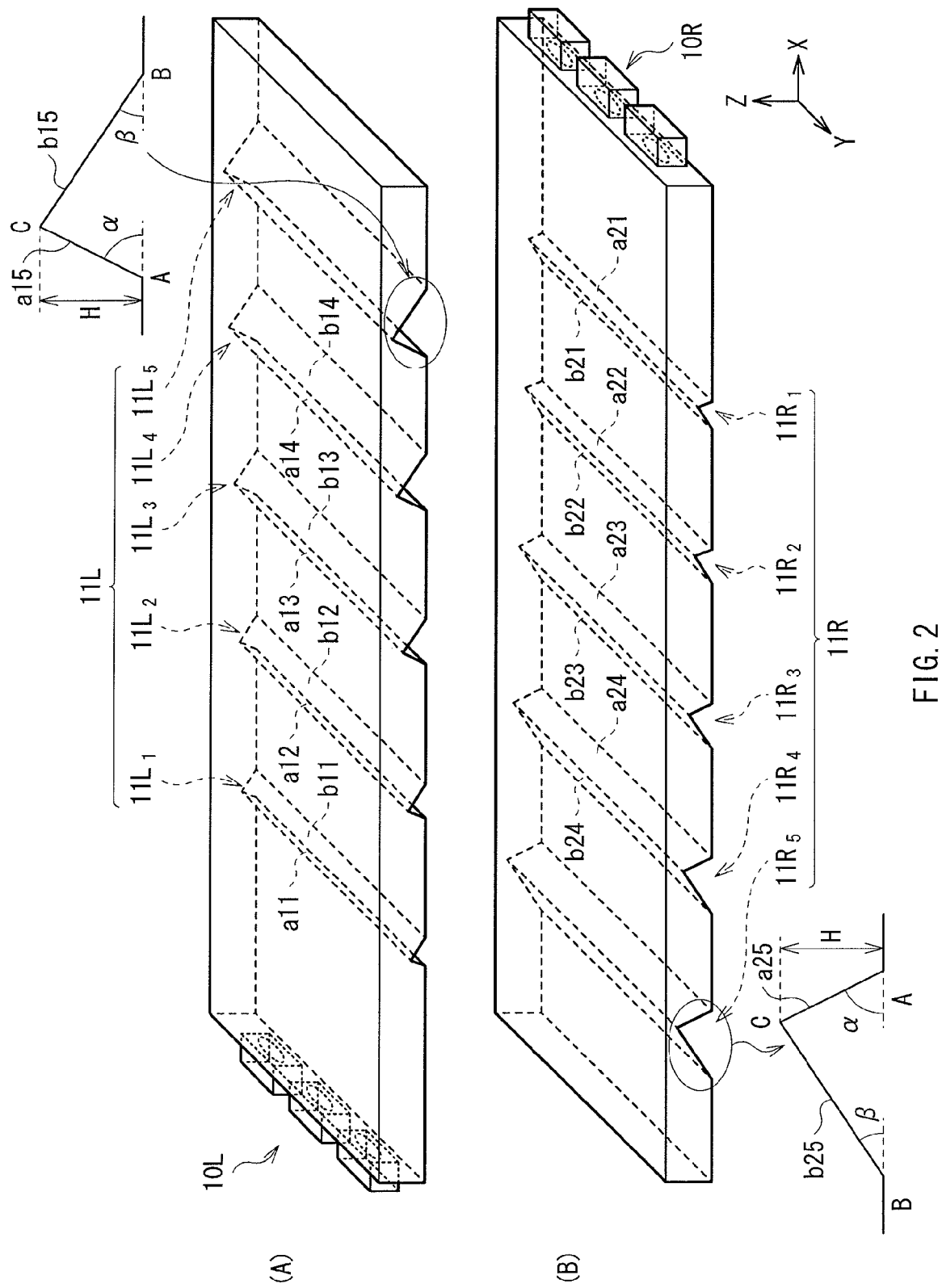
FIG. 2 is a conceptual diagram for describing a specific configuration of the surface light source device illustrated in FIG. 1.

As illustrated in FIG. 2(A), the concave sections $11L_1$ to $11L_5$ of the light guide control section 11L each extend in a y direction, and the xz sectional shape of each of the concave sections $11L_1$ to $11L_5$ is, for example, a triangular shape having vertices A, B and C. In other words, the concave sections $11L_1$ to $11L_5$ have inclined surfaces a11 to a15 (first inclined surfaces) facing the light source 10L and inclined surface b11 to b15 (third inclined surfaces) facing the light source 10R (not illustrated in FIG. 2(A)), respectively. In the embodiment, the inclined surfaces a11 to a15 and the inclined surfaces b11 to b15 are arranged on the sides closer to the light source 10L and the light source 10R, respectively. Such inclined surfaces a11 to a15 are inclined at one and the same angle α (an angle between a bottom surface AB and an inclined surface a), and the inclined surfaces b11 to b15 are inclined at one and the same angle β (an angle between the bottom surface AB and an inclined surface b). The inclined angles α and β satisfy the following conditional expression (1). Moreover, the inclined angles α and β preferably satisfy conditional expressions (1) and (2), and more preferably, the inclined angles α and β satisfy conditional expressions (1) to (3). Note that n is the refractive index of the light guide plate 1a and $\sin^{-1}(1/n)$ is a critical angle of the light guide plate 1a.

$$\beta < \alpha \quad (1)$$

$$\beta \leq (90-\sin^{-1}(1/n))/2 \quad (2)$$

$$\beta \leq (90-2\sin^{-1}(1/n))/2 \quad (3)$$

Note that in the embodiment and modification examples which will be described later, "facing the light source 10L" means being directed toward the light source 10L in the light guide plate 1a. Likewise, "facing the light source 10R" means being directed toward the light source 10R in the light guide plate 1a.

In particular, in the embodiment, the above-described concave sections $11L_1$ to $11L_5$ are arranged so that heights H (a distance from a line segment connecting vertices A and B to the vertex C), that is, the heights of the inclined surfaces a11 to a15 gradually increase with increasing distance from the light source 10L. The heights H are uniquely determined by the inclined angles α and β and the width of each concave section (a distance between the vertices A and B). In the light guide control section 11L, a light emission intensity distribution based on incident light from the light source 10L is allowed to be arbitrarily formed by adjusting the inclined angles α and β and the heights H. Note that the light emission intensity distribution is also adjustable by an emission angle distribution of incident light from the light source 10L, the shape or the refractive index of the light guide plate 1a, or the like.

On the other hand, as illustrated in FIG. 2(B), for example, the concave sections $11R_1$ to $11R_5$ of the light guide control section 11R are configured to be symmetrical to the concave sections $11L_1$ to $11L_5$ of the above-described light guide control section 11L with respect to a central plane (an yz plane) of the light guide plate 1a (hereinafter simply referred to centrally symmetrical). In other words, the concave sections $11R_1$ to $11R_5$ have inclined surfaces a21 to a25 (second inclined surfaces) facing the light source 10R and inclined surfaces b21 to b25 (fourth inclined surfaces) facing the light source 10L (not illustrated in FIG. 2(B)), respectively. In the embodiment, the inclined surfaces a21 to a25 and the inclined surfaces b21 to b25 are arranged on sides closer to the light source 10L and the light source 10R, respectively. The inclined angle α in the inclined surfaces a21 to a25 and the inclined angle β in the inclined surfaces b21 to b25 satisfy the above-described conditional expression (1). Moreover, the inclined angles α and β preferably satisfy the conditional expressions (1) and (2), and more preferably, the inclined angles α and β satisfy the conditional expressions (1) to (3). Further, the concave sections $11R_1$ to $11R_5$ are configured so that heights H, that is, the heights of the inclined surfaces a11 to a15 gradually increase with increasing distance from the light source 10R. In the light guide control section 11R, as in the case of the above-described light guide control section 11L, a light emission intensity distribution based on incident light from the light source 10R is allowed to be arbitrarily formed by adjusting the inclined angles α and β and the heights H.

In addition, when the inclined angles α and β are changed based on the above-described conditional expressions (1) to (3), luminous intensity distribution characteristics (an intensity distribution of an angular direction of light emitted from the light guide plate 1a) of the light guide plate 1a are changed. Therefore, when the surface light source device 1 of the embodiment is used as a backlight, the inclined angles α and β may be arbitrarily adjusted so as to correspond to the configuration of the backlight (configurations of an optical sheet and the like arranged above the light emission surface S2 of the light guide plate 1a) and to have desired luminous intensity distribution characteristics.

Moreover, to minimize influences of the light guide control section 11L and the light guide control section 11R to be exerted upon light from the light source 10R and light from the light source 10L, respectively, a smaller inclined angle β is better. However, when the inclined angle β is too small, the width of each concave section increases accordingly, thereby causing interference with adjacent concave sections; therefore, it is difficult to secure space for the inclined surfaces a11 to a15 and a21 to a25. On the other hand, when the width of each concave section is specified so as not to cause such interference, the heights H are not allowed to increase, and sufficient space for the inclined surfaces a11 to a15 and a21 to a25 is not allowed to be secured. In any of the cases, space for the inclined surfaces a11 to a15 and a21 to a25 is limited, and the limited space constitutes a restriction on adjustment of the light emission intensity distribution. Therefore, it is preferable to, after fixing the heights H, set a minimum inclined angle β which does not cause interference so as to obtain desired light emission intensity distribution by the inclined angle α.

Next, functions and effects of the embodiment will be described below.

In the surface light source device 1, when the light sources 10L and 10R illuminate, light enters the light guide plate 1a from each of the light sources 10L and 10R. Each light entering the light guide plate 1a propagates through the light guide plate 1a, and then the light is emitted from the light emission surface S2; therefore, surface light emission is performed in the surface light source device 1.

Figure 3:
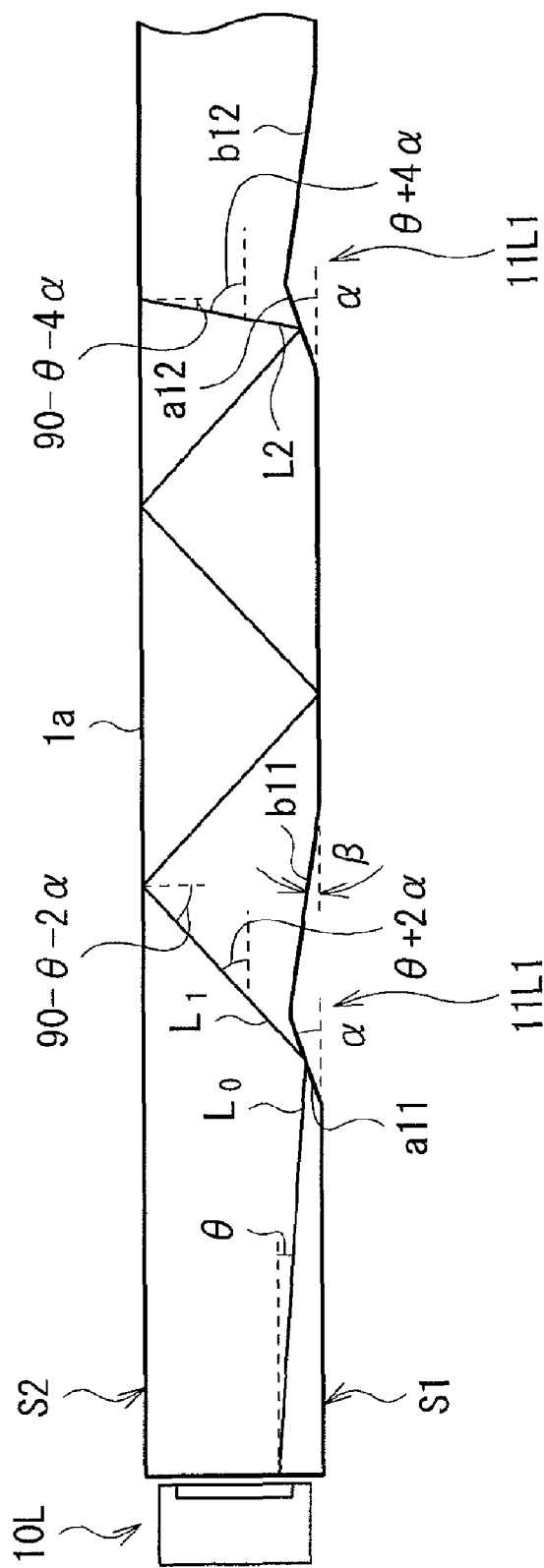
FIG. 3 is a diagram for describing functions of the surface light source device illustrated in FIG. 1.

In this case, as the light guide control sections 11L and 11R are arranged on the reflection surface S1, guiding of incident light from the light source 10L is controlled by the light guide control section 11L, and guiding of incident light from the light source 10R is controlled by the light guide control section 11R. Description about this will be given referring to FIG. 3. FIG. 3 is a schematic view illustrating a state where incident light $L_0$ from the light source 10L propagates through the light guide plate 1a. However, for the sake of simplicity and convenience, only the concave sections $11L_1$ and $11L_2$ of the light guide control section 11L are illustrated. In a process of guiding the incident light $L_0$ at an incident angle θ toward an opposite side surface (on a side closer to the light source 10R) in such a manner, first, the incident light $L_0$ enters the inclined surface a11 of the concave section $11_1$, and the incident light $L_0$ is reflected from the inclined surface a11. Therefore, an angle (hereinafter referred to as light guide angle) which reflected light $L_1$ forms with a plane parallel to the light emission surface S2 is (θ+2α).

On the one hand, an angle (hereinafter referred to as total reflection angle) which the light $L_1$ forms with a plane perpendicular to the light emission surface S2 is (90−θ−2α). In the case where the total reflection angle (90−θ−2α) is equal to or smaller than the critical angle of the light guide plate 1a, the light $L_1$ is emitted to above the light emission surface S2. On the other hand, in the case where the total reflection angle (90−θ−2α) is larger than the critical angle of the light guide plate 1a, the light $L_1$ is reflected from the light emission surface S2 to propagate through the light guide plate 1a at the light guide angle $(\theta+2\alpha)$.

Next, the light $L_1$ propagating through the light guide plate 1a enters the inclined surface a12 of the concave section $11L_2$, and the light $L_1$ is reflected from the inclined surface a12. Accordingly, the light guide angle of reflected light $L_2$ is $(\theta+4\alpha)$, and the total reflection angle is $(90-\theta-4\alpha)$. Thus, when a plurality of concave sections $11L_1$ to $11L_5$ are arranged in such a manner, the incident light $L_0$ from the light source 10L sequentially enter the concave sections $11L_1$ to $11L_5$ in a process of the light $L_0$ propagating through the light guide plate 1a; however, the light guide angle gradually increases with each reflection from the inclined surfaces a11 to a15, and when the light guide angle exceeds the critical angle, the light $L_0$ is emitted from the light emission surface S2.

Moreover, as the light guide control section 11L is configured so that the heights H of the concave sections $11L_1$ to $11L_5$ gradually increase with increasing distance from the light source 10L, the farther from the light source 10L, the more easily reflection from the inclined surface occurs. The light guide angle of light propagating through the light guide plate 1a increases with this reflection, and as a result, the amount of light emitted from the light emission surface S2 is larger on a side farther from the light source 10L. Thus, a light emission intensity distribution by lighting of the light source 10L is formed.

Likewise, incident light from the light source 10R sequentially enter the concave sections $11R_1$ to $11R_5$ in a process of the light propagating through the light guide plate 1a toward the light source 10L by the concave sections $11R_1$ to $11R_5$ of the light guide control section 11R, and the light guide angle gradually increases with each reflection from the inclined surfaces a21 to a25, and when the light guide angle exceeds the critical angle, the light is emitted from the light emission surface S2. Moreover, as the light guide control section 11R is configured so that the heights H of the concave sections $11R_1$ to $11R_5$ gradually increase with increasing distance from the light source 10R, the amount of light emitted from the light emission surface S2 is larger on a side farther from the light source 10R. Thus, a light emission intensity distribution by lighting of the light source 10R is formed.

Next, meaning of the conditional expressions (1) to (3) for the inclined angles α and β in the concave sections $11L_1$ to $11L_5$ of the light guide control section 11L and the concave section $11R_1$ to $11R_5$ of the light guide control section 11R will be described below.

First, the conditional expression (1) in the case where the light source 10L illuminates is considered. In this case, light propagating through the light guide plate 1a preferentially enters inclined surfaces facing the light source 10L, that is, the inclined surfaces a11 to a15 of the concave sections $11L_1$ to $11L_5$ and the inclined surfaces b21 to b25 of the concave section $11R_1$ to $11R_5$. It is because for light propagating from the light source 10L, the inclined surfaces b11 to b15 of the concave section $11L_1$ to $11L_5$ are hidden behind the inclined surfaces a11 to a15, and the inclined surfaces a21 to a25 of the concave section $11R_1$ to $11R_5$ are hidden behind the inclined surfaces b21 to b25.

Therefore, the larger the inclined angles α of the concave sections $11L_1$ to $11L_5$ are, the more the increment of the light guide angle by each reflection from the inclined surfaces a11 to a15 increases, and as a result, a light emission amount at that point increases. Therefore, the light emission intensity distribution by lighting of the light source 10L is easily adjusted. Moreover, the smaller the inclined angles β of the concave sections $11R_1$ to $11R_5$ are, the more the increment of the light guide angle by each reflection from the inclined surfaces b21 to b25 decreases, and as a result, a light emission amount at that point decreases. Therefore, the influence of the inclined surfaces b21 to b25, that is, the light guide control section 11R on the light emission intensity distribution formed by the light source 10L and the light guide control section 11L is reduced.

The same applies to the case where the light source 10R illuminates, and light propagating through the light guide plate 1a preferentially enters the inclined surfaces b11 to b15 of the concave sections $11L_1$ to $11L_5$ and the inclined surfaces a21 to a25 of the concave section $11R_1$ to $11R_5$. It is because for the light propagating from the light source 10R, the inclined surfaces a11 to a15 are hidden behind the inclined surfaces b11 to b15, and the inclined surfaces b21 to b25 of the concave section $11R_1$ to $11R_5$ are hidden behind the inclined surfaces a21 to a25. Therefore, the smaller the inclined angles β of the concave section $11L_1$ to $11L_5$ are, the more the increment of the light guide angle by each reflection from the inclined surfaces b11 to b15 decreases, and as a result, a light emission amount at that point decreases. Therefore, the influence of the light guide control section 11L on the light emission intensity distribution formed by the light source 10R and the light guide control section 11R is reduced. Moreover, the larger the inclined angles α of the concave sections $11R_1$ to $11R_5$ are, the more the increment of the light guide angle by each reflection from the inclined surfaces a21 to a25 increases, and as a result, a light emission amount at that point increases. Therefore, the light emission intensity distribution by lighting of the light source 10R is easily adjusted.

Specifically, when the inclined angles α of the concave sections $11L_1$ to $11L_5$ increase, the influence of the concave sections $11L_1$ to $11L_5$ on incident light from the light source 10L increases, and when the inclined angles β of the concave sections $11R_1$ to $11R_5$ decrease, the influence of the concave section $11R_1$ to $11R_5$ is reduced. Likewise, when the inclined angles α of the concave sections $11R_1$ to $11R_5$ increase, the influence of the concave sections $11R_1$ to $11R_5$ on incident light from the light source 10R increases, and when the inclined angles β of the concave sections $11L_1$ to $11L_5$ decrease, the influence of the concave section $11L_1$ to $11L_5$ is reduced.

Next, the conditional expression (2) in the case where the light source 10L illuminates is considered. In this case, as the height H of the concave section $11R_5$ of the light guide control section 11R is larger than that of the concave section $11L_1$ of the light guide control section 11L at a position closer to the light source 10L, there is a high probability that incident light from the light source 10L will inevitably enter the inclined surface b25. Therefore, when light from the light source 10L is emitted to the outside of the light guide plate 1a by one reflection from the inclined surface b25, the light emission intensity distribution is not adjustable by the concave sections $11L_1$ to $11L_5$.

Therefore, the inclined angle β is derived so that the total reflection angle is larger than the critical angle of the light guide plate 1a by reflection from the inclined surface b25. In other words, light at an incident angle of 0° is reflected from the inclined surface b25 with the inclined angle β, the total reflection angle of the reflected light is $(90-2\beta)$. On the other hand, as the critical angle of the light guide plate 1a with a refractive index n is $\sin^{-1}(1/n)$, it is only necessary to establish the following expression (4). Thus, the above-described conditional expression (2) is derived.

$$90-2\beta \geq \sin^{-1}(1/n) \quad (4)$$

In general, the intensity distribution of an angular direction of light entering the light guide plate 1a from a perfect diffusion light source such as an LED is the highest in a direction perpendicular to an incident surface. Therefore, when the conditional expression (2) is satisfied, the emission amount from the light emission surface S2 by the concave sections $11L_1$ to $11L_5$ is sufficient, and light use efficiency is thereby improved.

However, ideally, on condition that light emitted at a widest possible angle from the light source, that is, light at an incident angle equal to the critical angle is not emitted to the outside of the light guide plate 1a by one reflection from the inclined surface b25, the light emission intensity distribution by the concave section $11L_1$ to $11L_5$ is adjusted most easily without influence of the inclined surface b25. Therefore, when incident light at an incident angle of $\sin^{-1}(1/n)$ is reflected from the inclined surface b25 with the inclined angle β, the total reflection angle is $(90-\sin^{-1}(1/n)-2\beta)$. On the other hand, as the critical angle of a light guide plate with the refractive index n is $\sin^{-1}(1/n)$, it is only necessary to establish the following expression (5). Thus, the above-described conditional expression (3) is derived. Therefore, when the conditional expression (3) is satisfied, the emission amount from the light emission surface S2 by the concave sections $11L_1$ to $11L_5$ is more sufficient, and the light use efficiency is thereby further improved.

$$90-\sin^{-1}(1/n)-2\beta \geq \sin^{-1}(1/n) \quad (5)$$

As described above, in the embodiment, the light guide control sections 11L and 11R are arranged on the reflection surface S1 of the light guide plate 1a; therefore, guiding of light from each of the light sources 10L and 10R arranged on a pair of side surfaces of the light guide plate 1a, respectively, is controllable. In other words, the concave sections $11L_1$ to $11L_5$ having the inclined surfaces a11 to a15 and the inclined surfaces b11 to b15, respectively are arranged as the light guide control section 11L, and are configured so that the heights of the concave sections $11L_1$ to $11L_5$ increase with increasing distance from the light source 10L; therefore, a nonuniform light emission intensity distribution in which light emission intensity is lower and higher at places closer to and farther from the light source 10L, respectively, is allowed to be formed. At this time, as the inclined angles α and β in the concave sections $11L_1$ to $11L_5$ satisfy the conditional expression (1), the influence on the light from the light source 10L is allowed to be increased, and the influence on the light from the light source 10R is allowed to be reduced. On the other hand, the concave sections $11R_1$ to $11R_5$ having the inclined surfaces a21 to a25 and the inclined surfaces b21 to b25 are arranged as the light guide control section 11R, and are configured so that the heights of the concave section $11R_1$ to $11R_5$ increase with increasing distance from the light source 10R; therefore, a nonuniform light emission intensity distribution in which light emission intensity is lower and higher at places closer to and farther from the light source 10R, respectively, is allowed to be formed. At this time, the inclined angles α and β in the concave sections $11R_1$ to $11R_5$ satisfy the conditional expression (1), the influence on the light from the light source 10R is allowed to be increased, and the influence on the light from the light source 10L is allowed to be reduced. Therefore, the nonuniform light emission intensity distributions by lighting of the light sources 10L and 10R are allowed to be formed independently.

Figure 4:
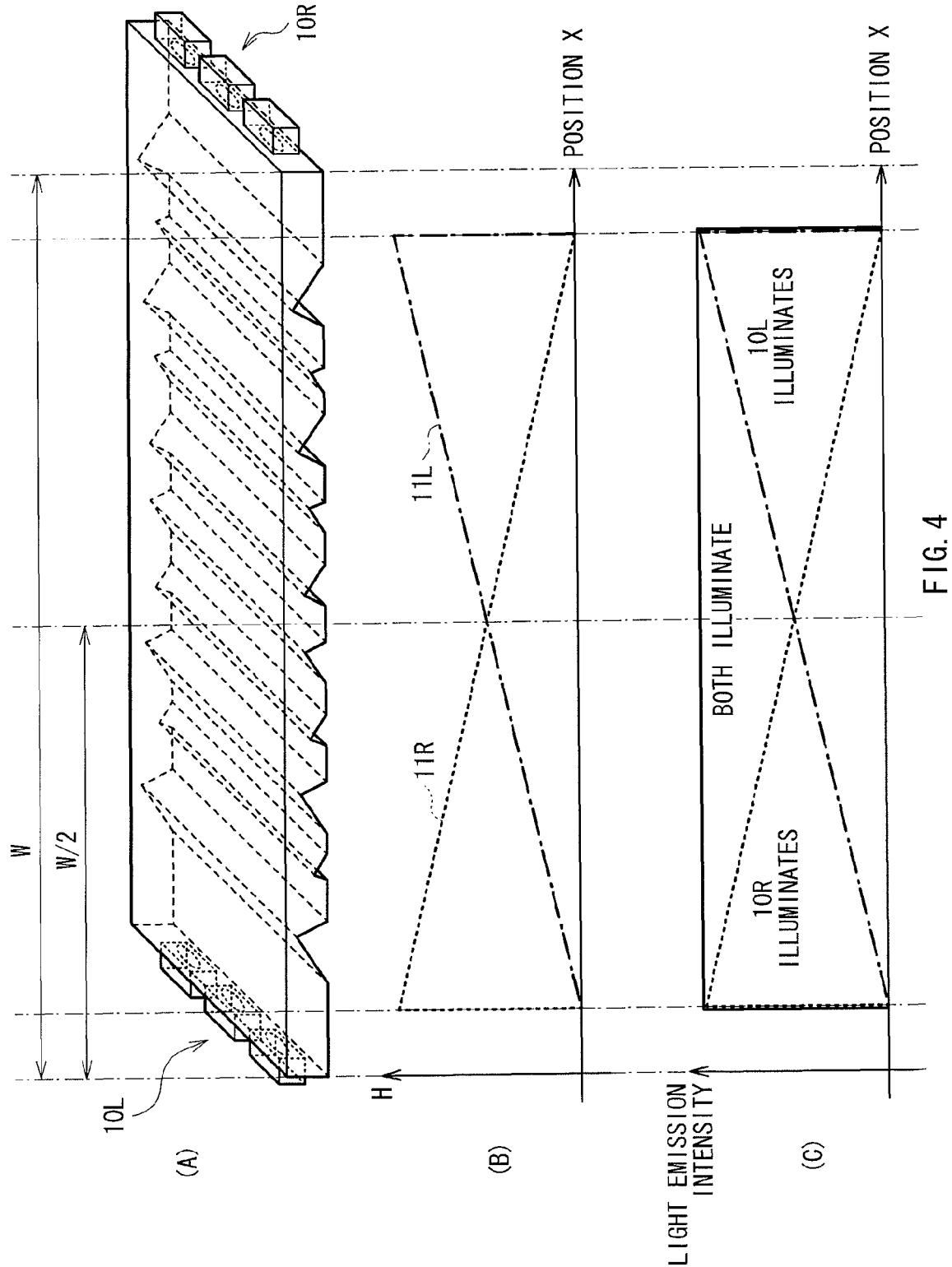
FIG. 4 is a diagram illustrating an example of a height distribution and a light emission intensity distribution of the surface light source device illustrated in FIG. 1.

Now, FIGS. 4(A) to (C) illustrate an example of a light emission intensity distribution by height distributions of the light guide control sections 11L and 11R. FIG. 4(C) illustrates a light emission intensity distribution in the case where in the light guide control sections 11L and 11R (refer to FIG. 4(A)) formed so as to be centrally symmetrical to each other, a height distribution (refer to FIG. 4(B)) in which the height H gradually increases with increasing distance from each of the light sources 10L and 10R is formed. As illustrated in FIG. 4(C), in the case where only the light source 10L illuminates, the influence of the light guide control section 11L is predominant; therefore, a nonuniform light emission intensity distribution as illustrated by an alternate long and short dashed line is allowed to be formed. On the other hand, in the case where only the light source 10R illuminates, the influence of the light guide control section 11R is predominant; therefore, a nonuniform light emission intensity distribution as illustrated by a dotted line is allowed to be formed. Therefore, when both of the light sources 10L and 10R illuminate, the nonuniform light emission intensity distributions are superimposed on each other, and a uniform light emission intensity distribution (indicated by a solid line in FIG. 4(C)) as the whole light guide plate 1a is allowed to be formed.

Next, modified examples of the embodiment will be described below. Like components are denoted by like numerals as of the above-described embodiment, and will not be further described.

Modification Example 1

Figure 5:
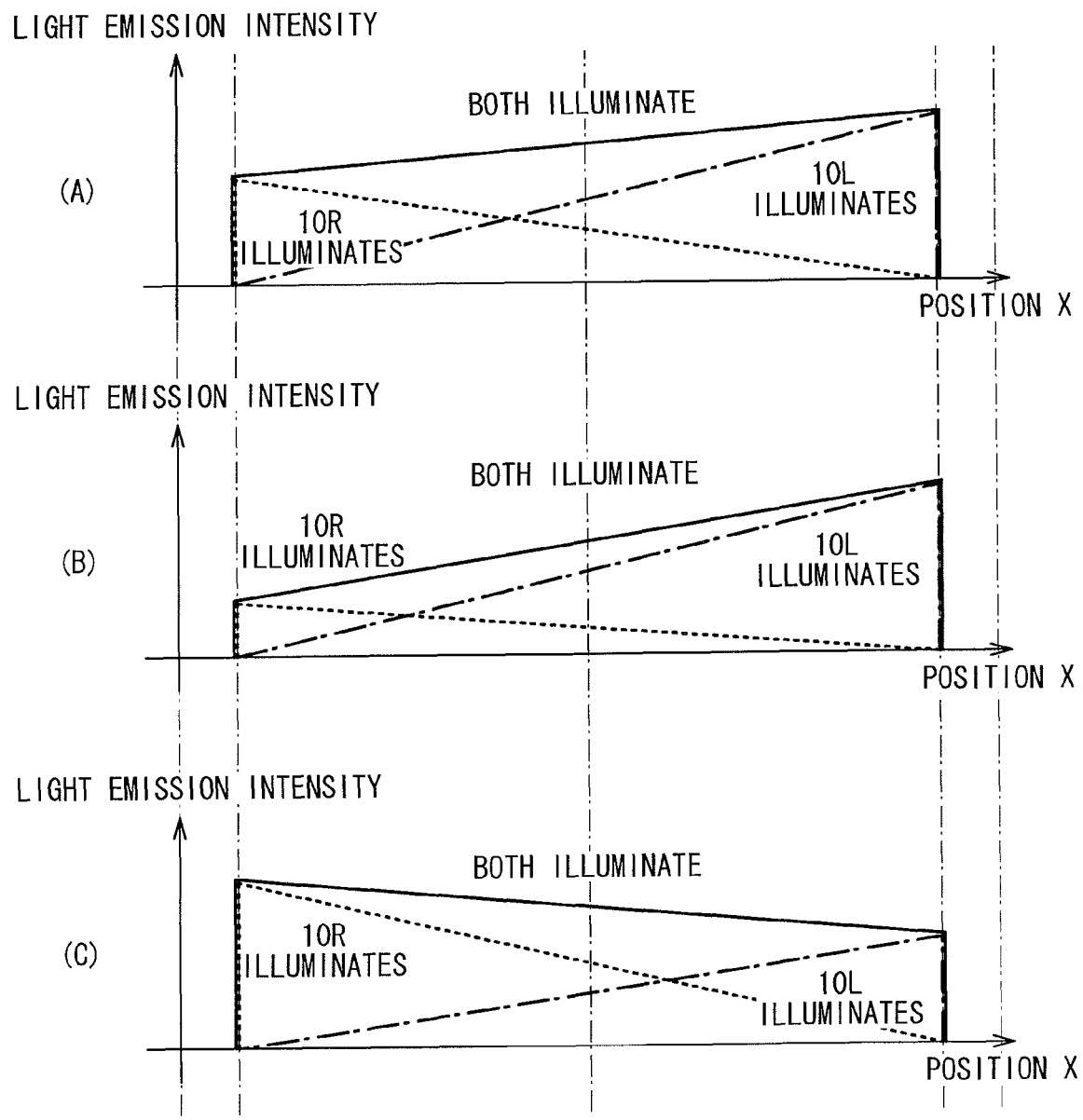
FIG. 5 is a diagram illustrating an example of a light emission intensity distribution of a surface light source device according to Modification Example 1.

FIGS. 5(A) to (C) illustrate an example of light emission intensity distributions of a surface light source device according to Modification Example 1. In the modification example, in nonuniform light emission intensity distributions (indicated by an alternate long and short dashed line and a dotted line) of the light sources 10L and 10R, the light emission intensity of the light sources 10L and the light emission intensity of the light source 10R are different from each other. When such nonuniform light emission intensity distributions are superimposed on each other, the whole light emission intensity distribution is allowed to be successively changed. For example, when the light emission intensity of the light source 10L and the light emission intensity of the light source 10R are different from each other, such a whole light emission intensity distribution is achievable.

As described above, the configurations of the light guide control sections 11L and 11R are not limited to the case where they are centrally symmetrical to each other, and the light guide control sections 11L and 11R may be configured so that the light emission intensity of the light source 10L and the light emission intensity of the light source 10R are different from each other. As the nonuniform light emission intensity distributions by the light sources 10L and 10R are allowed to be formed independently, an arbitrary light emission intensity distribution as the whole light guide plate is allowed to be formed easily by superimposing the nonuniform light emission intensity distributions on each other. In particular, this modification example is effective in the case where a plurality of surface light source devices are arranged and light emission intensity is successively changed between adjacent surface light source devices to perform partial driving (details will be described later).

The above-described arbitrary light emission intensity distribution may be formed not only in the case where the light emission intensity of the light guide control section 11L and the light emission intensity of the light guide control section 11R are different from each other but also in the case where the height distributions of the light sources 10L and 10R are different from each other.

Modification Example 2

Figure 6:
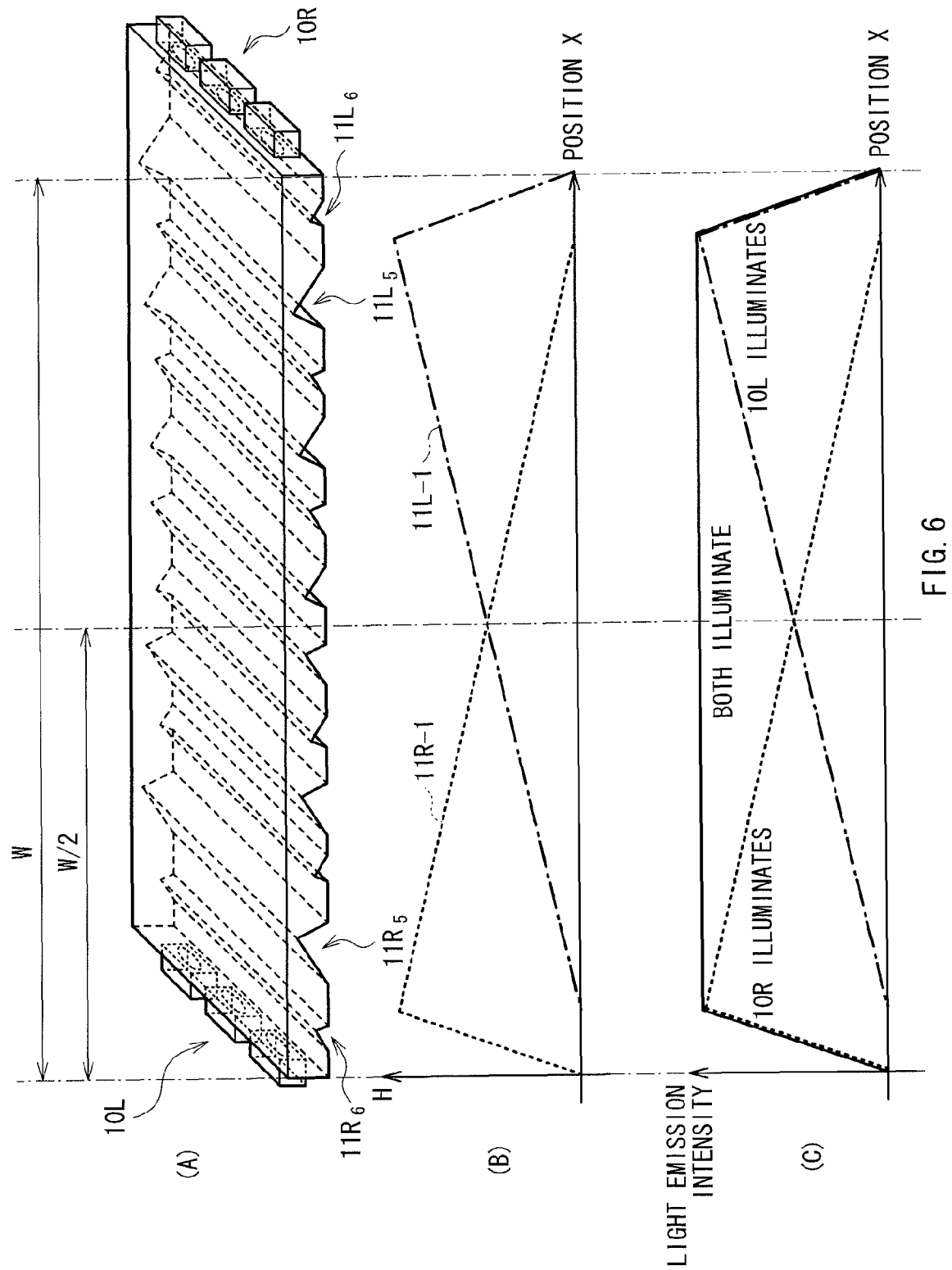
FIG. 6 is a diagram illustrating an example of a schematic configuration, a height distribution and a light emission intensity distribution of a surface light source device according to Modification Example 2.

FIG. 6(A) is a perspective view illustrating a schematic configuration of a surface light source device according to Modification Example 2, and FIG. 6(B) and FIG. 6(C) illustrate an example of a height distribution and an example of a light emission intensity distribution, respectively. In the modification example, in a light guide control section 11L-1, in addition to the concave sections $11L_1$ to $11L_5$ arranged so that the heights H thereof increase in order from a side closer to the light source 10L, a concave section $11L_6$ with a smaller height H than that of the concave section $11L_5$ is arranged at a position farthest from the light source 10L, that is a position closest to the light source 10R. On the other hand, in a light guide control section 11R-1, in addition to the concave sections $11R_1$ to $11R_5$ arranged so that the heights H thereof increase in order from a side closer to the light source 10R, a concave section $11R_6$ with a smaller height H than that of the concave section $11R_5$ is arranged at a position farthest from the light source 10R, that is a position closest to the light source 10L.

In the modification example, the heights H of the concave sections $11L_1$ to $11L_5$ and the concave section $11R_1$ to $11R_5$ are changed so as to increase with increasing distance from the light sources 10L and 10R, respectively; therefore, nonuniform light emission intensity distributions by the light sources 10L and 10R are allowed to be formed independently. Therefore, the same effects as those in the surface light source device 1 of the above-described embodiment are obtainable.

Moreover, in the light guide control section 11L-1, the concave section $11L_6$ with a smaller height H than that of the concave section $11L_5$ is arranged on a side closer to the light source 10R of the concave section $11L_5$; therefore, as illustrated in FIG. 6(B), a height distribution (indicated by an alternate long and short dashed line) in which the height changes in a stepwise manner at an end on the side closer to the light source 10R is formed. Therefore, in the case where only the light source 10L illuminates, as illustrated in FIG. 6(C), an nonuniform light emission intensity distribution (indicated by an alternate long and short dashed line) in which the light emission intensity changes in a stepwise manner at an end on the side closer to the light source 10R is allowed to be formed.

Likewise, in the light guide control section 11R-1, the concave section $11R_6$ with a smaller height H than that of the concave section $11R_5$ is arranged at an end on the side closer to the light source 10L; therefore, as illustrated in FIG. 6(B), a height distribution (indicated by a dotted line) in which the height changes in a stepwise manner at the end on the side closer to the light source 10L is formed. Therefore, in the case where only the light source 10R illuminates, as illustrated in FIG. 6(C), an nonuniform light emission intensity distribution (indicated by a dotted line) in which the light emission intensity changes in a stepwise manner at the end on the side closer to the light source 10L is allowed to be formed.

Therefore, when both of the light sources 10L and 10R illuminate to superimpose the nonuniform light emission intensity distributions on each other, a light emission intensity distribution (indicated by a solid line in FIG. 6(C)) in which the light emission intensity changes in a stepwise manner at both ends is allowed to be formed. Thus, an abrupt change in light emission intensity at both ends of the light guide plate is preventable, so the occurrence of bright line unevenness or the like is preventable.

Modification Example 3

Figure 7:
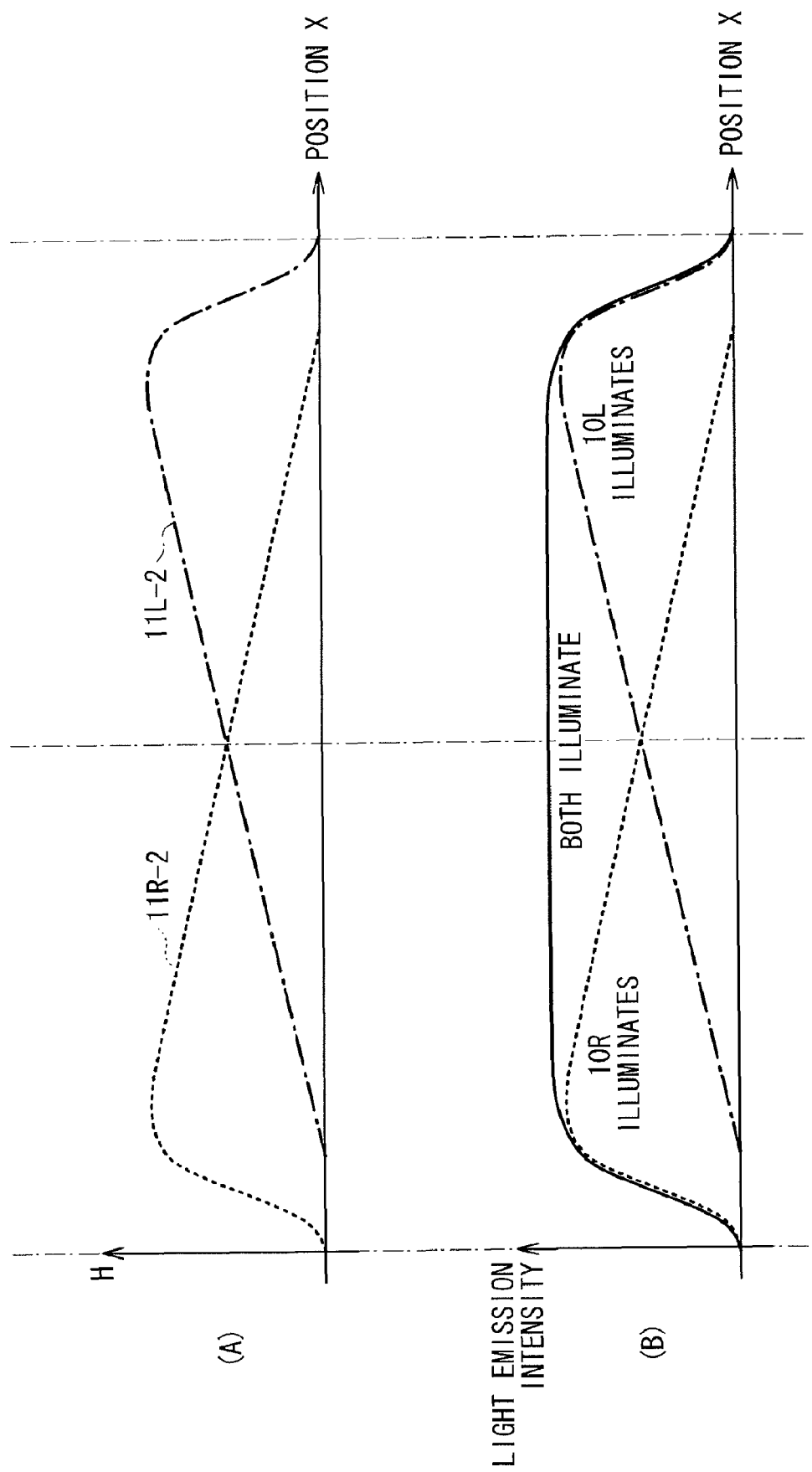
FIG. 7 is a diagram illustrating an example of a height distribution and a light emission intensity distribution of a surface light source device according to Modification Example 3.

FIG. 7(A) and FIG. 7(B) illustrate an example of a height distribution and a light emission intensity distribution in a surface light source device according to Modification Example 3. In the modification example, as illustrated in FIG. 7(A), height distributions of concave sections in light guide control sections 11L-2 and 11R-2 gently change at ends on sides closer to the light sources 10L and 10R. As illustrated in FIG. 7(B), in the case where the light sources 10L and 10R individually illuminate, nonuniform light emission intensity distributions (indicated by an alternate long and short dashed line and a dotted line) in which light emission intensity gently changes at the ends on the sides closer to the light sources 10L and 10R, respectively, are allowed to be formed by such a configuration. Therefore, when both of the light sources 10L and 10R illuminate to superimpose the nonuniform light emission intensity distributions on each other, a light emission intensity distribution (indicated by a solid line) in which the light emission intensity gently changes at both ends of the light guide plate is allowed to be formed, so bright line unevenness or the like is preventable more effectively.

Modification Example 4

Figure 8:
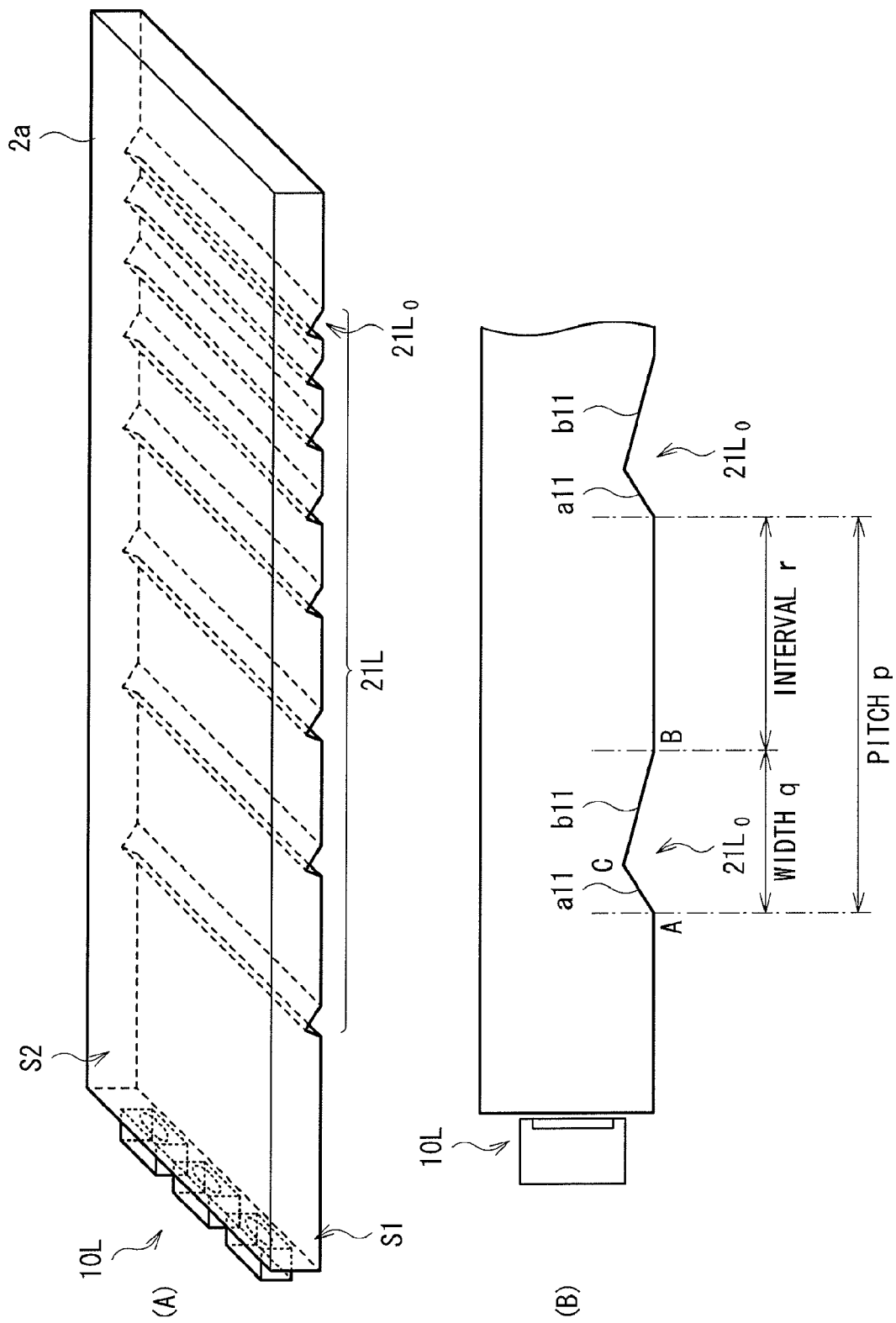
FIG. 8 is a conceptual diagram for describing a configuration of a surface light source device according to Modification Example 4.

FIG. 8(A) illustrates schematic configurations of the light source 10L and a light guide control section 21L in a surface light source device according to Modification Example 4, and FIG. 8(B) is an enlarged view of a light guide plate. For the sake of simplicity and convenience, perspective views of the light source 10R and a light guide control section 21R are not illustrated. In the modification example, the light guide control section 21L is configured of a plurality (eight in the modification example) of concave sections $21L_0$. These concave sections $21L_0$ have an identical shape having an inclined surface a11 at an inclined angle α and an inclined surface b11 at an inclined angle β (both not illustrated in FIG. 8(A)) and a fixed height H specified by the inclined surfaces a11 and b11. Moreover, the light guide control section 21R is configured so as to be centrally symmetrical to the light guide control section 21L.

Such concave sections $21L_0$ are arranged more closely with increasing distance from the light source 10L. In other words, the concave sections $21L_0$ are arranged so that intervals r therebetween gradually decrease with increasing distance from the light source 10L. Note that as illustrated in FIG. 8(B), a pitch p of each concave section $21L_0$ is specified by a width q (a line segment specified by the vertices A and B) of the concave section $21L_0$ and the intervals r, and the density of the concave sections $21L_0$ is defined as D=q/p.

Figure 9:
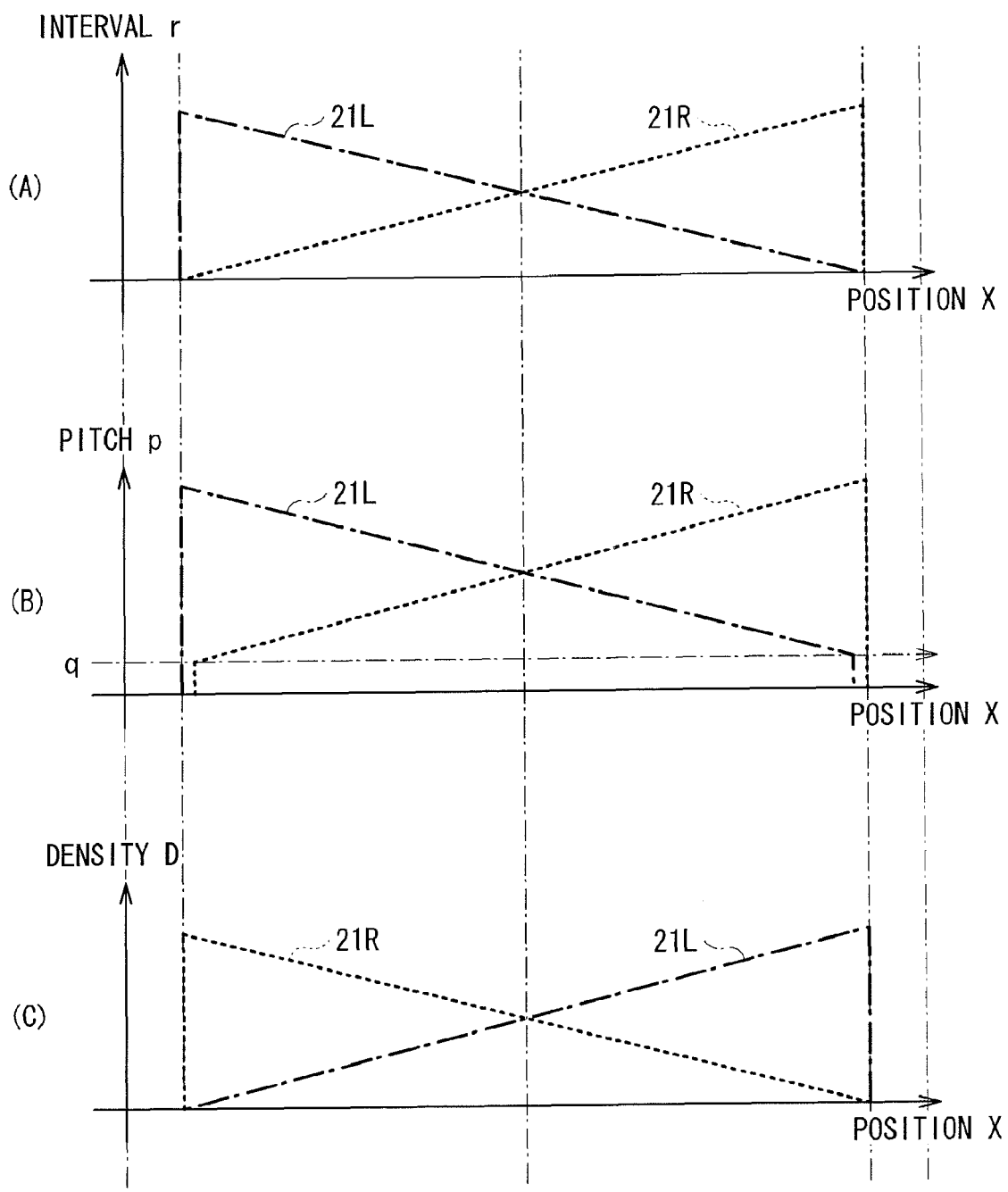
FIG. 9 is a diagram illustrating an example of distributions of intervals, pitches and density of concave sections of the surface light source device illustrated in FIG. 4.

For example, as illustrated in FIG. 9(A), in the light guide control section 21L, the concave sections $21L_0$ are arranged so as to form a distribution in which the intervals r gradually decrease with increasing distance from the light source 10L. Accordingly, in a distribution of the pitches p, the pitches p gradually decrease with increasing distance from the light source 10L (refer to FIG. 9(B)), and in a distribution of the density D, the density D gradually increases with increasing distance from the light source 10L (refer to FIG. 9(C)). On the other hand, distributions of the intervals r, the pitches p and the density D in the light guide control section 21R are centrally symmetrical to those of the above-described light guide control section 21L.

In the modification example, in the light guide control section 21L, the concave sections 21L$_0$ are arranged more closely with increasing distance from the light source 10L, so light is reflected from the inclined surface a11 more easily with increasing distance from the light source 10L. Therefore, the light emission amount in a position closer to the light source 10L is larger than that in a position farther from the light source 10L. Therefore, as in the case of the above-described embodiment, a nonuniform light emission intensity distribution in which light emission intensity is lower and higher at places closer to and farther from the light source 10L, respectively, is allowed to be formed by lighting of the light source 10L. Moreover, also in the light guide control section 21R, a nonuniform light emission intensity distribution which is centrally symmetrical to the nonuniform light emission intensity distribution of the above-described light guide control section 21L is allowed to be formed. Therefore, when both of the light sources 10L and 10R illuminate to superimpose the nonuniform distributions on each other, a uniform light emission intensity distribution as a whole is allowed to be formed.

As described above, the nonuniform light emission intensity distribution in which light emission intensity is lower and higher at places closer to and farther from the light source, respectively, is achievable not only by changing the heights of the concave sections of the light guide control sections but also by changing the intervals between the concave sections. Moreover, in the above-described embodiment, a configuration in which the intervals are fixed and the heights are changed is described as an example, and in the modification example, a configuration in which the heights are fixed and the intervals are changed is described as an example, but the invention is not limited thereto, and both of the heights and the intervals may be changed to form a nonuniform light emission intensity distribution. For example, the concave sections may be configured so that some of the concave sections are arranged at fixed intervals and have different heights, and the other concave sections have a fixed height and are arranged at different intervals.

Figure 10:
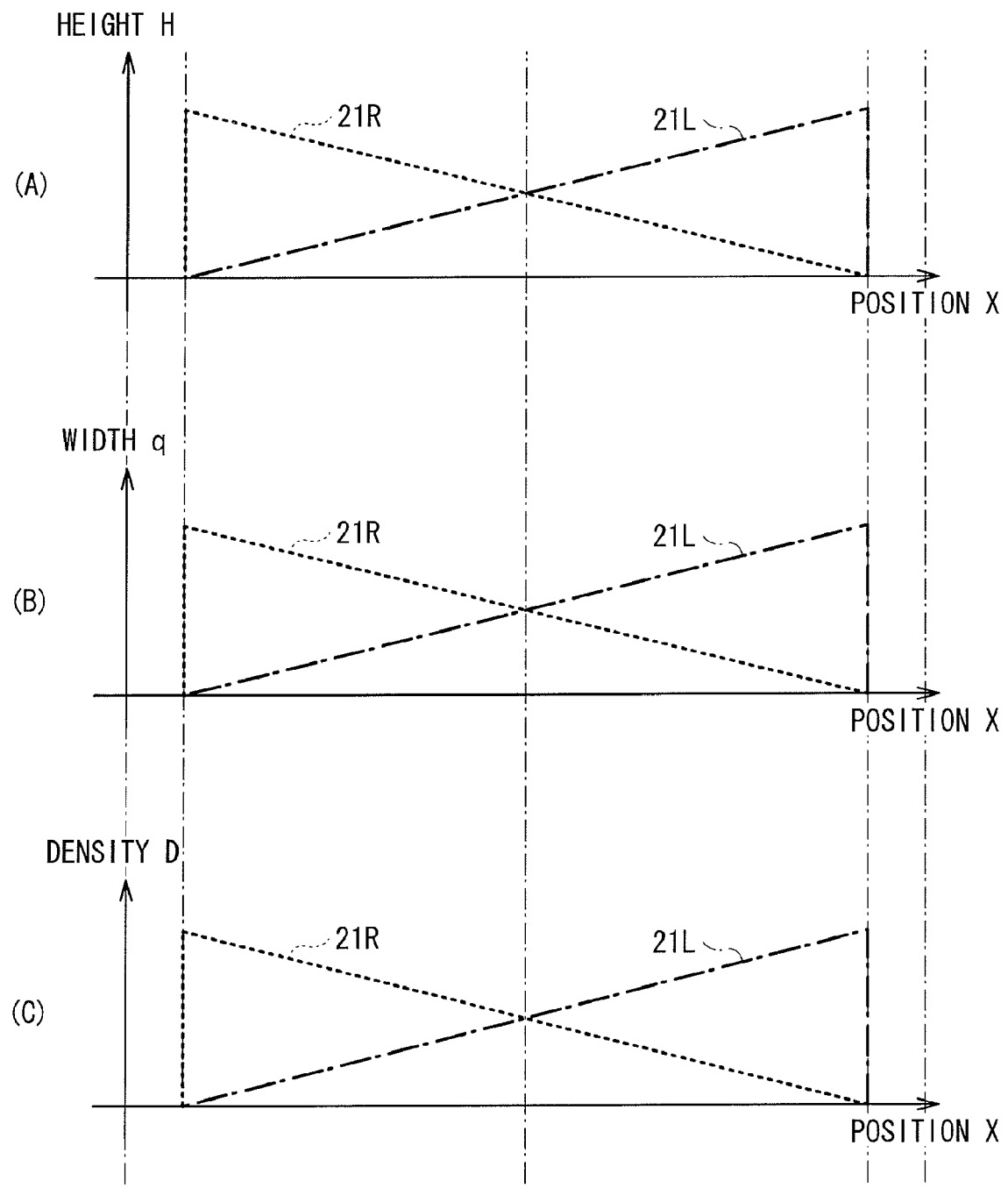
FIG. 10 is a diagram relating to another example of the surface light source device illustrated in FIG. 4, and a diagram illustrating an example of distributions of heights, widths and density of concave sections.

FIGS. 10(A) to (C) illustrate the case where the pitches p are fixed and the heights H and the widths q are changed as in the case of the surface light source device 1 described in the above-described embodiment. The density D is changed in such a manner also by the above-described surface light source device 1 to form a nonuniform light emission intensity distribution. At this time, when the width q is too large, light emitted by the concave section with the too large width q may be visible as bright line unevenness. In such a case, a maximum value of the width q at which emission light is not visible as bright line unevenness is estimated, and the width q is fixed at the maximum value, and then the intervals r may be decreased and the density D may be increased. On the other hand, when the width q is too small, the width q may exceed a process limitation in formation or an accuracy limitation. In such a case, a minimum value of the width q which does not exceed the process limitation or the accuracy limitation is estimated, and the width q is fixed at the minimum value, and then the intervals r may be increased and the density D may be decreased.

Modification Example 5

Figure 11:
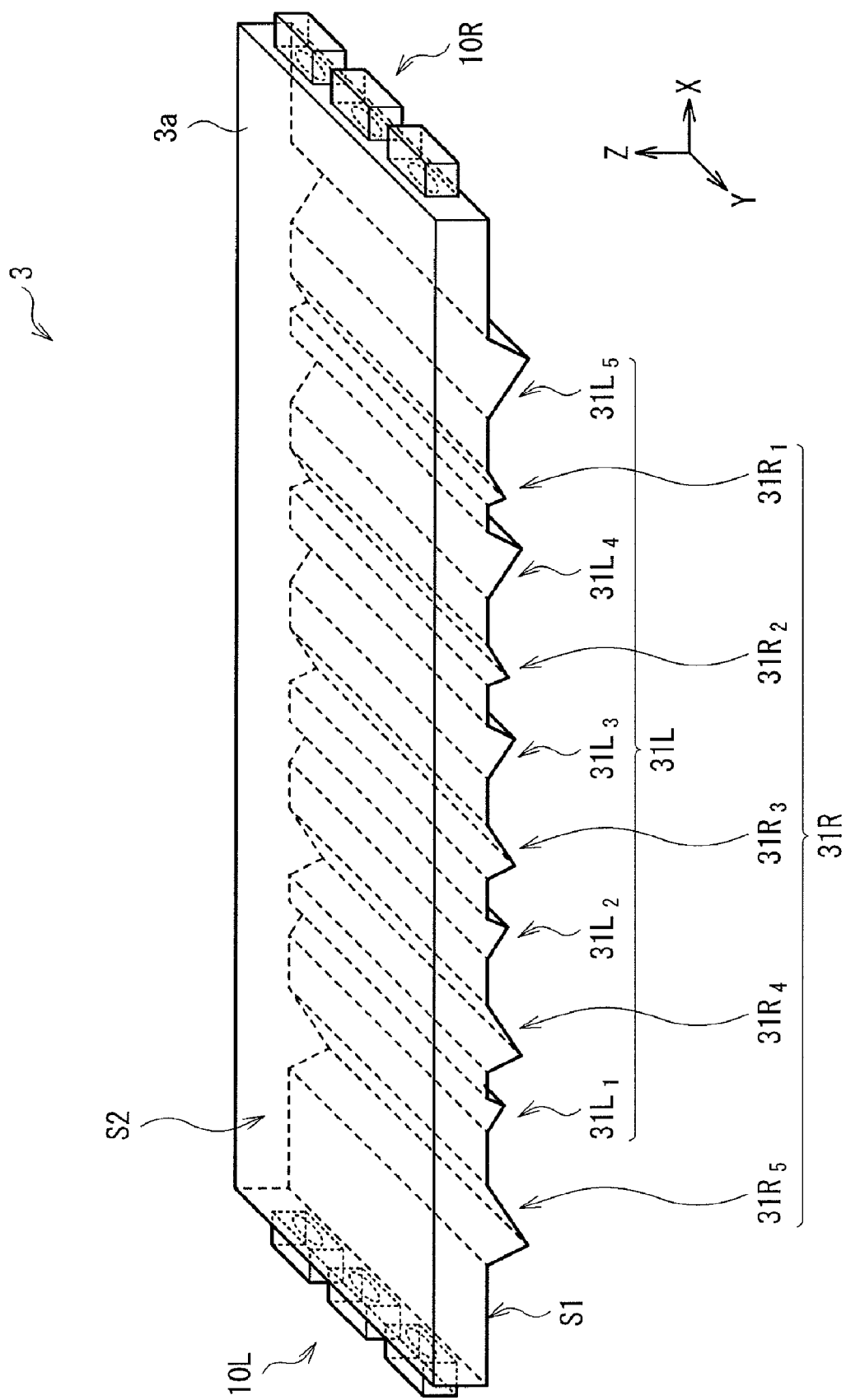
FIG. 11 is a perspective view illustrating a schematic configuration of a surface light source device according to Modification Example 5.

FIG. 11 is a perspective view illustrating a schematic configuration of a surface light source device 3 according to Modification Example 5. In the surface light source device 3, light guide control sections 31L and 31R are arranged on a reflection surface S1 of a light guide plate 3a.

The light guide control section 31L controls guiding of light entering the light guide plate 3a from the light source 10L, and is configured of a plurality (five in the modification example) of convex sections (convex sections 31L$_1$, 31L$_2$, 31L$_3$, 31L$_4$ and 31L$_5$ in order from a side closer to light source 10L). The light guide control section 31R controls guiding of light entering the light guide plate 3a from the light source 10R, and is configured of a plurality (five in the modification example) of convex sections (convex sections 31$^1$R$_1$, 31R$_2$, 31R$_3$, 31R$_4$ and 31R$_5$ in order from a side closer to the light source 10R). For example, such light guide control sections 31L and 31R have a configuration in which the convex sections of the light guide control section 31L and the concave sections of the light guide control section 31R are alternately arranged.

Now, specific configurations of the above-described light guide control sections 31L and 31R will be described referring to FIGS. 12(A) and (B). The surface light source device 1 is equivalent to a configuration formed by superimposing a configuration (refer to FIG. 12(A)) in which the light guide control section 31L is provided for the light source 10L and a configuration (refer to FIG. 12(B)) in which the light guide control section 31R is provided for the light source 10R on each other.

Figure 12:
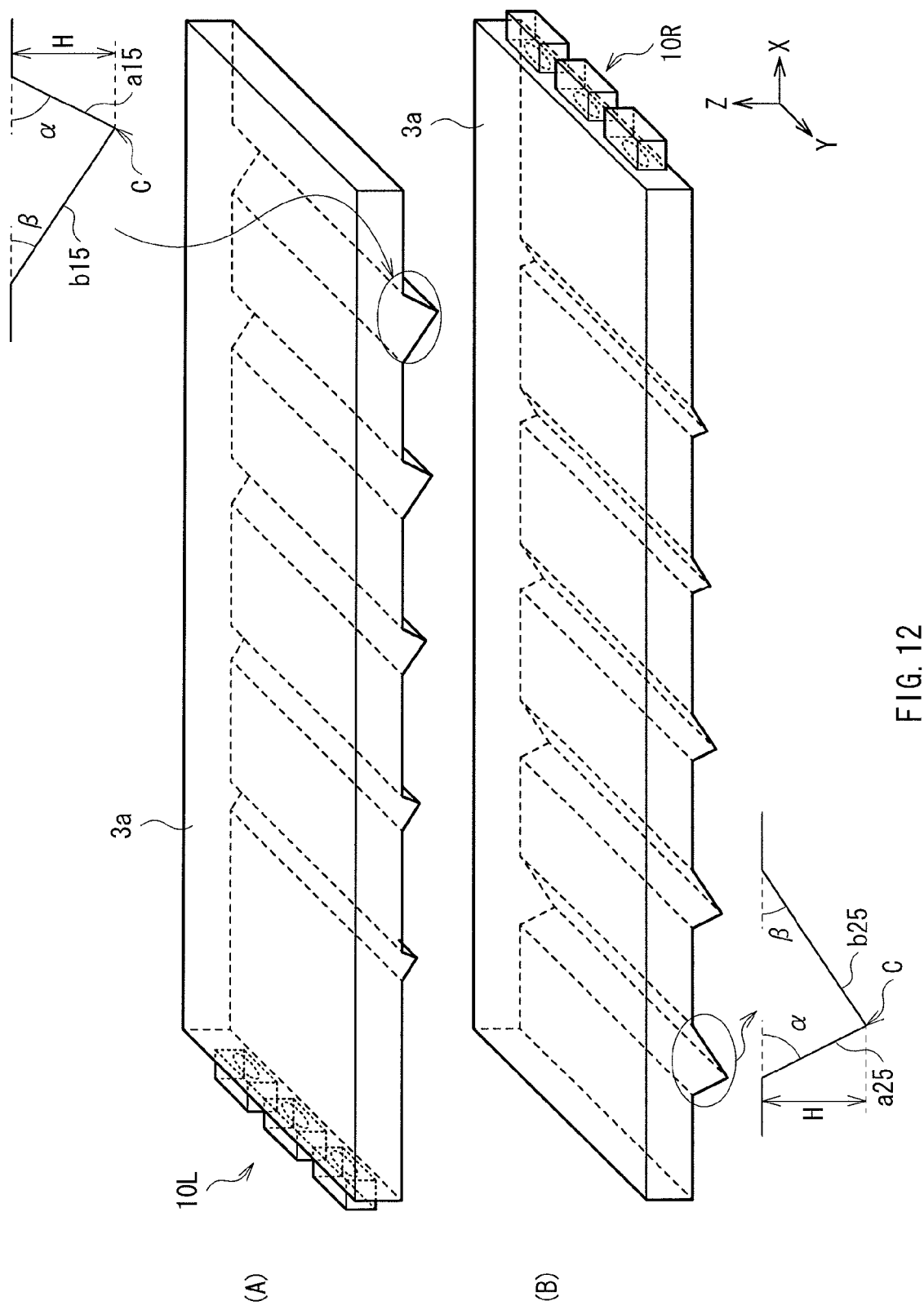
FIG. 12 is a conceptual diagram for describing a specific configuration of the surface light source device illustrated in FIG. 1.

As illustrated in FIGS. 12(A) and (B), the light guide control sections 31L and 31R have the same configurations as those of the light guide control sections 11L and 11R, respectively, except that the convex sections 31L$_1$ to 31L$_5$ of the light guide control section 31L and the convex section 31R$_1$ to 31R$_5$ of the light guide control section 31R are convex toward the bottom of the reflection surface S1. In other words, the convex sections 31L$_1$ to 31L$_5$ have inclined surfaces a11 to a15 (first inclined surfaces) facing the light source 10L and inclined surfaces b11 to b15 (third inclined surfaces) facing the light source 10R (not illustrated in FIG. 12(A)), respectively. In the modification example, the inclined surfaces a11 to a15 and the inclined surfaces b11 to b15 are arranged on sides closer to the light source 10R and the light source 10L, respectively. The inclined surfaces a11 to a15 are inclined at the inclined angle $\alpha$, and the inclined surfaces b11 to b15 are inclined at the inclined angle $\beta$. Moreover, the convex sections 31L$_1$ to 31L$_5$ are arranged so that the heights H thereof gradually increase with increasing distance from the light source 10L. Further, the inclined angles $\alpha$ and $\beta$ satisfy the above-described conditional expression (1), preferably conditional expressions (1) and (2), more preferably the conditional expressions (1) to (3). The same applies to the convex sections 31R$_1$ to 31R$_5$.

Note that also in the modification example, "facing the light source 10L" means being directed toward the light source 10L in the light guide plate 3a. Likewise, "facing the light source 10R" means being directed toward the light source 10R in the light guide plate 3a.

In the modification example, in a process of incident light from the light source 10L propagating through the light guide plate 3a toward the light source 10R by the light guide control section 31L, the light guide angle gradually increases with each reflection from the inclined surfaces a11 to a15, and when the total reflection angle is smaller than the critical angle, the light is emitted from the light emission surface S2. Moreover, the heights H of the convex sections 31L$_1$ to 31L$_5$ are configured so as to gradually increase with increasing distance from the light source 10L; therefore, the emission amount from the light emission surface S2 is larger on a side farther from the light source 10L. Therefore, a nonuniform light emission intensity distribution in which light emission intensity is lower and higher at places closer to and farther from the light source 10L, respectively, is formed by lighting of the light source 10L. On the other hand, likewise, in a process of incident light from the light source 10R propagating through the light guide plate 3a toward the light source 10L, the light guide angle gradually increases with each reflection from the inclined surfaces a21 to a25, and when the total reflection angle is smaller than the critical angle, the incident light is emitted from the light emission surface S2. Moreover, the heights H of the convex sections $31R_1$ to $31R_5$ are configured so as to gradually increase with increasing distance from the light source 10R; therefore, the emission amount from the light emission surface S2 is larger on a side farther from the light source 10R. Therefore, a nonuniform light emission intensity distribution in which light emission intensity is lower and higher at places closer to and farther from the light source 10R, respectively, is formed by lighting of the light source 10R.

Moreover, when the conditional expression (1) is satisfied, in the case where the light source 10L illuminates, light propagating through the light guide plate 3a preferentially enters inclined surfaces facing the light source 10L, that is, the inclined surfaces a11 to a15 of the convex sections $31L_1$ to $31L_5$ and the inclined surfaces b21 to b25 of the convex section $31R_1$ to $31R_5$. It is because for light propagating from the light source 10L, the inclined surfaces b11 to b15 of the convex sections $31L_1$ to $31L_5$ and the inclined surfaces a21 to a25 of the convex sections $31R_1$ to $31R_5$ are hidden behind the reflection surface S1. Therefore, the larger the inclined angles α of the concave sections $31L_1$ to $31L_5$ are, the more the increment of the light guide angle by each reflection from the inclined surfaces a11 to a15 increases, and as a result, a light emission amount at that point increases. Therefore, the light emission intensity distribution by lighting of the light source 10L is easily adjusted. Moreover, the smaller the inclined angles β of the convex sections $31R_1$ to $31R_5$ are, the more the increment of the light guide angle by each reflection from the inclined surfaces b21 to b25 decreases, and as a result, a light emission amount at that point decreases. Therefore, the influence of the light guide control section 31R on the light emission intensity distribution formed by the light source 10L and the light guide control section 31L is reduced.

The same applies to the case where the light source 10R illuminates, and light propagating through the light guide plate 3a preferentially enters the inclined surfaces b11 to b15 of the convex sections $31L_1$ to $31L_5$ and the inclined surfaces a21 to a25 of the convex section $31R_1$ to $31R_5$. It is because for the light propagating from the light source 10R, the inclined surfaces a11 to a15 of the convex sections $31L_1$ to $31L_5$ and the inclined surfaces b21 to b25 of the convex sections $31R_1$ to $31R_5$ are hidden behind the reflection surface S1. Therefore, the smaller the inclined angles β of the convex sections $31L_1$ to $31L_5$ are, the more the increment of the light guide angle by each reflection from the inclined surfaces b11 to b 15 decreases, and as a result, a light emission amount at that point decreases. Therefore, the influence of the light guide control section 31L on the light emission intensity distribution formed by the light source 10R and the light guide control section 31R is reduced. Moreover, the larger the inclined angles α of the convex sections $31R_1$ to $31R_5$ are, the more the increment of the light guide angle by each reflection from the inclined surfaces a21 to a25 increases, and as a result, a light emission amount at that point increases. Therefore, the light emission intensity distribution by lighting of the light source 10R is easily adjusted.

As described above, as long as the light guide control section arranged on the reflection surface S1 of the light guide plate 3a is configured of sections with a shape having inclined surfaces a and b specified by the inclined angles α and β, the shape is not limited to a concave shape, and may be a convex shape. Even in such a case, the same effects as those of the surface light source device 1 of the above-described embodiment are allowed to be obtained.

Modification Example 6

Figure 13:
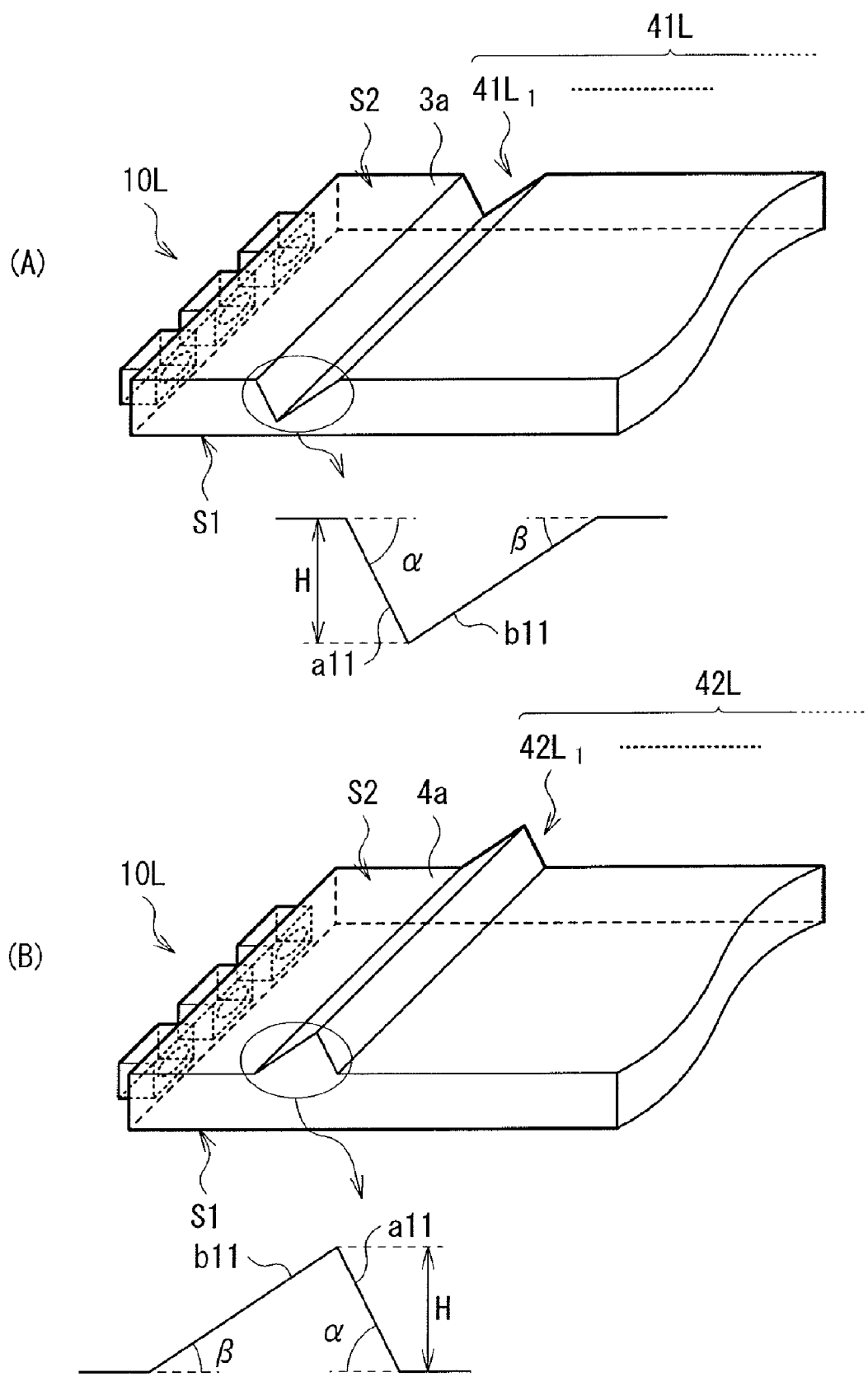
FIG. 13 is a conceptual diagram for describing a configuration of a surface light source device according to Modification Example 6.

FIGS. 13(A) and (B) illustrate a configuration of a part on a side closer to the light source 10L of a surface light source device according to Modification Example 6. The modification example has the same configuration as that of the surface light source device 1 of the above-described embodiment, except that a light guide control section is arranged on a light emission surface S2 of a light guide plate 4a. As illustrated in FIG. 13(A), a light guide control section 41L configured of a plurality of concave sections $41L_1$, . . . may be arranged on the light emission surface S2. Alternatively, as illustrated in FIG. 13(B), a light guide control section 42L configured of a plurality of convex sections $42L_1$, . . . may be arranged on the light emission surface S2. The same applies to a configuration of a part on a side closer to the light source 10R. Moreover, a nonuniform light emission intensity distribution may be formed by changing the heights of the concave sections or the convex sections or by changing intervals between the concave sections or the convex sections. Alternatively, a nonuniform light emission intensity distribution may be formed by changing both of the heights and the intervals. Even in the case where the light guide control section is arranged on the light emission surface S2 in such a manner, when the inclined surface a11 facing the light source 10L and the inclined surface b11 facing the light source 10R (not illustrated in FIG. 13(A)) are formed at the inclined angle α and the inclined angle β, respectively, and the above-described conditional expression (1) is satisfied, the same effects as those of the surface light source device 1 of the above-described first embodiment are obtainable.

Modification Example 7

Figure 14:
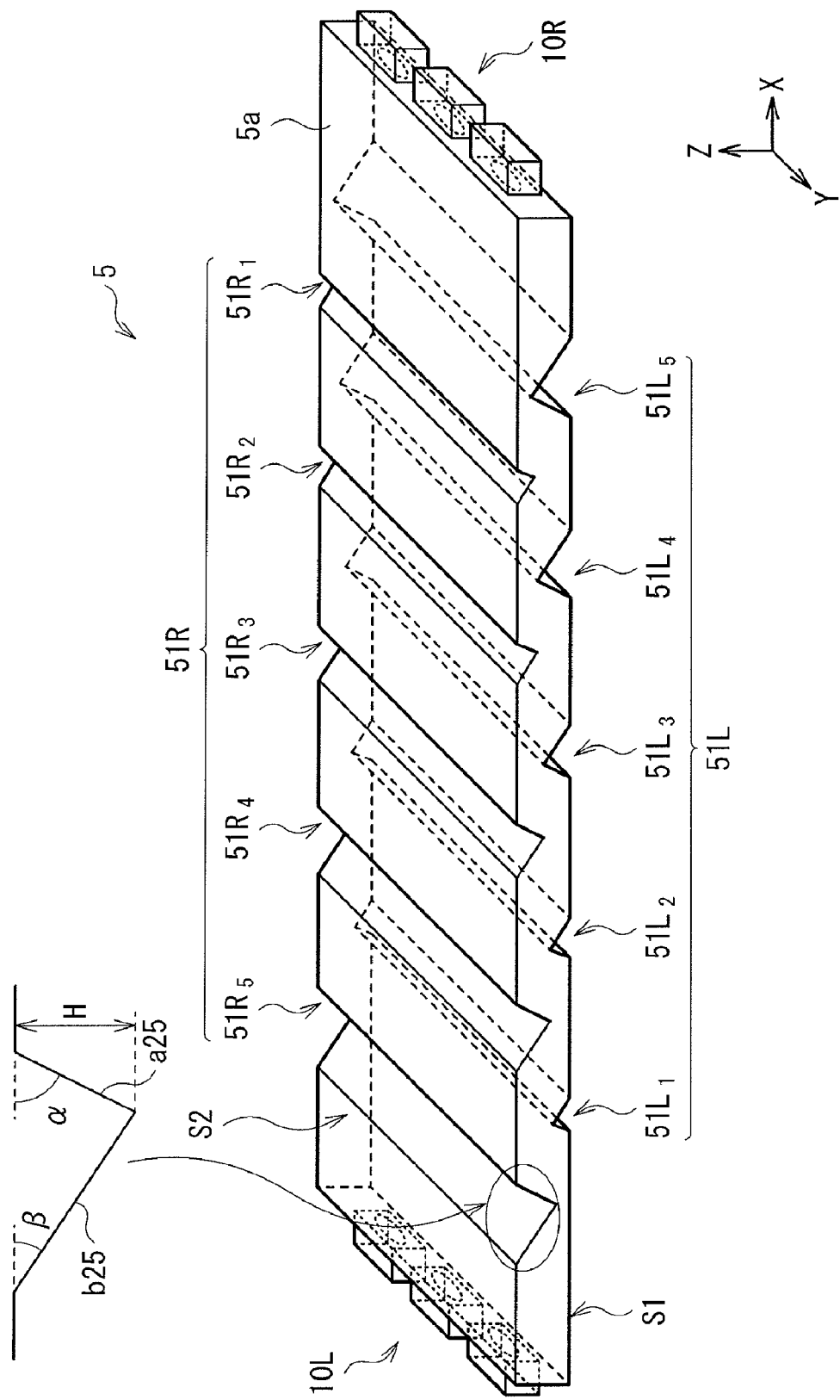
FIG. 14 is a perspective view illustrating a schematic configuration of a surface light source device according to Modification Example 7.

FIG. 14 is a perspective view illustrating a schematic configuration of a surface light source device 5 according to Modification Example 7. The surface light source device 5 according to the modification example has the same configuration as that of the surface light source device 1 of the above-described embodiment, except that a light guide control section 51L and a light guide control section 51R are arranged on a reflection surface S1 and a light emission surface S2 of a light guide plate 5a, respectively. The light guide control section 51L is configured of a plurality (five in the modification example) of concave sections $51L_1$ to $51L_5$, and the concave sections $51L_1$ to $51L_5$ have the same configurations as those of the concave sections $11L_1$ to $11L_5$ of the light guide control section 11L of the above-described surface light source device 1. On the other hand, the light guide control section 51R is configured of a plurality (five in the modification example) of concave sections $51R_1$ to $51R_5$. In the concave sections $51R_1$ to $51R_5$, inclined surfaces a21 to a25 at the inclined angle α are arranged so as to face the light source 10R, and inclined surfaces b21 to b25 at the inclined angle β are arranged so as to face the light source 10L.

As described above, the light guide control sections 51L and 51R may be arranged on the reflection surface S1 and the light emission surface S2, respectively, which are different from each other. Even in such a configuration, the same effects as those of the surface light source device 1 of the above-described embodiment are obtainable.

In the modification example, the light guide control section configured of sections with a concave shape is used; however, as in the case of the above-described Modification Example 5, a light guide control section configured of sections with a convex shape may be used. Moreover, a light guide control section configured of sections with a concave shape may be arranged on one of the light emission surface S2 and the reflection surface S1, and a light guide control section configured of sections with a convex shape may be arranged on the other.

Modification Examples 8 and 9

Figure 15:
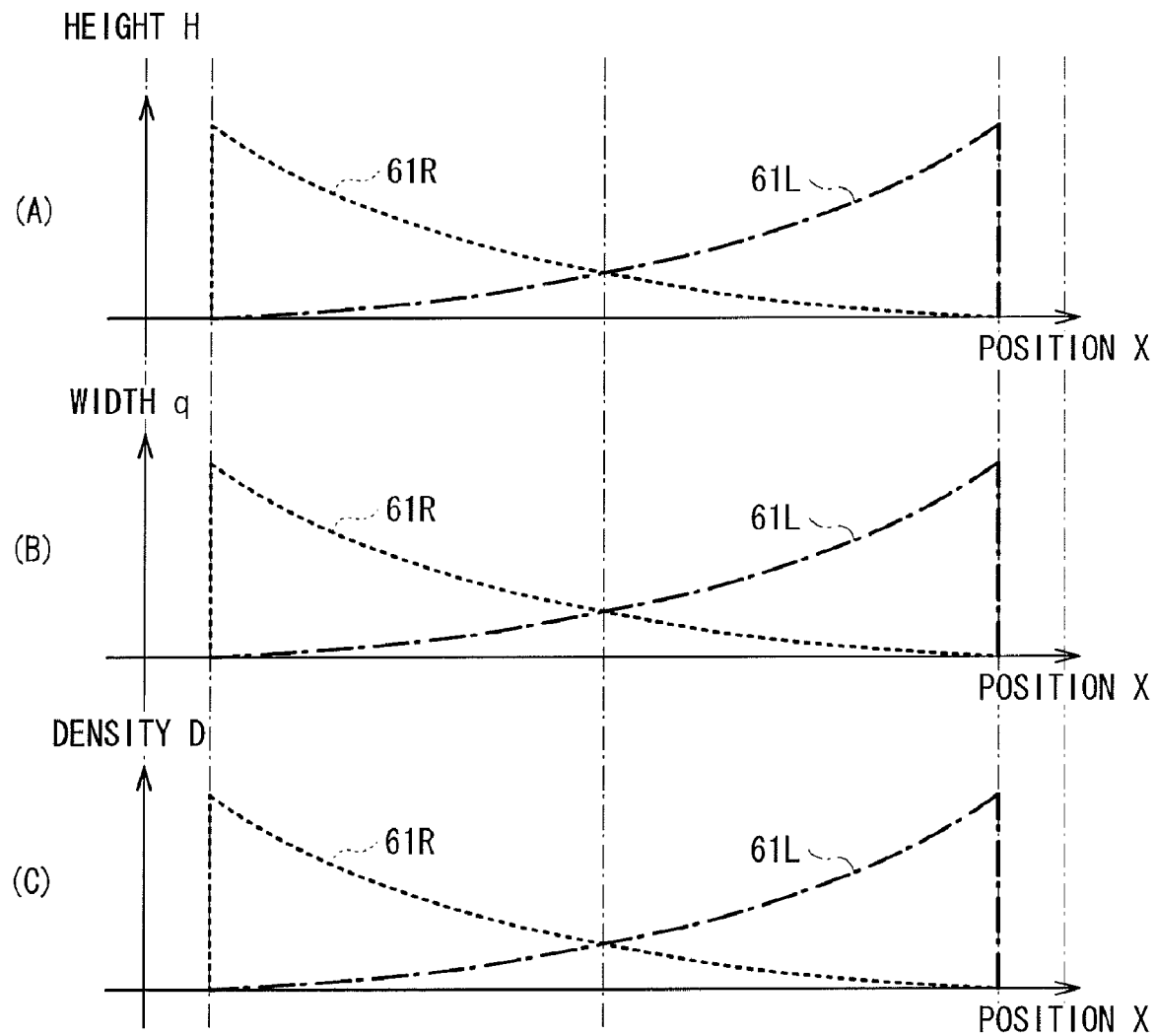
FIG. 15 illustrates a configuration of a backlight according to Application Example 1.
Figure 16:
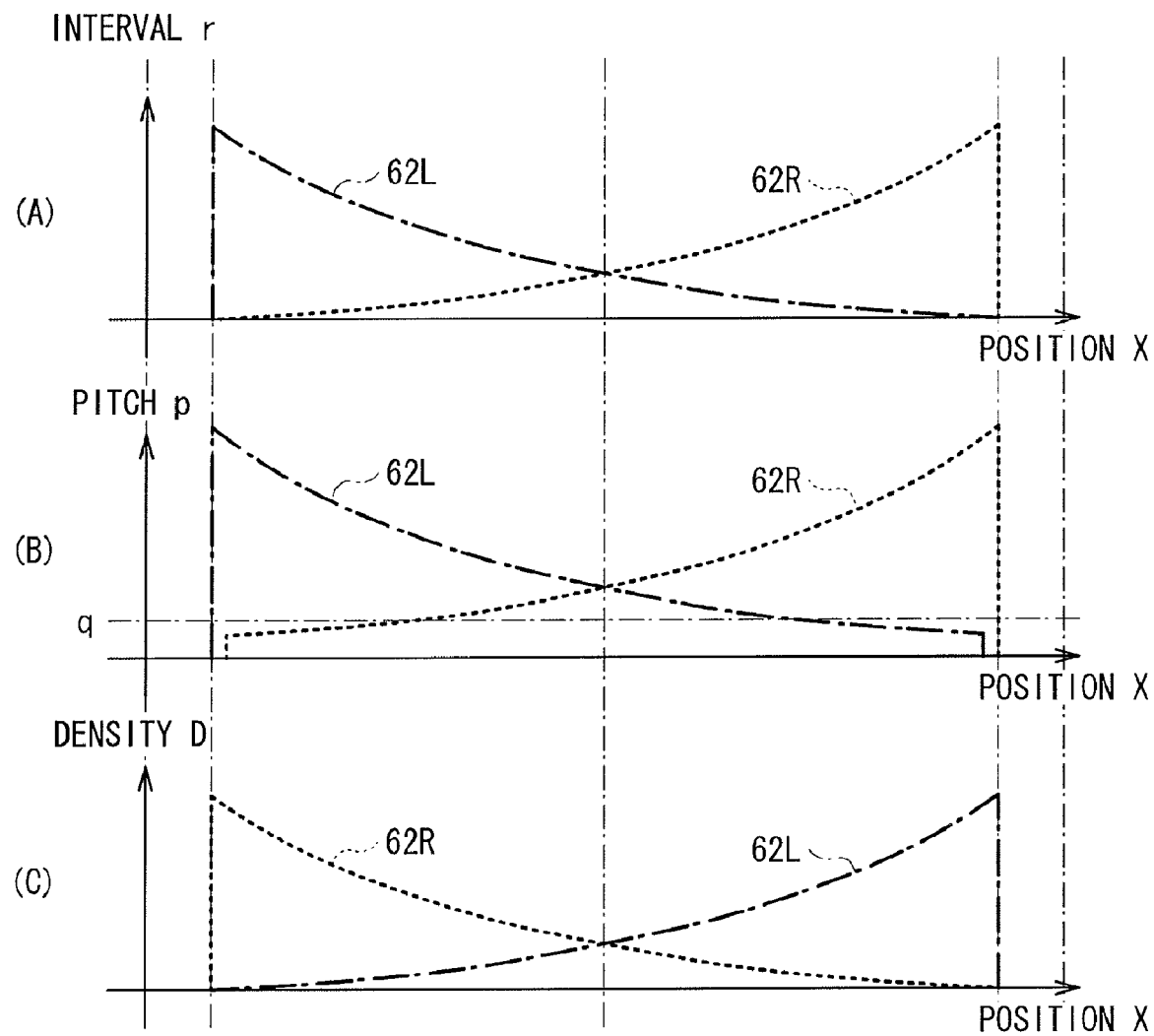
FIG. 16 is an example of a light emission intensity distribution obtained by the backlight illustrated in FIG. 15.

FIGS. 15(A) to (C) illustrate changes in heights H, widths q and density D of the light guide control sections 61L and 61R in a surface light source device according to Modification Example 8. FIGS. 16(A) to (C) illustrate changes in intervals r, pitches p and density D of light guide control sections 62L and 62R in a surface light source device according to Modification Example 9. Changes in the heights H, the widths q and the density D of the light guide control sections 61L and 61R or changes in the intervals r, the pitches p and the density D of the light guide control section 62L and 62R are not limited to the above-described linear changes, and may be curved changes. Thus, a light emission intensity distribution in which the light emission intensity is higher at a place farther from a light source is easily formed.

Application Example 1

Figure 17:
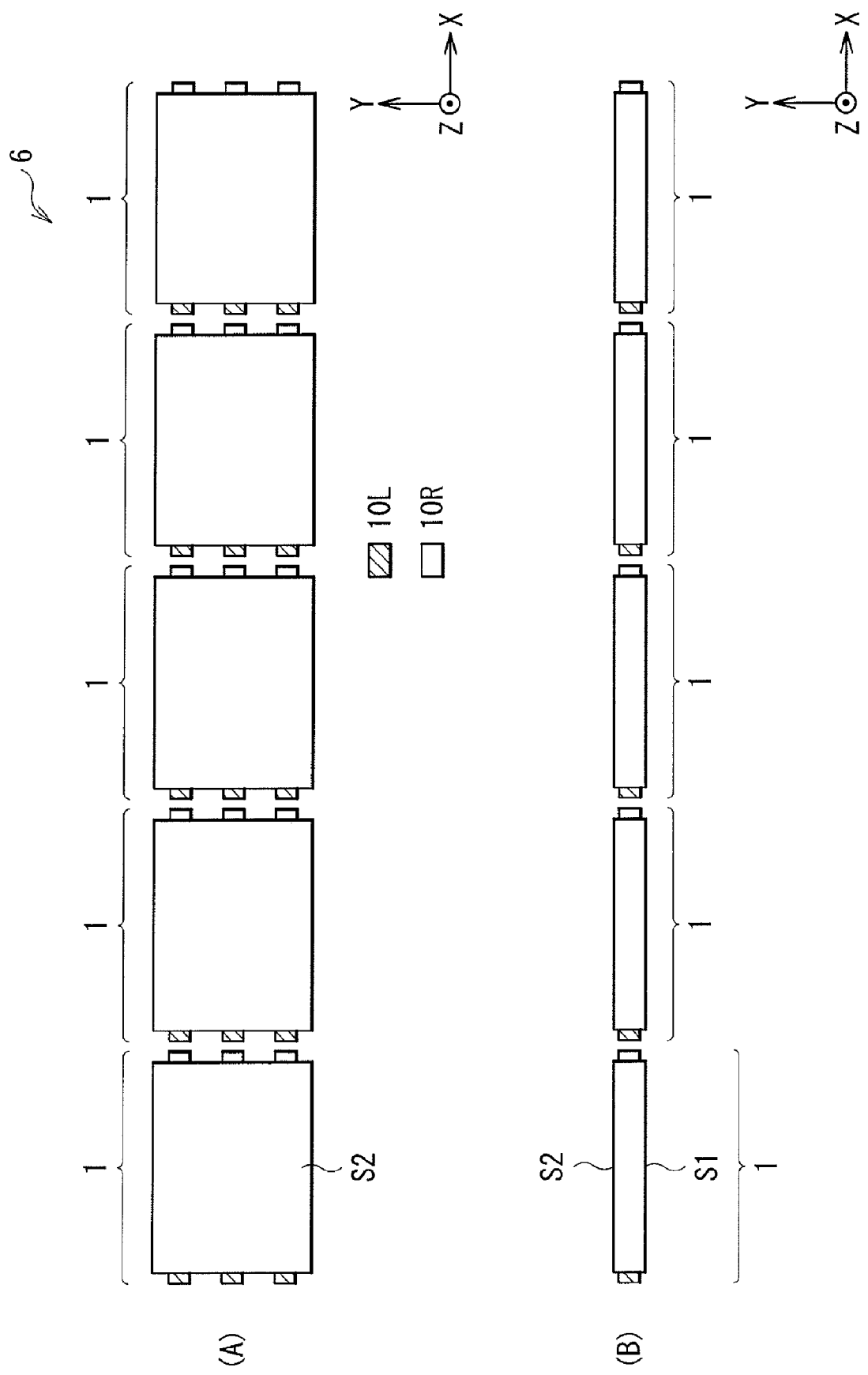
FIG. 17 is a perspective view illustrating a configuration of a main part of a display according to Application Example 2.

Next, a backlight 6 used for a display or the like will be described below as an application example of the above-described surface light source device 1. FIG. 17(A) is a top view of the backlight 6, and FIG. 17(B) is a side view of the backlight 6. The backlight 6 is configured, for example, by arranging a plurality of surface light source devices 1 so that a side surface on which the light sources 10L are arranged of one surface light source device 1 and a side surface on which the light sources 10R are arranged of another surface light source device 1 face each other.

When a plurality of the above-described surface light source devices 1 are arranged in such a manner, a display allowed to partially drive each surface light source device 1 as a partial lighting region is achievable.

Figure 18:
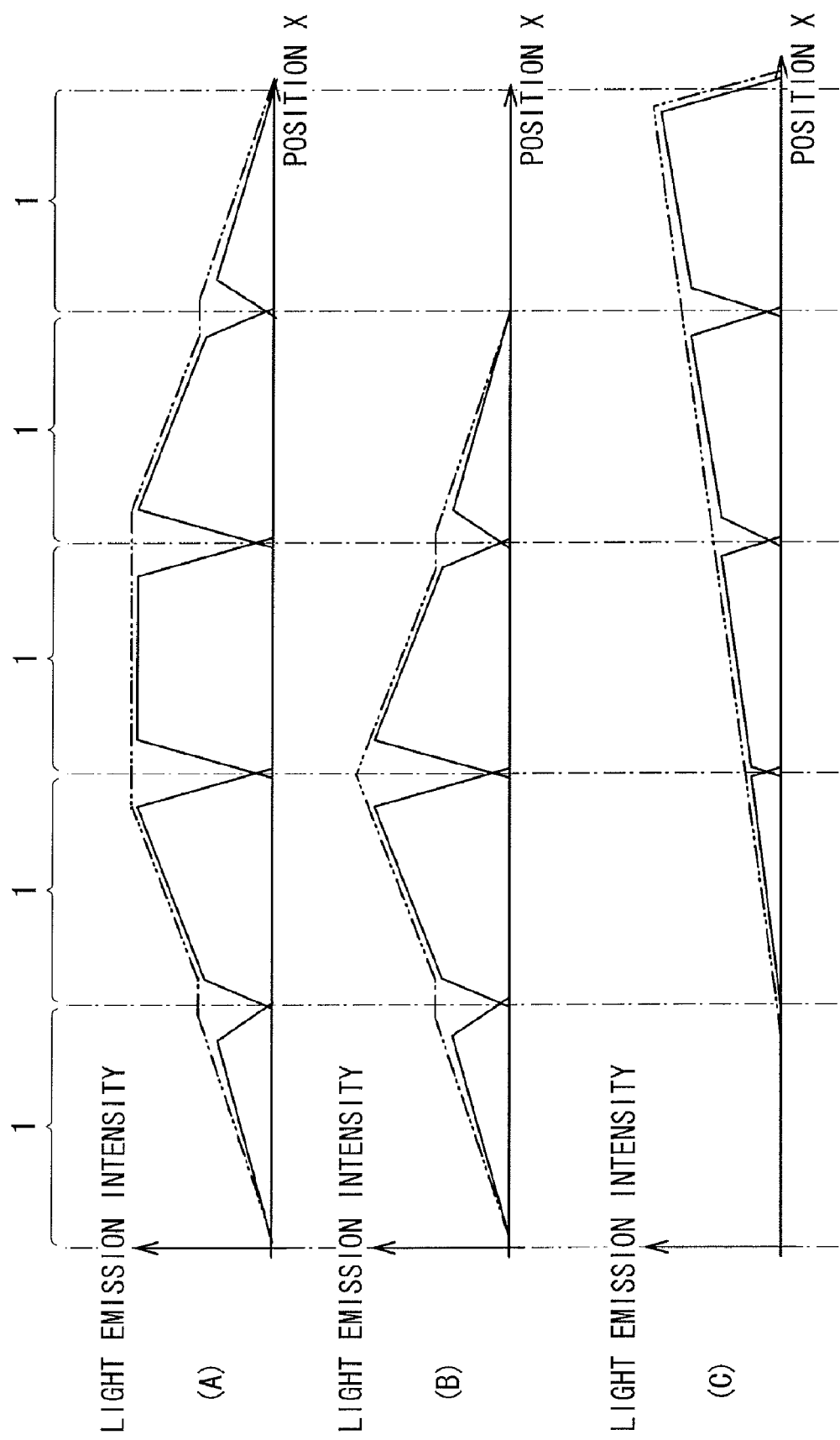
FIG. 18 is a perspective view for describing an example of an arrangement relationship between a picture display region and a partial lighting region.

For example, FIGS. 18(A) to (C) illustrate examples of a light emission intensity distribution formed with use of five surface light source devices 1. As described above, when the surface light source devices 1 are formed so that the light emission intensity of the light source 10L and the light emission intensity of the light source 10R are different from each other or so that the height distributions of the light guide control sections 11L and 11R are not centrally symmetrical to each other, an arbitrary continuous light emission intensity distribution as the whole light guide plate 1a is allowed to be formed. Therefore, as illustrated in FIGS. 18(A) to (C), the emission intensity is allowed to be gently changed around boundaries between a plurality of surface light source devices 1. Thus, boundaries between partial lighting regions are allowed to look natural.

In addition, a reflection sheet may be arranged on the reflection surface S1 of the surface light source device 1, and various optical sheets may be arranged on the light emission surface S2 of the surface light source device 1. For example, as the reflection sheet, a white PET sheet, a diffuse reflection sheet, a silver sheet, an ESR film or the like may be used. Moreover, as the optical sheets, a diffuser sheet, a diffuser plate, a prism sheet, a lens sheet, a brightness enhancement film, a polarizing plate or the like may be used.

Moreover, an optical member may be arranged around boundary sections between the surface light source devices 1. The optical member is configured of the above-described optical sheet, or a material such as a reflective material or a diffusion material. The optical member is provided to improve optical characteristics or an appearance in boundaries between the surface light source devices 1, and is arbitrarily arranged.

Application Example 2

Figure 19:
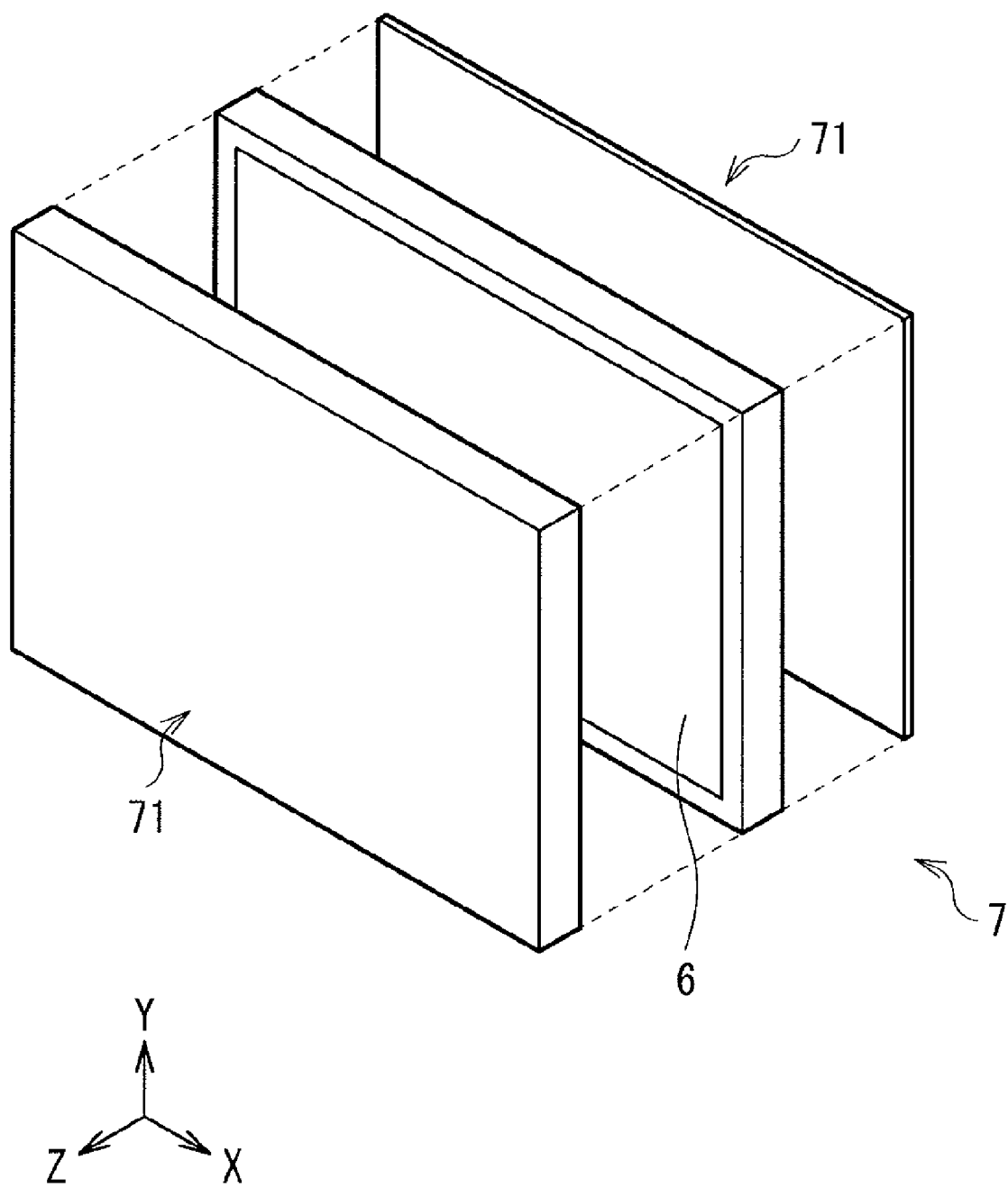
FIG. 19 is a perspective view illustrating a configuration of a main part of the display according to Application Example 2.

FIG. 19 is a perspective view illustrating a configuration of a main part of a display 7 including the backlight 6 of the above-described Application Example 1. The display 7 includes the backlight 6 configured of a plurality of surface light source devices 1, a display panel 70 and a circuit section 71 for controlling each surface light source device 1 and the display panel 70. The display panel 70 displays an image by modulating illumination light (emission light Lout) from the backlight 6 based on an image signal, and, for example, a liquid crystal panel is used as the display panel 70.

In the display 7, as the backlight 6 configured of a plurality of surface light source devices 1 is arranged, as described above, boundaries between partial lighting regions look natural. Therefore, display image quality is allowed to be improved.

Figure 20:
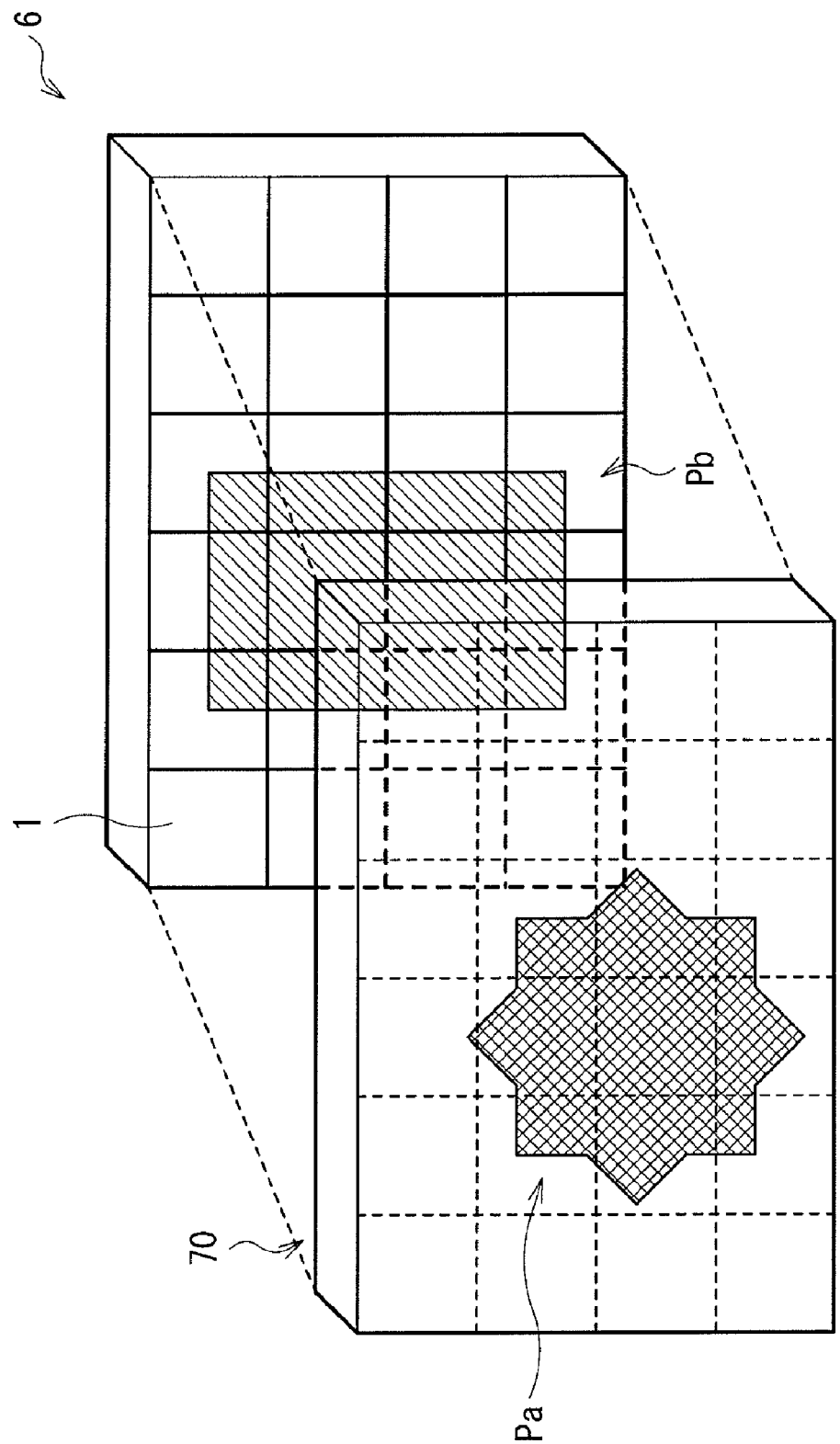
FIG. 20 is a perspective view for describing an example of an arrangement relationship between a picture display region and a partial lighting region.

Moreover, for example, as illustrated in FIG. 20, a partial lighting region Pb, in which only the surface light source devices 1 in a region corresponding to an image display region (a region where a display picture Pa is displayed) with predetermined luminance or higher of an image display region in the display panel 70 illuminate, is allowed to be formed. In the case where the display 7 is configured in such a manner, light emission control (adjustment of light emission intensity) according to the brightness of an image is allowed, and contrast between brightness and darkness in a display screen is allowed to be improved.

Second Embodiment

Figure 22:
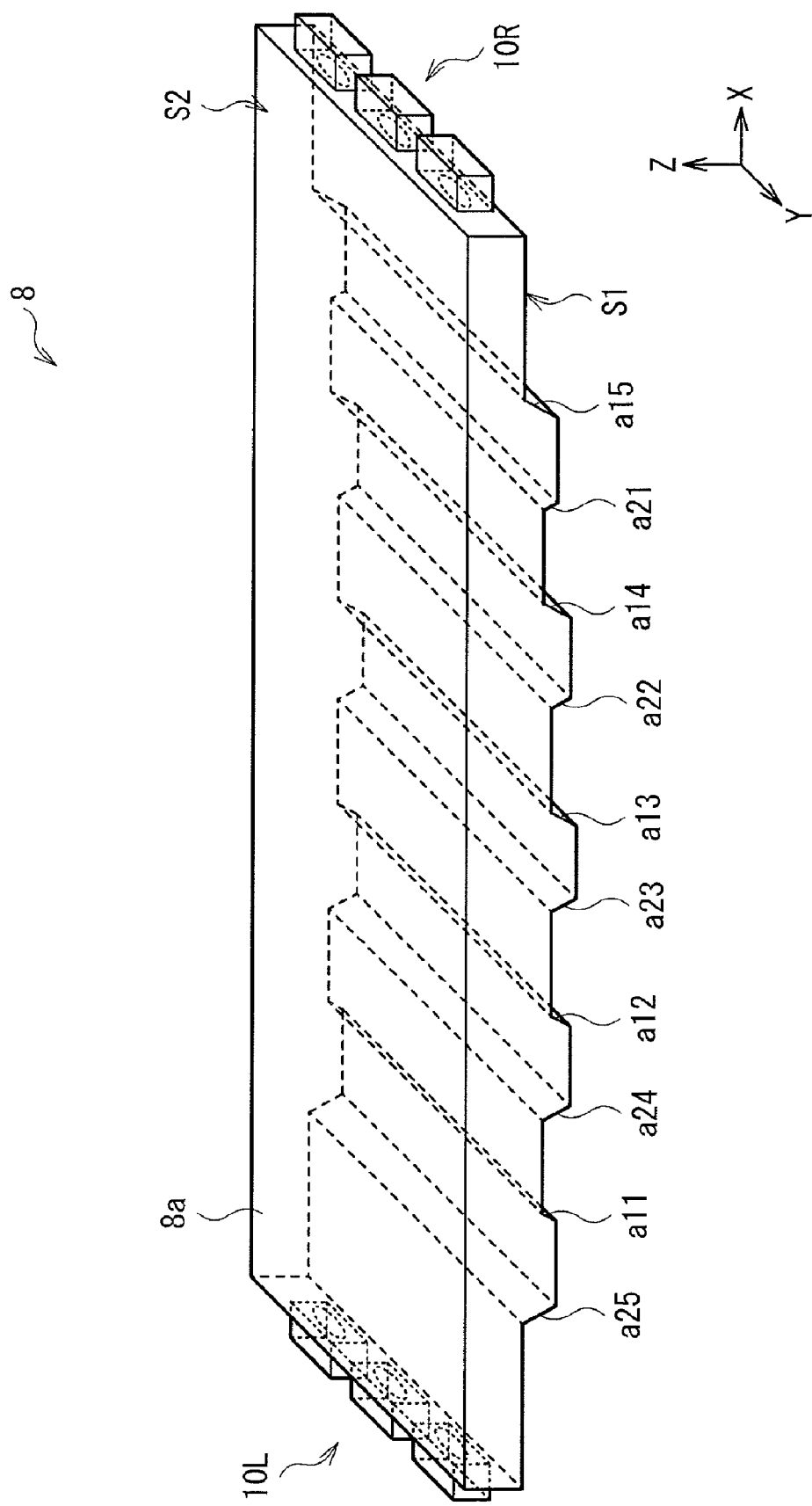
FIG. 22 is a perspective view illustrating a schematic configuration of a surface light source device according to a second embodiment.

FIG. 22 is a perspective view illustrating a configuration of a main part of a surface light source device (a surface light source device 8) according to a second embodiment. As in the case of the surface light source device 1 of the above-described first embodiment, for example, an arrangement of a plurality of the surface light source devices 8 is used as a backlight for a liquid crystal display or the like, and the surface light source device 8 configures a partial lighting region in partial driving. Like components are denoted by like numerals as of the above-described first embodiment, and will not be further described.

As in the case of the surface light source device 1 of the above-described first embodiment, the surface light source device 8 is configured, for example, by arranging the light source 10L and the light source 10R on a pair of facing side surfaces, respectively, along an x direction of a flat light guide plate 8a. Moreover, as in the case of the surface light source device 1 of the above-described first embodiment, the light guide plate 8a includes a reflection surface S1 and a light emission surface S2, and inclined surfaces a11 to a15 and inclined surfaces a21 to a25 are arranged on the reflection surface S1. In the following description, as each inclined surface and its inclined angle in the embodiment, for the sake of convenience, the same inclined surface and the same inclined angle as those in the above-described first embodiment are used. However, the inclined angles in the above-described first embodiment and the present embodiment are set independently.

Figure 23:
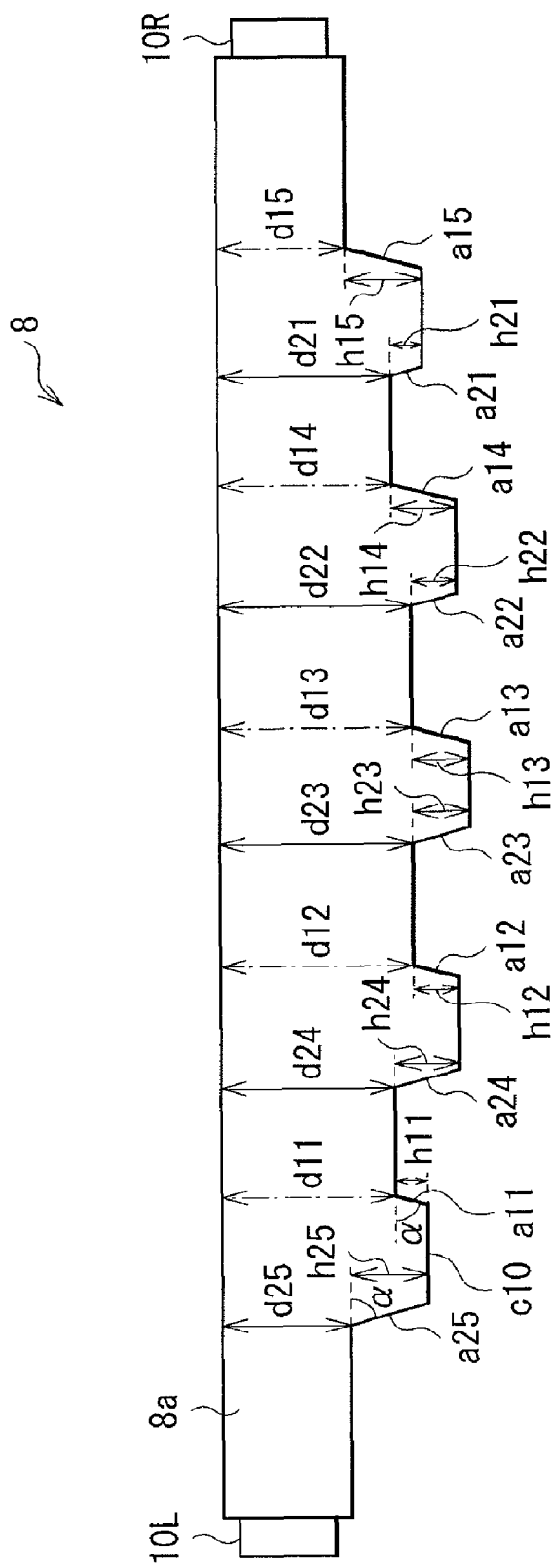
FIG. 23 is a diagram for describing a change in height and a change in height difference of the surface light source device illustrated in FIG. 22.

As in the case of the light guide plate 1a of the above-described first embodiment, the light guide plate 8a is an optical member for allowing light from the light sources 10L and 10R to propagate therethrough to the light emission surface S2. However, in the embodiment, the surface shape of the reflection surface S1 is different from that of the light guide plate 1a of the above-described first embodiment. The surface shape of the reflection surface S1 will be described below referring to FIG. 23. FIG. 23 is a diagram for describing changes in heights and height differences of inclined surfaces in the surface light source device 8.

As illustrated in FIG. 23, the reflection surface S1 in the light guide plate 8a is configured of inclined surfaces a11 to a15 facing the light source 10L, inclined surfaces a21 to a25 facing the light source 10R and flat surfaces c10 connecting these inclined surfaces. The inclined surfaces a11 to a15 are inclined surfaces at a predetermined inclined angle (an inclined angle α in the embodiment), and the heights of the inclined surfaces a11 to a15 increase with increasing distance from the light source 10L (for example, h11<h12<h13<h14<h15). Likewise, the inclined surfaces a21 to a25 are inclined surfaces at a predetermined inclined angle (the inclined angle α in the embodiment), and the heights of the inclined surfaces a21 to a25 increase with increasing distance with the light source 10R (for example, h21<h22<h23<h24<h25). In other words, the following conditional expression (6) is established where the height of an nth inclined surface $an_L$ from a side closer to the light source 10L is $h_L(n)$. Likewise, the following conditional expression (7) is established where the height of an nth inclined surface $an_R$ on a side closer to the light source 10R is $h_R(n)$.

$$h_L(n) \leq h_L(n+1) \quad (6)$$

$$h_R(n) \leq h_R(n+1) \quad (7)$$

Moreover, in the reflection surface S1 of the light guide plate 8a, height differences between the inclined surfaces a11 to a15 and the light emission surface S2 (d11 to d15, hereinafter simply referred to as "height differences") are changed between a pair of side surfaces on which the light sources 10L and 10R are arranged. Likewise, in the reflection surface S1, height differences (d21 to d25) from the inclined surfaces a21 to a25 to the light emission surface S2 are changed. For example, the height differences are changed so that the height differences around the center of the light guide plate 8a (more specifically, d12, d13, d22 and d23) are relatively large and the height differences gradually decrease with decreasing distance from ends of the light guide plate 8a. Moreover, the heights and the height differences are changed so as to be, for example, centrally symmetrical between the pair of side surfaces. The reflection surface S1 of the light guide plate 8a microscopically has a convex shape by the changes in heights and height differences of such inclined surfaces a11 to a15 and a21 to a25. Further, unlike the above-described first embodiment, in the reflection surface S1 of the light guide plate 8a, the inclined surfaces b11 to b15 and b21 to b25 are not arranged. In other words, the surface shape of the reflection surface S1 of the light guide plate 8a is equivalent to a surface shape in the case where the inclined angle β in the light guide plate 1a of the above-described first embodiment is 0°.

Next, functions and effects of the embodiment will be described below.

In the surface light source device 8, as in the case of the above-described first embodiment, light enters the light guide plate 8a from each of the light sources 10L and 10R by lighting of the light sources 10L and 10R. Each light entering the light guide plate 8a propagates through the light guide plate 8a, and then is emitted from the light emission surface S2 to perform surface light emission.

At this time, as the inclined surfaces a11 to a15 and a21 to a25 are arranged on the reflection surface S1, as in the case of the above-described first embodiment, light from the light source 10L and light from the light source 10R are selectively reflected from the inclined surfaces a11 to a15 and the inclined surfaces a21 to a25, respectively. Moreover, as the heights h11 to h15 of the inclined surfaces a11 to a15 increase with increasing distance from the light source 10L, at this time, the emission amount from the light emission surface S2 increases on a side farther from the light source 10L. Likewise, as the heights h21 to h25 of the inclined surfaces a21 to a25 increase with increasing distance from the light source 10R, the emission amount from the light emission surface S2 increases on a side farther from the light source 10R. Therefore, as in the case of the above-described first embodiment, a nonuniform light emission intensity distribution by lighting of the light source 10L and a nonuniform light emission intensity distribution by lighting of the light source 10R are formed independently.

Figure 24:
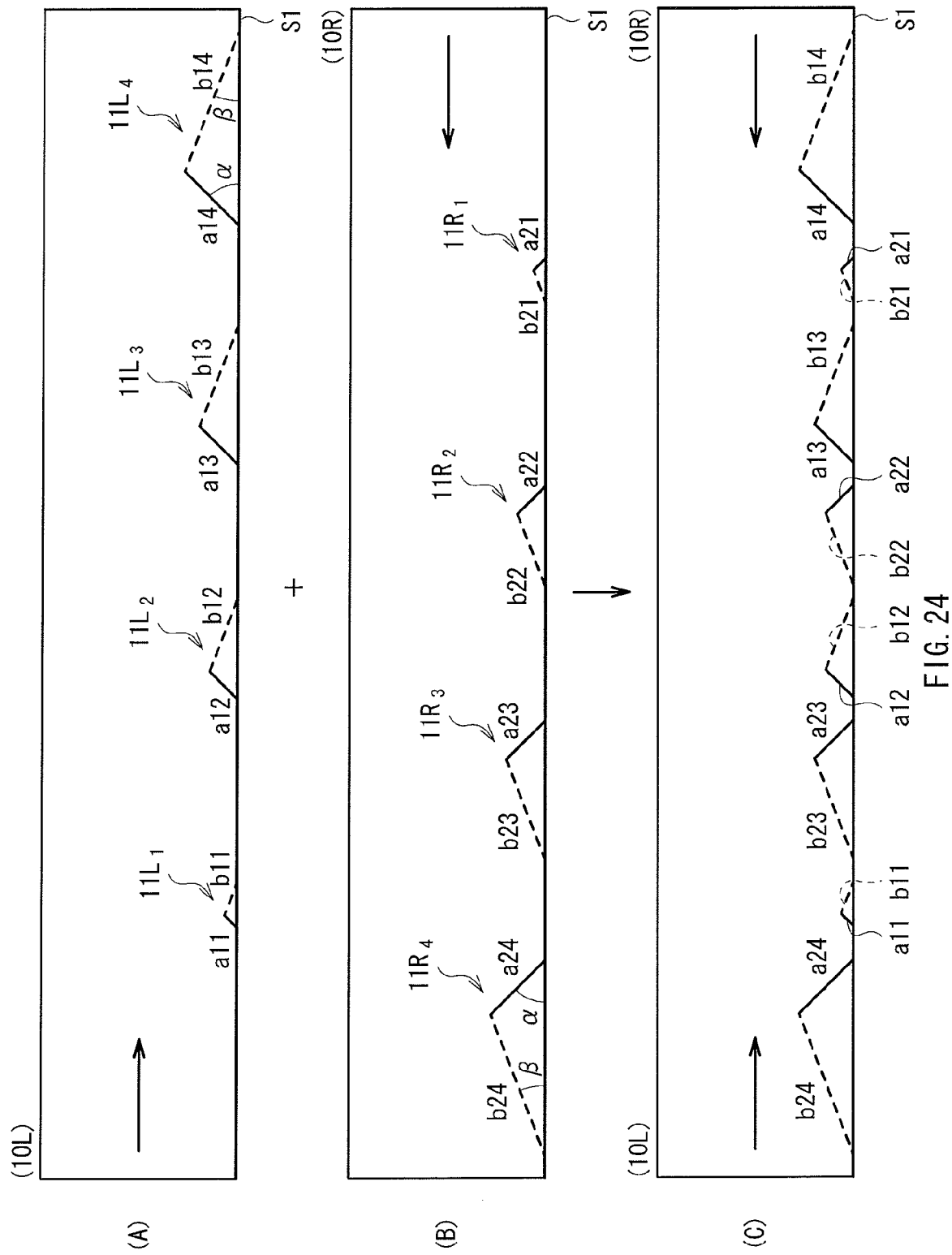
FIG. 24 is a conceptual diagram for describing a surface shape in the surface light source device illustrated in FIG. 1.
Figure 25:
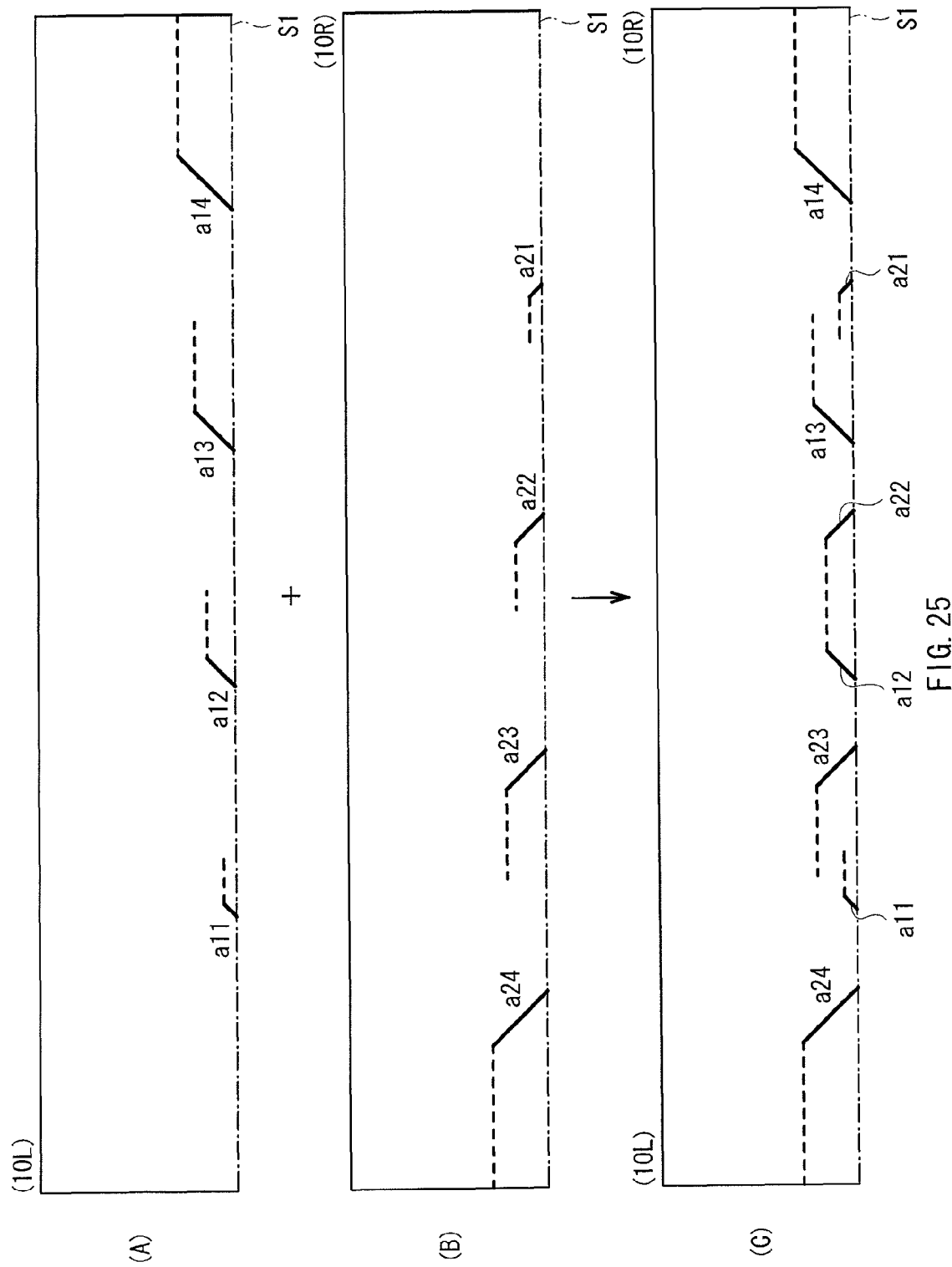
FIG. 25 is a conceptual diagram illustrating a surface shape design process in the surface light source device illustrated in FIG. 22.
Figure 26:
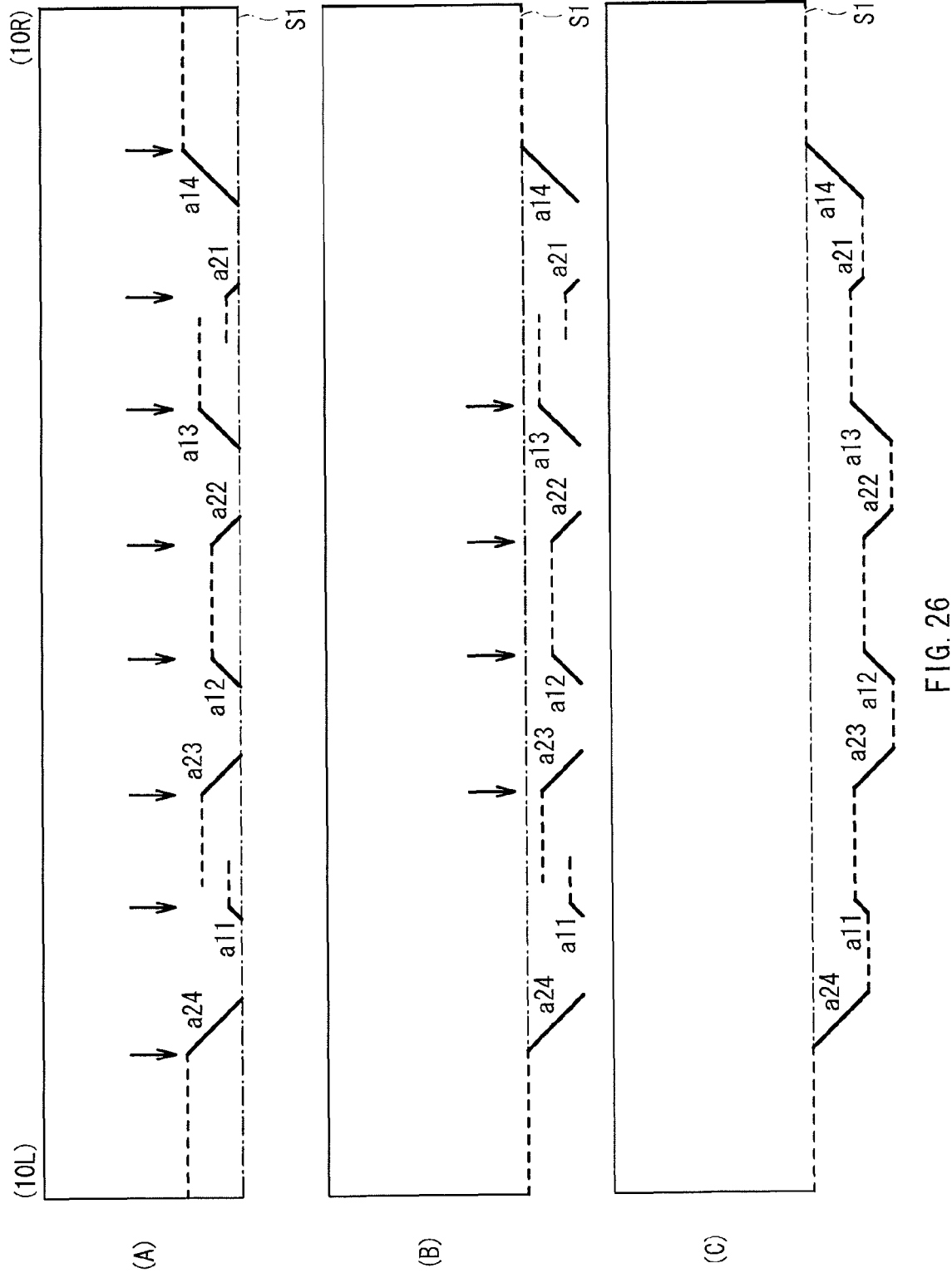
FIG. 26 is a conceptual diagram illustrating a design process following FIG. 25.

In the embodiment, in the light guide plate 8a, the height differences (d11 to d15 and d21 to d25) of the inclined surfaces a11 to a15 and a21 to a25 are changed, and the surface shape of the reflection surface S1 is designed by the height differences. A process of designing such a surface shape will be described below referring to FIGS. 24 to 26. FIGS. 24(A) to (C) are conceptual diagrams for describing the surface shape in the light guide plate 1a according to the above-described first embodiment. FIGS. 25(A) to (C) are conceptual diagrams illustrating the process of designing the surface shape in the light guide plate 8a. FIGS. 26(A) to (C) are conceptual diagrams illustrating a designing process following FIG. 25. For the sake of simplicity and convenience, description will be given referring to, as an example, the case where four inclined surfaces (a11 to a14 and a21 to a24) as inclined surfaces facing each of the light sources are combined.

First, as a comparative example to the embodiment, the surface shape of the light guide plate 1a according to the above-described first embodiment will be described below. In the above-described first embodiment, a light emission intensity distribution by light from the light source 10L is controlled by concave sections $11L_1$ to $11L_4$ (refer to FIG. 24(A)), and a light emission intensity distribution by light from the light source 10R is controlled by concave sections $11R_1$ to $11R_4$ (refer to FIG. 24(B)). The concave sections $11L_1$ to $11L_4$ and the concave sections $11R_1$ to $11R_4$ are superimposed on one another to form the shape of the reflection surface S1 (FIG. 24(C)). Then, at this time, the inclined angles β of the inclined surfaces b11 to b14 and b21 to b24 are smaller than the inclined angles α of the inclined surfaces a11 to a14 and a21 to a24; therefore, the influence of light from the light source 10R in FIG. 24(A) and the influence of light from the light source 10L in FIG. 24(B) are reduced.

As previously mentioned, to minimize the influence of the inclined surfaces b11 to b14 on the light emission intensity distribution by lighting of the light source 10R and the influence of the inclined surfaces b21 to b24 on the light emission intensity distribution by lighting of the light source 10L, it is desirable that the inclined angles β thereof are as small as possible. However, when the inclined angle β is too small (for example, β=0°), interference occurs between adjacent concave sections. Therefore, it is desirable to achieve a surface shape more easily reducing influence caused by the inclined surfaces b11 to b14 and b21 to b24.

Therefore, in the embodiment, a combination of the inclined surfaces a11 to a14 (refer to FIG. 25(A)) and the inclined surfaces a21 to a24 (refer to FIG. 25(B)) which substantially contribute to the formation of a light emission intensity distribution is considered. When the inclined surfaces a11 to a14 and the inclined surfaces a21 to a24 are superimposed on one another without change, a configuration illustrated in FIG. 25(C) is formed.

To make such a configuration implementable as the surface shape of the reflection surface S1, as illustrated in FIGS. 26(A) and 26(B), the positions of the inclined surfaces a11 to a14 and a21 to a24 are aligned. More specifically, the positions of the inclined surfaces a11 to a14 and a21 to a24 are shifted so that adjacent inclined surfaces are connected by the flat surfaces c10. Therefore, the surface shape of the reflection surface S1 as illustrated in FIG. 26(C) are obtained consequently. Specifically, a surface shape without the inclined surfaces b11 to b14 and b21 to b24, in other words, a surface shape in which the inclined angle β is 0° is achieved. Therefore, when the light source 10L illuminates, the light emission amount is independently adjusted by the inclined surfaces a11 to a15, and when the light source 10R illuminates, the light emission amount is independently adjusted by the inclined surfaces a21 to a25.

As described above, in the embodiment, as the inclined surfaces a11 to a15 facing the light source 10L and the inclined surfaces a21 to a25 facing the light source 10R are arranged on the reflection surface S1 of the light guide plate 8a, each light from the light source 10L and the light source 10R arranged on the pair of side surfaces of the light guide plate 8a is controllable. At this time, the heights of the inclined surfaces a11 to a15 increase with increasing distance from the light source 10L, so a nonuniform light emission intensity distribution in which light emission intensity is lower and higher at places closer to and farther from the light source 10L is allowed to be formed. On the other hand, the heights of the inclined surfaces a21 to a25 increase with increasing distance from the light source 10R, so a nonuniform light emission intensity distribution in which light emission intensity is lower and higher at places closer to and farther from the light source 10R is allowed to be formed. Therefore, the nonuniform light emission intensity distributions by lighting of the light sources 10L and 10R are allowed to be formed independently. Accordingly, the same effects as those of the above-described first embodiment are obtainable.

Moreover, in the embodiment, the reflection surface S1 has a surface shape in which the height differences of the inclined surfaces a11 to a15 and a21 to a25 are changed, that is, a surface shape in which the inclined surfaces a11 to a15 and a21 to a25 substantially contributing to the formation of the light emission intensity distributions are effectively arranged. As such a surface shape is equivalent to a surface shape in which the inclined angles β of the inclined surfaces b11 to b15 and b21 to b25 in the above-described first embodiment are 0°, the nonuniform light emission intensity distributions by lighting of the light sources 10L and 10R are independently formed more easily than in the above-described first embodiment.

Next, modification examples (Modification Examples 10 and 11) of the above-described second embodiment will be described below. Like components are denoted by like numerals as of the surface light source devices 1 and 8 of the above-described first and second embodiments, and will not be further described.

Modification Example 10

Figure 27:
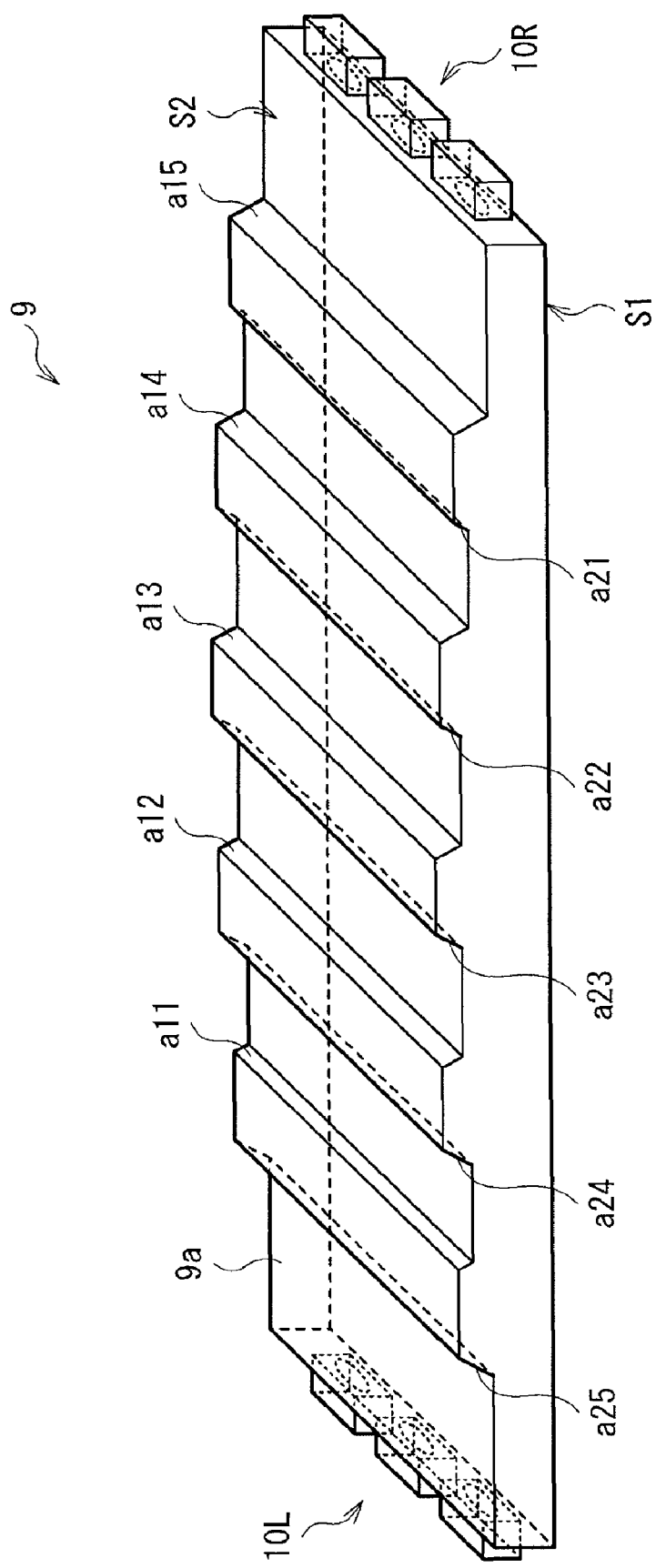
FIG. 27 is a perspective view illustrating a schematic configuration of a surface light source device according to Modification Example 10.
Figure 28:
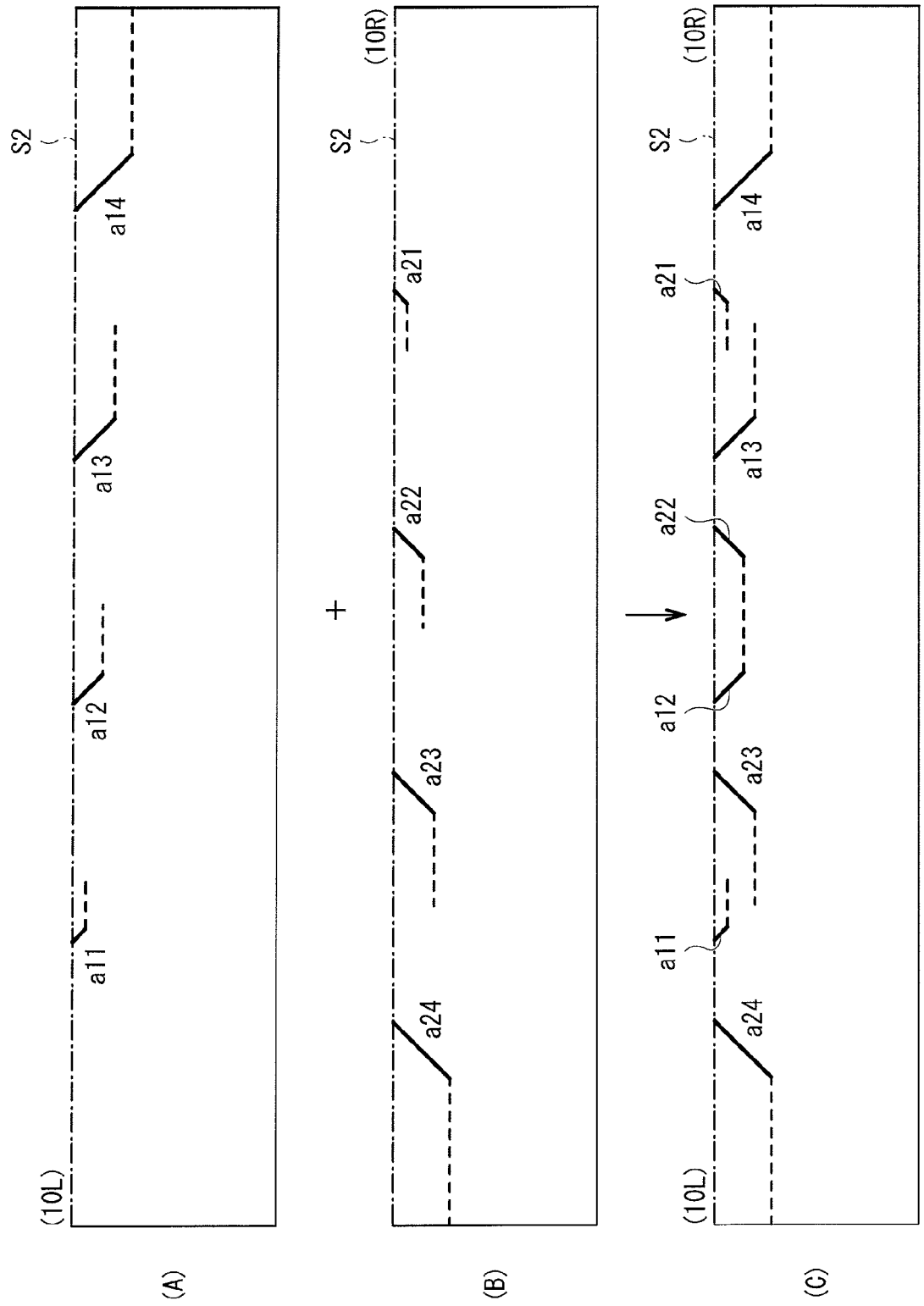
FIG. 28 is a conceptual diagram illustrating a surface shape design process in the surface light source device illustrated in FIG. 27.
Figure 29:
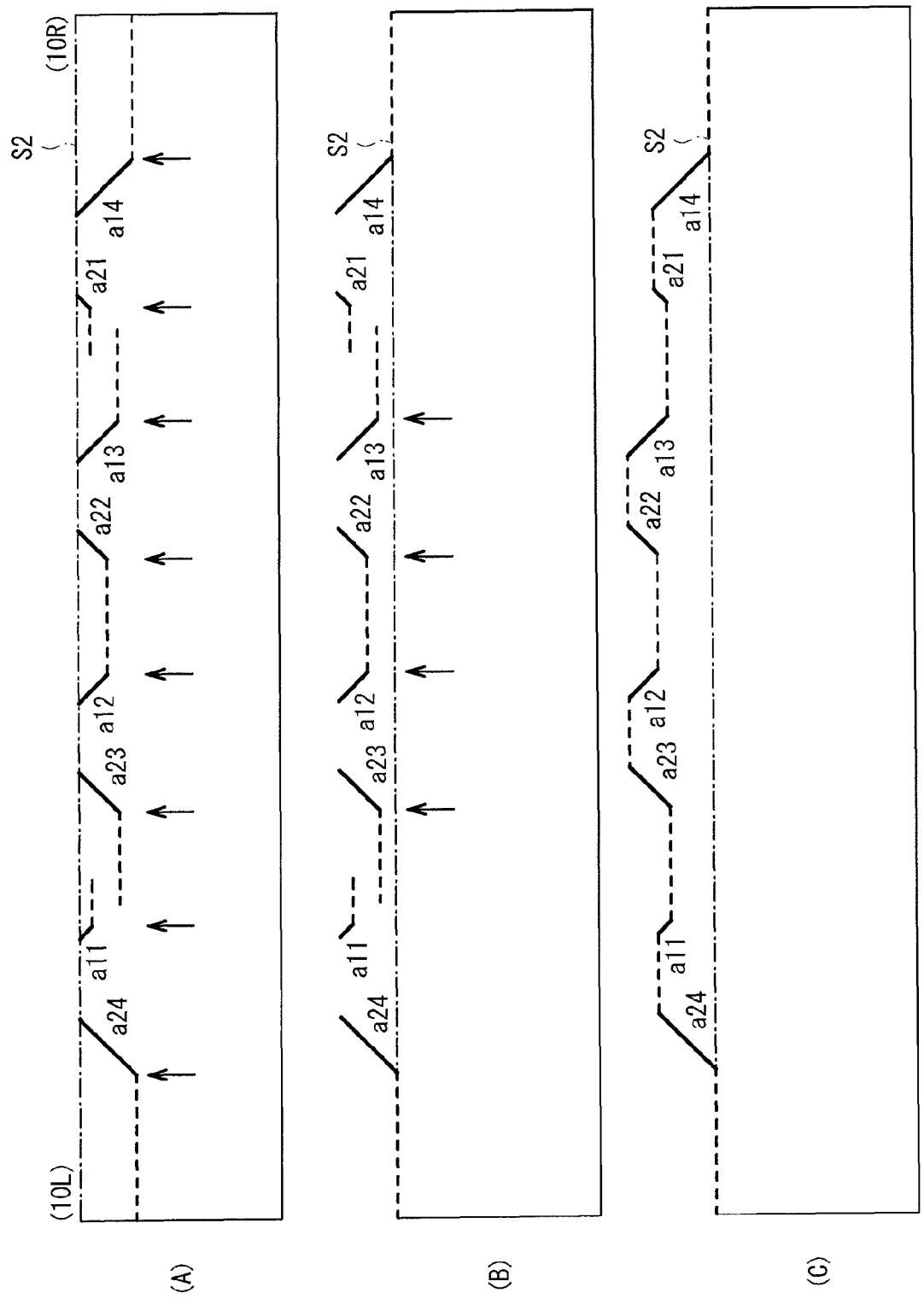
FIG. 29 is a conceptual diagram illustrating a design process following FIG. 28.

FIG. 27 illustrates a schematic configuration of a surface light source device (a surface light source device 9) according to Modification Example 10. As in the case of the surface light source device 8 of the above-described second embodiment, in the surface light source device 9, a light guide plate 9a includes inclined surfaces a11 to a15 and a21 to a25, and the heights and height differences of these inclined surfaces are changed with distances from the light sources 10L and 10R. However, the modification example is distinguished from the above-described second embodiment by the fact that such inclined surfaces a11 to a15 and a21 to a25 are arranged on the light emission surface S2.

In the modification example, as in the case of the above-described second embodiment, by such a configuration, each light entering the light guide plate 9a by lighting of the light sources 10L and 10R propagates through the light guide plate 9a, and then is emitted from the light emission surface S2 to perform surface light emission. Moreover, at this time, as in the case of the above-described first and second embodiments, a nonuniform light emission intensity distribution by lighting of the light source 10L and a nonuniform light emission intensity distribution by lighting of the light source 10R are formed independently by changes in heights of the inclined surfaces a11 to a15.

In the light guide plate 9a, as in the case of the above-described second embodiment, the height differences of the inclined surfaces a11 to a15 and a21 to a25 are changed, and in the modification example, the surface shape of the light emission surface S2 is designed by the height differences. A process of designing such a surface shape will be described below referring to FIGS. 28 and 29. FIGS. 28(A) to (C) and FIG. 29(A) to (C) are conceptual diagrams illustrating the process of designing the surface shape in the light guide plate 9a. Herein, for the sake of simplicity and convenience, the case where four inclined surfaces (a11 to a14 and a21 to a24) are combined as inclined surfaces facing each light source will be described as an example.

Also in the modification example, as in the case of the above-described second embodiment, a combination of the inclined surfaces a11 to a14 (FIG. 28(A)) and the inclined surfaces a21 to a24 (FIG. 28(B)) substantially contributing to the formation of light emission intensity distributions is considered. When the inclined surfaces a11 to a14 and the inclined surfaces a21 to a24 are superimposed on one another without change, a configuration illustrated in FIG. 28(C) is assumed. To make such a configuration implementable as the surface shape of the light emission surface S2, as illustrated in FIG. 29(A) and FIG. 29(B), as in the case of the above-described second embodiment, the positions of the inclined surfaces a11 to a14 and a21 to a24 are aligned. Thus, the surface shape of the light emission surface S2 as illustrated in FIG. 29(C) is obtained consequently.

As described above, the inclined surfaces a11 to a15 and a21 to a25 may be arranged on the light emission surface S2, and also in this case, the same effects as those in the surface light source device 8 of the above-described second embodiment are obtainable.

Modification Example 11

Figure 30:
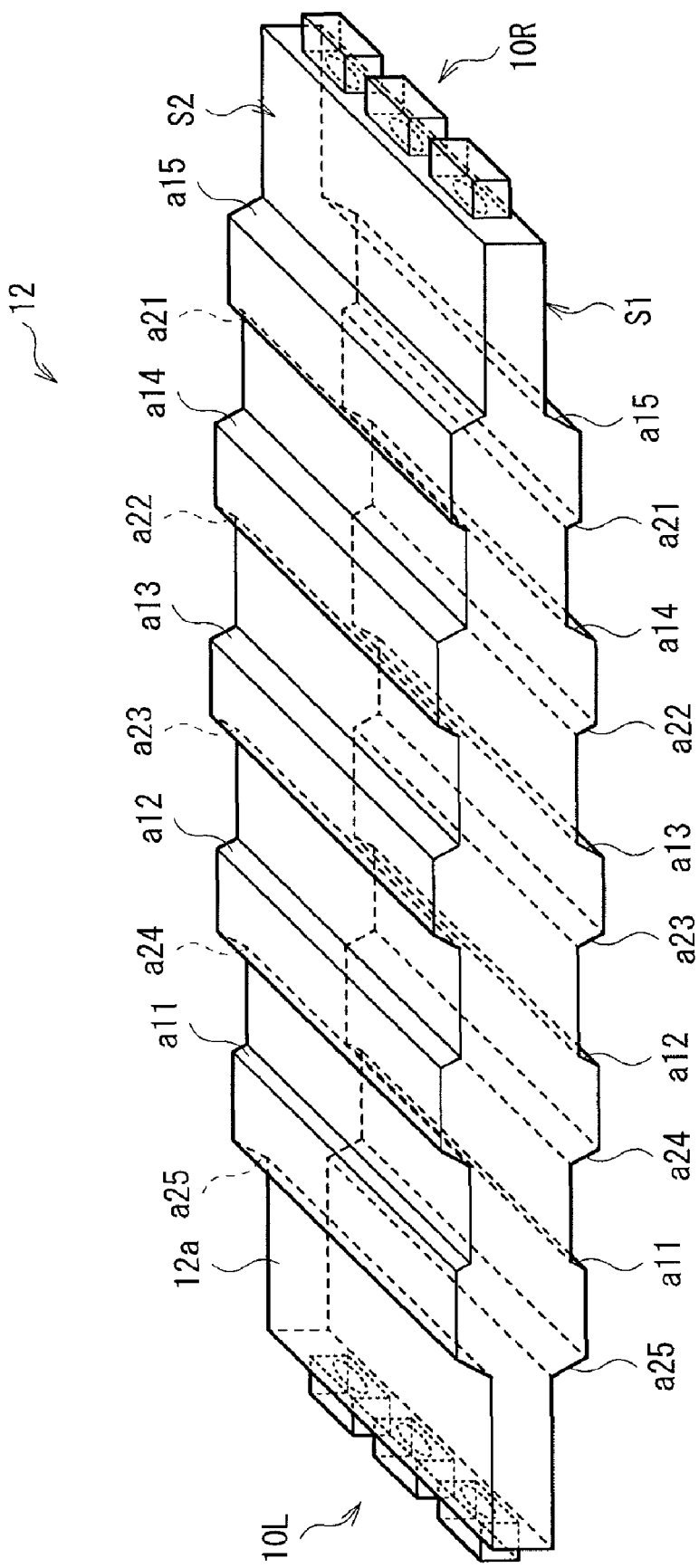
FIG. 30 is a perspective view illustrating a schematic configuration of a surface light source device according to Modification Example 11.

FIG. 30 is a perspective view illustrating a schematic configuration of a surface light source device (a surface light source device 12) according to Modification Example 11. In the modification example, the inclined surfaces a11 to a15 and a21 to a25 are arranged on both of the reflection surface S1 and the light emission surface S2 of the light guide plate 12a. In other words, the surface light source device 12 has a configuration in which the surface shape of the reflection surface S1 in the above-described second embodiment and the surface shape of the light emission surface S2 in the above-described Modification Example 10 are combined. The inclined surfaces a11 to a15 and a21 to a25 may be arranged on both of the reflection surface S1 and the light emission surface S2 in such a manner, and also in this case, the same effects as those in the surface light source device 8 of the above-described second embodiment are obtainable.

Although in the above-described second embodiment and Modification Examples 10 and 11, a configuration in which the inclined surfaces are arranged on the light emission surface S2 or the reflection surface S1 of the light guide plate so that the light guide plate microscopically has a convex shape (convex toward the outside of the light guide plate) is described as an example, the light guide plate may have a concave shape. In other words, a shape recessed toward the inside of the light guide plate so as to form a convex shape may be formed. In this case, as in the case illustrated in FIGS. 26(A) to (C), in a process of aligning the heights of the inclined surfaces, the positions of the inclined surfaces may be shifted toward the inside of the light guide plate. Moreover, one of the light emission surface S2 and the reflection surface S1 may have a convex shape, and the other may have a concave shape.

Further, the case where the heights of the inclined surfaces are changed in the light emission surface S2 or the reflection surface S1 of the light guide plate is described as an example, but the invention is not limited thereto, and is applicable to, for example, the case where density is changed as described in the above-described Modification Example 4. In the case where density is changed, the density of the inclined surfaces a11 having an equal height h11 may be changed with distance from a light source.

Figure 31:
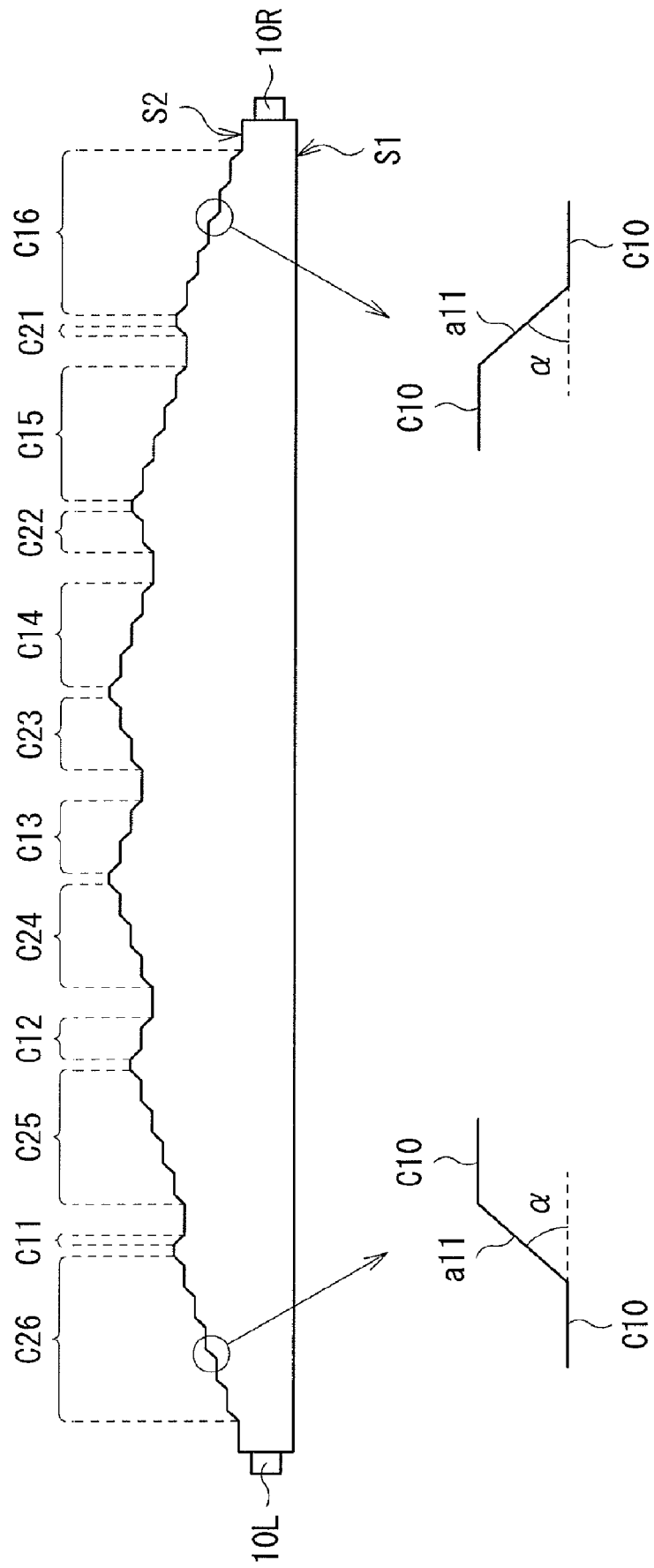
FIG. 31 is a side view illustrating a schematic configuration of a surface light source device according to another modification example.

For example, as illustrated in FIG. 31, the light emission surface S2 of the light guide plate has a surface shape in which combinations c11 to c16 of the inclined surfaces a11 contributing to a light emission intensity distribution by the light source 10L and combinations c21 to c26 of the inclined surfaces a21 contributing to a light emission intensity distribution by the light source 10R are superimposed on one another. Flat surfaces c10 are arranged between the inclined surfaces a11 and between the inclined surface a11 and the inclined surface a21.

In the combinations c11 to c16, the number of the inclined surfaces a11 gradually increases (one by one in the modification example) with increasing distance from the light source 10L, and one inclined surface a11, two inclined surface a11, . . . , six inclined surface a11 are included in the combinations c11, c12, . . . , c16, respectively. Likewise, also in the combinations c21 to c26, the inclined surfaces a21 are arranged so that the number of the inclined surfaces a21 gradually increases (one by one in the modification example) with increasing distance from the light source 10R. In addition, as in the case of the above-described second embodiment, height differences between the inclined surfaces a11 and the reflection surface S1 and height differences between the inclined surfaces a21 and the reflection surface S1 are larger around the center of the light guide plate, and are changed so as to gradually decrease with decreasing distance from ends of the light guide plate.

The light emission surface S2 microscopically has a convex shape by changes in density and height differences of such inclined surfaces a11 and a21. Thus, even in the case where a nonuniform light emission intensity distribution is formed by a change in density, only inclined surfaces substantially contributing to the formation of a light emission intensity distribution is allowed to be effectively arranged. Therefore, the same effects as those in the above-described second embodiment and the like are obtainable.

Third Embodiment

Figure 32:
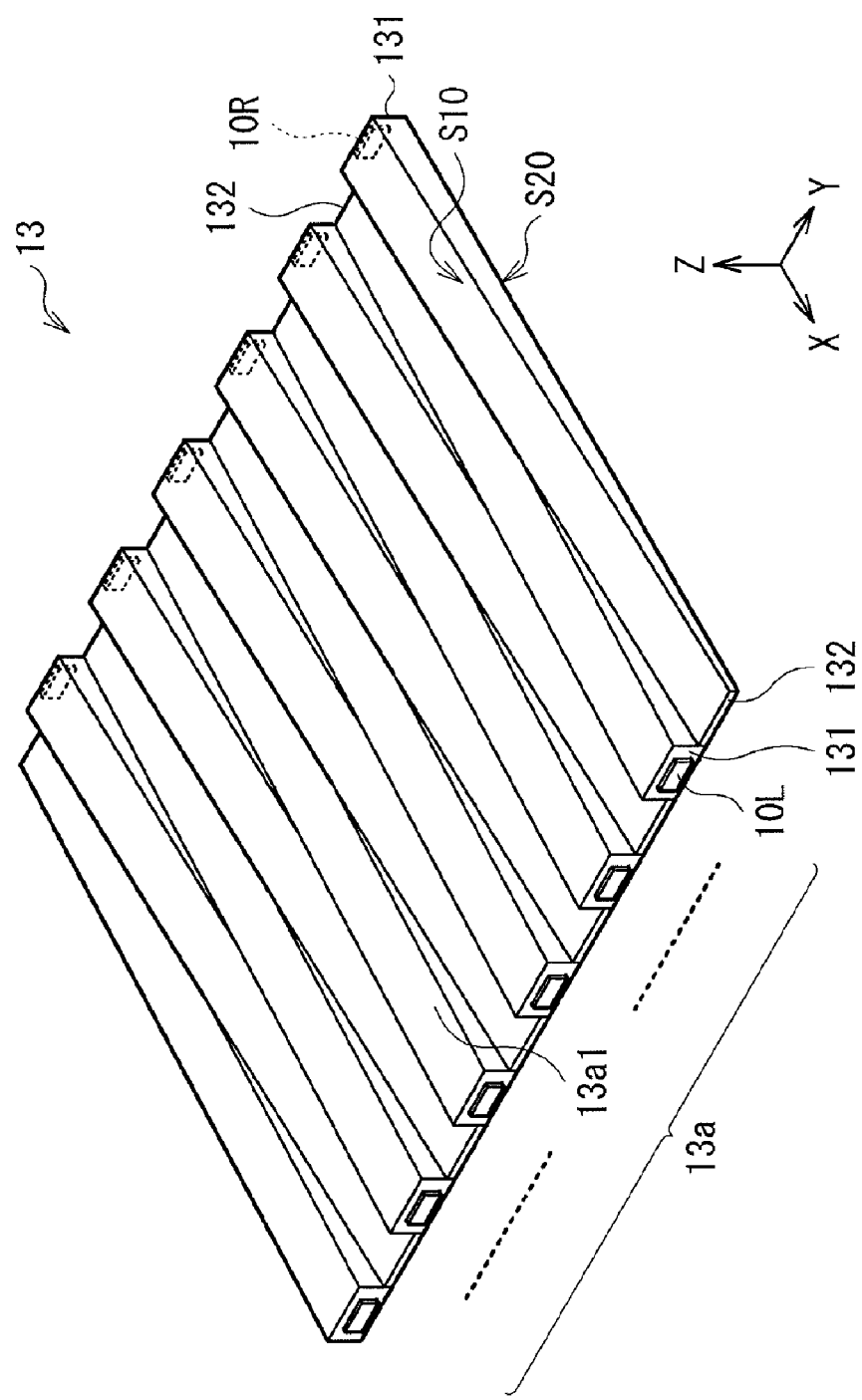
FIG. 32 is a perspective view illustrating a schematic configuration of a surface light source device according to a third embodiment.
Figure 33:
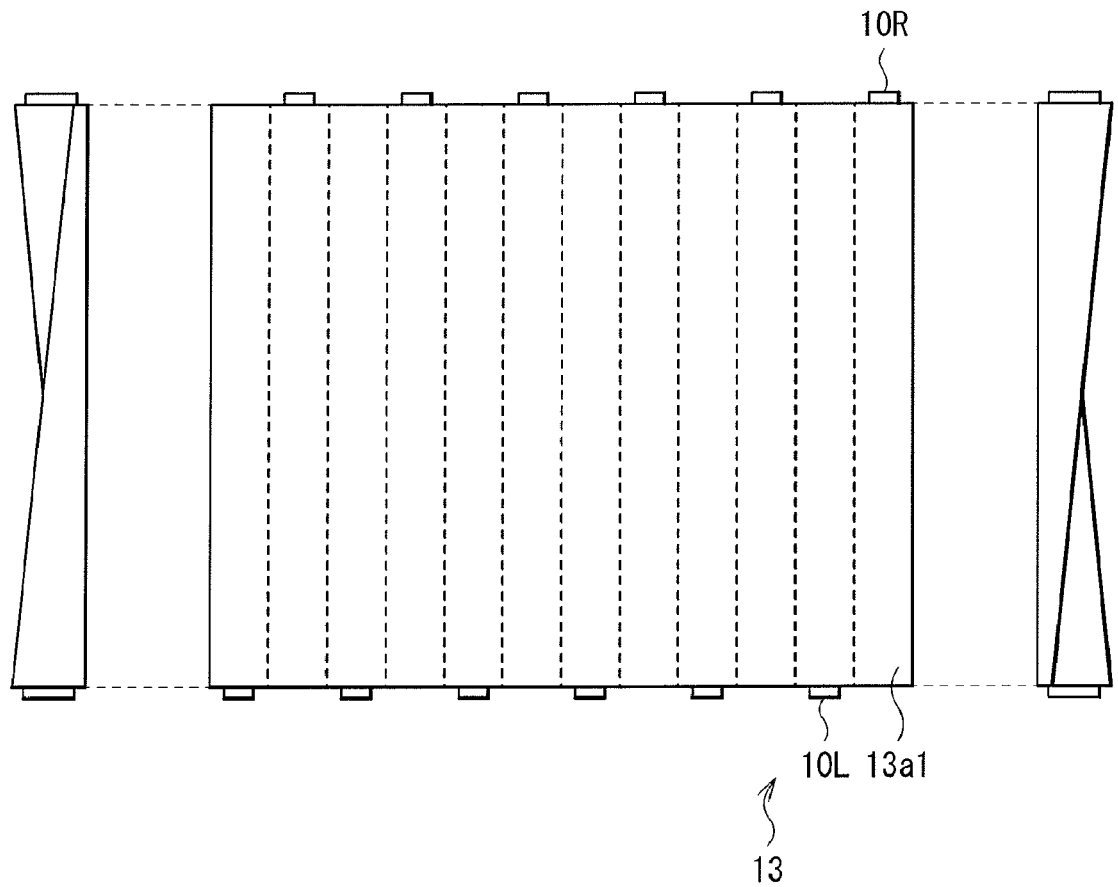
FIG. 33 is a plan view and a side view of the surface light source device illustrated in FIG. 32.

FIG. 32 is a perspective view illustrating a configuration of a main part of a surface light source device (a surface light source device 13) according to a third embodiment. FIG. 33(A) is a plan view of the surface light source device 13 viewed from the light emission surface S2 side, and FIGS. 33(B) and (C) are side views of the surface light source device 13. As in the case of the surface light source device 1 of the above-described first embodiment, an arrangement of a plurality of the surface light source devices 13 is used as a backlight for a liquid crystal display or the like, and the surface light source device 8 configures a partial lighting region in partial driving. Like components are denoted by like numerals as of the above-described first embodiment, and will not be further described.

The surface light source device 13 includes a light guide plate unit 13a in which a plurality (for example, 12) of light guide sections 13a1 extending along an x direction are arranged along a y direction. A plurality (for example, six) of light sources 10L and a plurality (for example, six) of light sources 10R are arranged on a pair of side surfaces of the light guide plate unit 13a, respectively.

As in the case of the light guide plate 1a of the above-described first embodiment, each light guide section 13a1 is an optical member for allowing light from the light source 10L (or the light source 10R) to propagate therethrough to a light emission surface, and is formed of, for example, a transparent resin such as acrylic or polycarbonate. Each light guide section 13a1 includes a light emission surface S20, a reflection surface S10 and a pair of side surfaces (a first side surface 131 and a second side surface 132) facing each other, and has a shape in which the thickness thereof gradually decreases from the first side surface 131 to the second side surface 132, that is, a wedge shape.

Various kinds of processing for light extraction, for example, engraving, dot processing, dot printing or prism processing (not illustrated) is performed on the reflection surface S10 of the light guide section 13a1. A desired light emission intensity distribution of emission light from the light emission surface S20 is formed by these kinds of processing. More specifically, processing is performed so that the light emission amount from the light emission surface S20 increases with increasing distance from the light source 10L (or the light source 10R), in other word, with increasing distance from the first side surface 131. For example, processing is performed so as to increase the density of dot patterns with increasing distance from the light source or increase the density or heights of prisms with increasing distance from the light source. Such processing may be performed on not only the reflection surface S10 but also the light emission surface S20.

In the embodiment, the above-described plurality of light guide sections 13a1 are arranged so as to alternately change the directions thereof (hereinafter simply referred to "alternately arranged"), so that the first side surface 131 of one light guide section 13a1 and the second side surface 132 of another light guide section 13a1 are adjacent to each other. The light source is arranged on each of the first side surfaces 131 of the plurality of light guide sections 13a1 which are alternately arranged in such a manner. In other words, each side surface in the light guide plate unit 13a is configured of the first side surfaces 13a1 and the second side surface 132 which are alternately arranged. Moreover, in the light guide plate unit 13a, the light sources (10L) arranged on one side surface and the light sources (10R) arranged on the other side surface are arranged in a staggered manner so as not to face each other. However, in the embodiment, these plurality of light guide sections 13a1 (the light guide plate unit 13a) are formed as one unit with use of an injection molding method or the like. In the embodiment, the light guide section 13a1 configured by arranging the light source 10L on the first side surface 131 corresponds to "a first light guide section" in the invention, and the light guide section 13a1 configured by arranging the light source 10R on the first side surface 131 corresponds to "a second light guide section" in the invention.

Next, functions and effects of the embodiment will be described below.

In the surface light source device 13, as in the case of the above-described first embodiment, when each light enters the light guide plate unit 13a from the light source 10L and the light source 10R by lighting of the light source 10L and lighting of the light source 10R, respectively, each incident light propagates along the shape of a corresponding light guide section 13a1. In other words, the light propagates through each light guide section 13a1 from the first side surface 131 to the second side surface 132. Therefore, each light guide section 13a1 performs surface light emission on the light emission surface S20.

At this time, processing is performed on the reflection surface S10 of each light guide section 13a1 so that the light emission amount from the light emission surface S20 increases with increasing distance from the first side surface 131, so a nonuniform light emission intensity distribution is independently formed in each light guide section 13a1. Therefore, in the light guide plate unit 13a configured by alternately arranging such light guide sections 13a1, a nonuniform light emission intensity distribution by lighting of the light source 10L and a nonuniform light emission intensity distribution by lighting of the light source 10R are formed independently.

Moreover, in the embodiment, as the thickness of each light guide section 13a1 gradually decreases from the first side surface 131 to the second side surface 132, compared to the above-described first embodiment, light use efficiency is improved. A reason for this will be described below.

First, as a comparative example to the embodiment, the surface shape of the light guide plate 1a according to the above-described first embodiment will be described below. As described above, the light guide plate 1a (refer to FIG. 1) is configured by superimposing the concave sections 11L$_1$ to 11L$_5$ controlling the light emission intensity distribution by the light source 10L and the concave sections 11R$_1$ to 11R$_5$ controlling the light emission intensity distribution by the light source 10R in one member. Specifically, the light guide plate 1a has a configuration in which light enters from each of a pair of side surfaces thereof, in other words, a configuration in which the light sources 10L and 10R are arranged so as to face each other. Therefore, the light guide plate 1a is forced to be formed in a centrally symmetrical shape, for example, a flat shape.

However, in such a flat-shaped light guide plate 1a, in the case where the light source 10L arranged on one side surface illuminates, a part of light propagating through the light guide plate 1a may pass through the other side surface (a side surface closer to the light source 10R) to be leaked to outside (hereinafter, simply referred to "light leakage"). Likewise, in the case where the light source 10R illuminates, light leakage from the side surface closer to the light source 10L may occur. Therefore, in the light guide plate 1a of the above-described first embodiment, there is room for improvement in light use efficiency.

Therefore, in the embodiment, as each light guide section 13a1 has a shape in which the thickness thereof gradually decreases from the first side surface 131 to the second side surface 132, light entering from the first side surface 131 is less likely to be leaked from the second side surface 132. Therefore, compared to the above-described first embodiment, light use efficiency is improved.

As described above, in the embodiment, in the light guide plate unit 13a, the light guide sections 13a1 processed so as to increase the light emission amount with increasing distance from the first side surface 131a re alternately arranged, and the light source 10L (or 10R) is arranged on the first side surface 131 of each light guide section 13a1. Accordingly, nonuniform light emission intensity distributions based on the surface shapes of the light guide sections 13a1 are allowed to be formed independently. Therefore, the same effects as those in the above-described first embodiment are obtainable.

Moreover, as each light guide section 13a1 has a shape in which the thickness thereof gradually decreases from the first side surface 131 to the second side surface 132, the occurrence of light leakage from the second side surface 132 is preventable. Therefore, compared to the above-described first embodiment, light use efficiency is allowed to be improved. It causes reduction in numbers of the arranged light sources 10L and 10R, and it is advantageous in cost reduction or power consumption reduction.

Next, modification examples (Modification Examples 12 to 16) of the above-described third embodiment will be described below. Like components are denoted by like numerals as of the surface light source devices 1 and 13 of the above-described first and third embodiments, and will not be further described.

Modification Example 12

Figure 34:
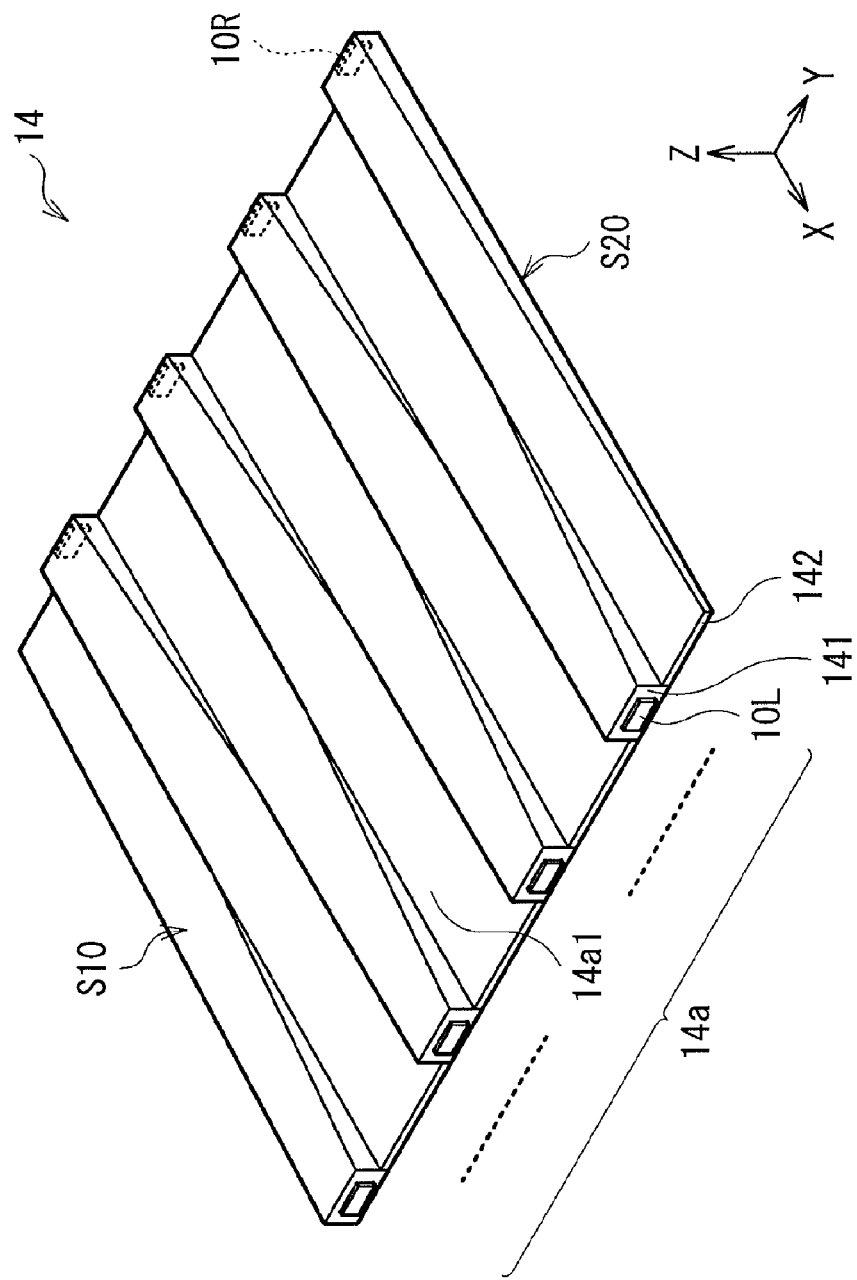
FIG. 34 is a perspective view illustrating a schematic configuration of a surface light source device according to Modification Example 12.
Figure 35:
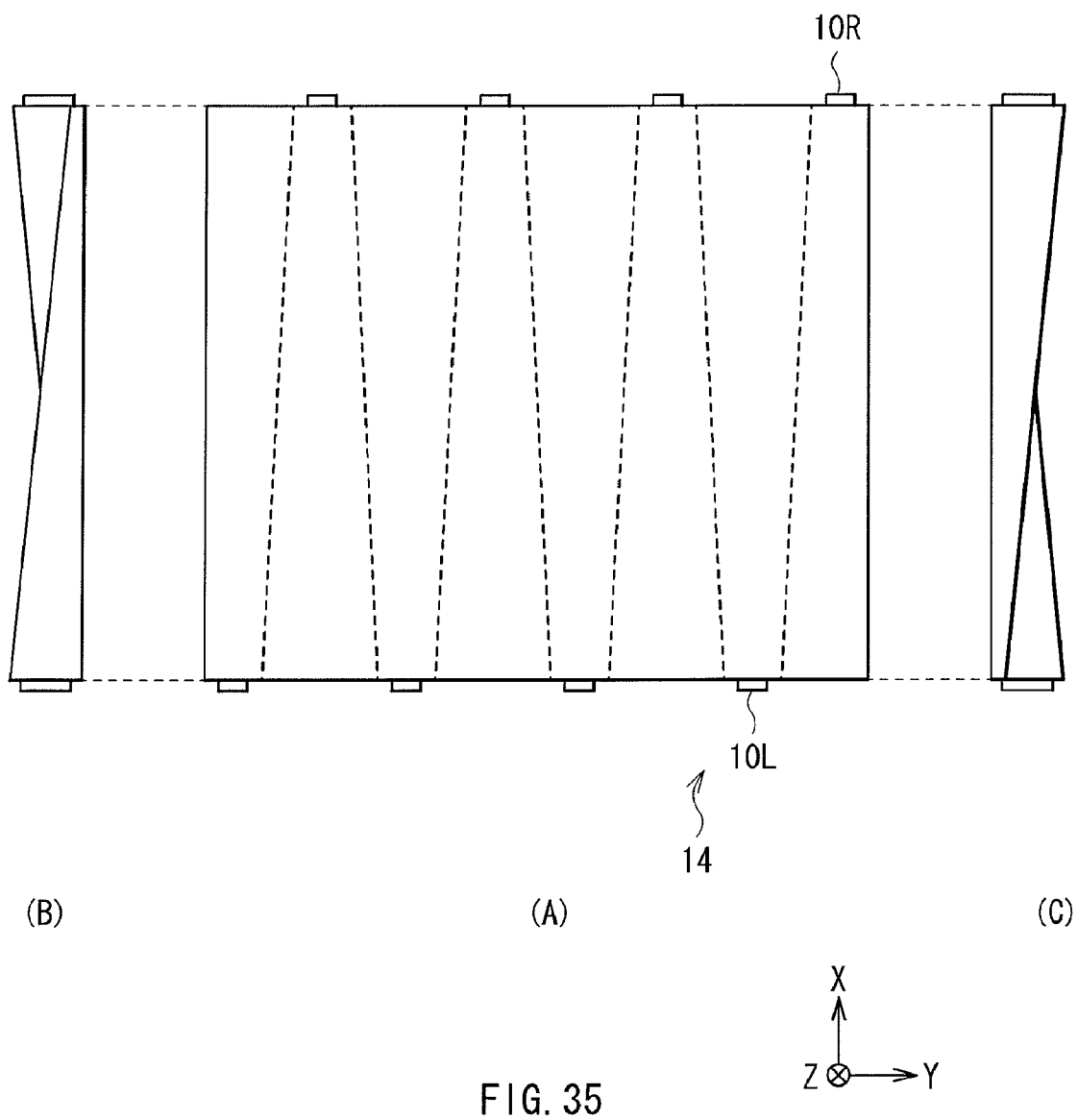
FIG. 35 is a plan view and a side view of the surface light source device illustrated in FIG. 34.

FIG. 34 is a perspective view illustrating a configuration of a main part of a surface light source device (a surface light source device 14) according to Modification Example 12. FIG. 35(A) is a plan view of the surface light source device 14 viewed from the light emission surface S2 side, and FIGS. 35(B) and (C) are side views of the surface light source device 14.

As in the case of the surface light source device 13 of the above-described third embodiment, the surface light source device 14 includes a light guide plate unit 14a, and a plurality (for example, four) of light sources 10L and a plurality (for example, four) of light sources 10R which are arranged on a pair of side surfaces, respectively. The light guide plate unit 14a is configured by arranging a plurality (for example, eight) of light guide sections 14a1 along a y direction, and the plurality of light guide sections 14a1 are formed as one unit with use of an injection molding method or the like.

As in the case of the light guide plate 13a1 of the above-described third embodiment, each light guide section 14a1 is an optical member for allowing light from the light source 10L (or the light source 10R) to propagate therethrough to the light emission surface. Moreover, each light guide section 14a1 includes a light emission surface S20, a reflection surface S10 and a pair of side surfaces (a first side surface 141 and a second side surface 142), and has a wedge shape in which the thickness thereof decreases from the first side surface 141 to the second side surface 142. Further, the same processing as that performed on the reflection surface S10 of the light guide section 13a1 of the above-described third embodiment is performed on the reflection surface S10 of the light guide section 14a1. A plurality of such light guide sections 14a1 are alternately arranged, and the light source (10L or 10R) is arranged on each first side surface 141. In other words, also in the light guide plate unit 14a, each side surface thereof is configured of the first side surfaces 141 and the second side surfaces 142 which are alternately arranged, and the light sources 10L and the light sources 10R are arranged in a staggered manner so as not to face each other.

However, in the modification example, each light guide section 14a1 has a surface shape in which the width thereof gradually increases from the first side surface 141 to the second side surface 142. In other words, the light emission area of each light guide section 14a1 gradually expands from the first side surface 141 to the second side surface.

In the modification example, as in the case of the above-described third embodiment, a nonuniform light emission intensity distribution in each light guide section 14a1 is allowed to be formed independently by such a configuration, and compared to the above-described first embodiment, light use efficiency is allowed to be improved by the wedge shape. Therefore, the same effects as those of the surface light source device 13 of the above-described third embodiment are obtainable. Moreover, as the width of the light guide section 14a1 expands from the first side surface 141 to the second side surface 142, the light emission area on the second side surface 142 increases, and the light emission amount on a side farther from the light source is allowed to increase efficiently. Therefore, a nonuniform light emission intensity distribution in which the light emission intensity is lower and higher at places closer to and farther from the light source is easily formed.

Modification Example 13

Figure 36:
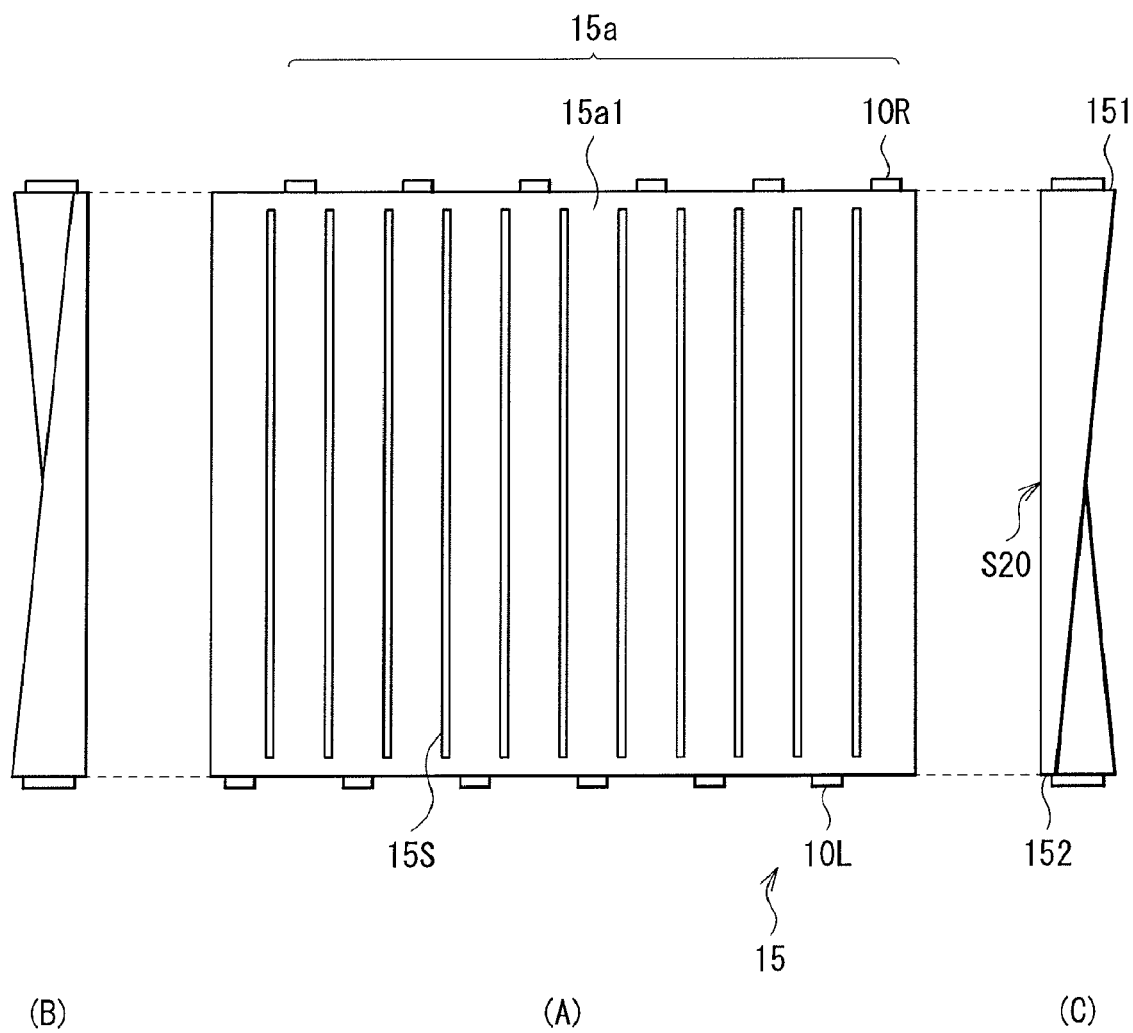
FIG. 36 is a perspective view illustrating a schematic configuration of a surface light source device according to Modification Example 13.

FIG. 36(A) is a plan view of a surface light source device (a surface light source device 15) according to Modification Example 13 viewed from the light emission surface S2 side, and FIGS. 36(B) and (C) are side views of the surface light source device 15.

As in the case of the surface light source device 13 of the above-described third embodiment, the surface light source device 15 includes a light guide plate unit 15a, and a plurality (for example, six) of light sources 10L and a plurality (for example, six) of light sources 10R which are arranged on a pair of side surfaces, respectively. The light guide plate unit 15a is configured by arranging a plurality (for example, 12) of light guide sections 15a1 along a y direction, and the plurality of light guide sections 14a1 are formed as one unit with use of an injection molding method or the like. Each light guide section 15a1 is an optical member for allowing light from the light source 10L (or the light source 10R) to propagate therethrough to light emission surface. Moreover, each light guide section 15a1 includes a light emission surface S20, a reflection surface S10 and a pair of side surfaces (a first side surface 151 and a second side surface 152), and has a wedge shape in which the thickness thereof decreases from the first side surface 151 to the second side surface 152. Further, the same processing as that performed on the reflection surface S10 of the light guide section 13a1 of the above-described third embodiment is performed on the reflection surface S10 of the light guide section 15a1. A plurality of such light guide sections 15a1 are alternately arranged, and the light source (10L or 10R) is arranged on each first side surface 151. In other words, also in the light guide plate unit 15a, each side surface is configured of the first side surfaces 151 and the second side surfaces 152 which are alternately arranged, and the light sources 10L and the light sources 10R are arranged in a staggered manner so as not to face each other.

However, in the modification example, slits 15S are arranged along an x direction between adjacent light guide sections 15a1 of the plurality of light guide sections 15a1. For example, the slits 15S are formed collectively and concurrently with molding of the light guide plate unit 15a, and the slits 15S are formed so as not to completely separate the light guide sections 15a1 from one another. In addition, the slits 15S may be linearly arranged along an x direction as in the case of the modification example, but the invention is not limited thereto, and, for example, the slits 15S may be arranged in only partial regions between the light guide sections 15a1 so as to form a dotted line or an alternate long and short dashed line as a whole. Alternatively, the slits 15S may have a wave shape.

The slits 15S may be arranged between adjacent light guide sections 15a1 in such a manner, and also in this case, the same effects as those in the above-described third embodiment are obtainable.

Modification Example 14

Figure 37:
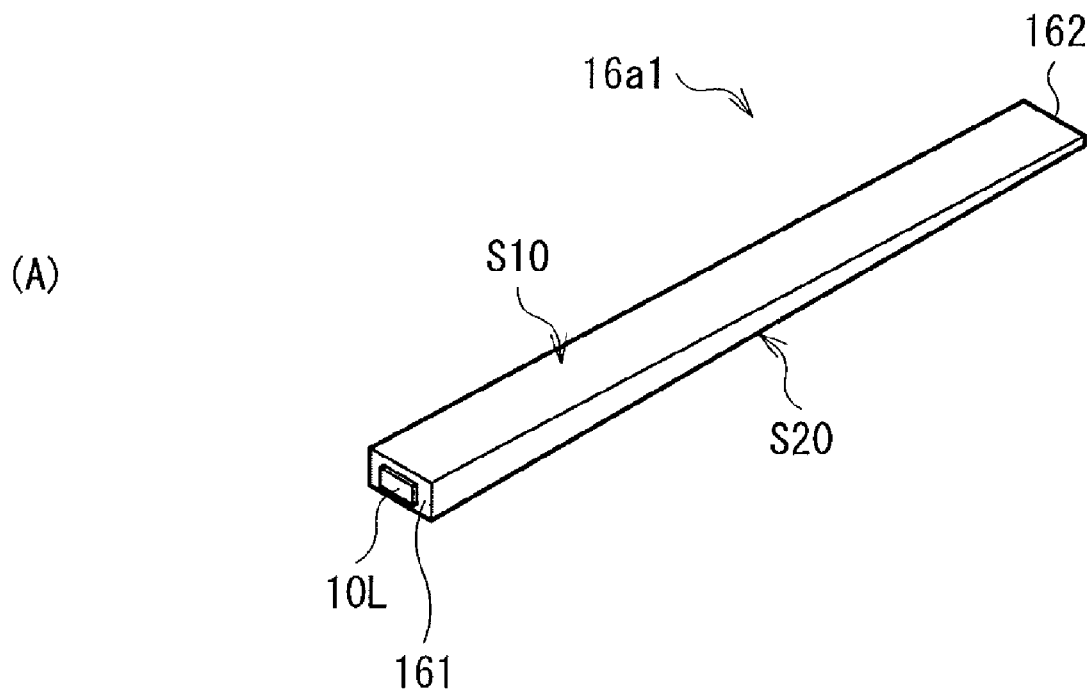
FIG. 37 is a perspective view illustrating a schematic configuration of a surface light source device according to Modification Example 14.
Figure 37:
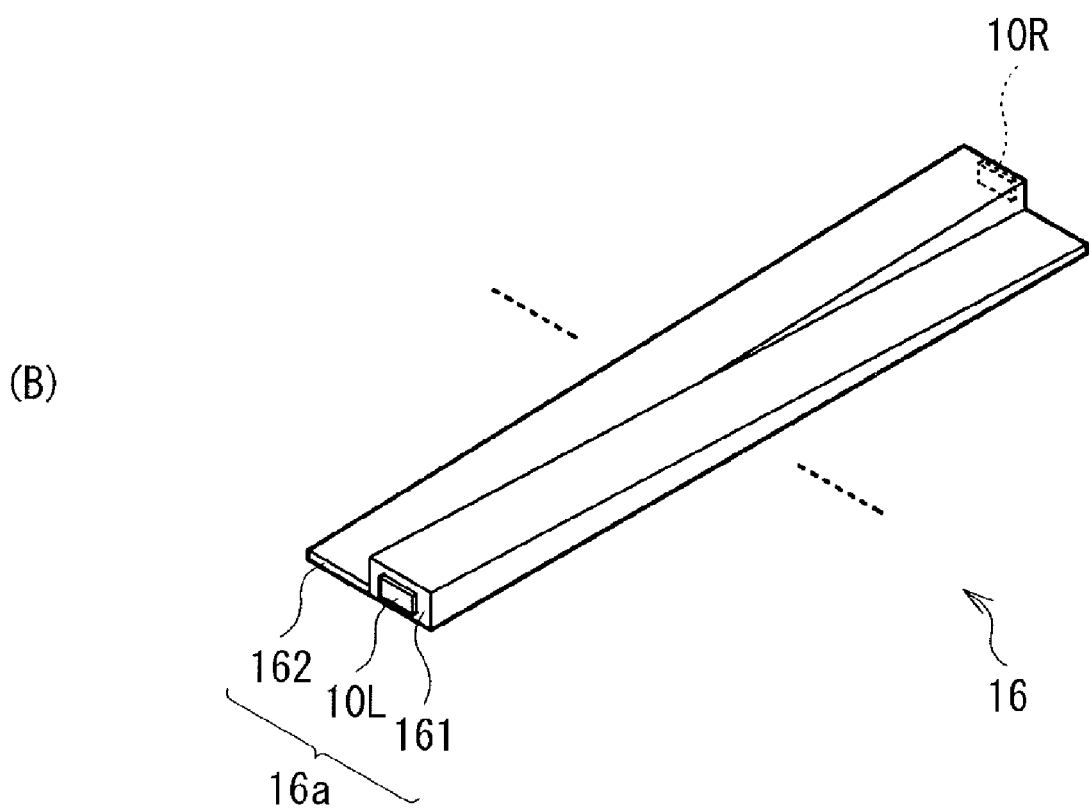

FIG. 37(A) is a perspective view of one light guide member in a surface light source device (a surface light source device 16) according to Modification Example 14, and FIG. 37(B) is a perspective view illustrating a configuration of a main part of the surface light source device 16.

As in the case of the surface light source device 13 of the above-described third embodiment, the surface light source device 16 includes a light guide plate unit 16a, and a plurality of light source 10L and a plurality of light source 10R which are arranged on a pair of side surfaces, respectively. However, in the modification example, the light guide plate unit 16a is configured by arranging a plurality of light guide members 16a1 molded as separate parts along a y direction. Each light guide member 16a1 is an optical member for allowing light from the light source 10L (or the light source 10R) to propagate therethrough to the light emission surface. Moreover, each light guide member 16a1 includes a light emission surface S20, a reflection surface S10 and a pair of side surfaces (a first side surface 161 and a second side surface 162), and has a wedge shape in which the thickness thereof gradually decreases from the first side surface 161 to the second side surface 162. Further, the same processing as that performed on the reflection surface S10 of the light guide section 13a1 of the above-described third embodiment is performed on the reflection surface S10 of the light guide member 16a1. A plurality of such light guide members 16a1 are connected to one another so as to be alternately arranged, and the light source (10L or 10R) is arranged on each first side surface 161. In other words, also in the light guide plate unit 16a, each side surface is configured of the first side surfaces 161 and the second side surfaces 162 which are alternately arranged, and the light sources 10L and the light sources 10R are arranged in a staggered pattern so as not to face each other.

The light guide members 16a1 which are molded as separate parts and connected to one another may be used as the light guide plate unit 16a, and also in this case, the same effects as those in the above-described third embodiment are obtainable.

Modification Examples 15 and 16

Figure 38:
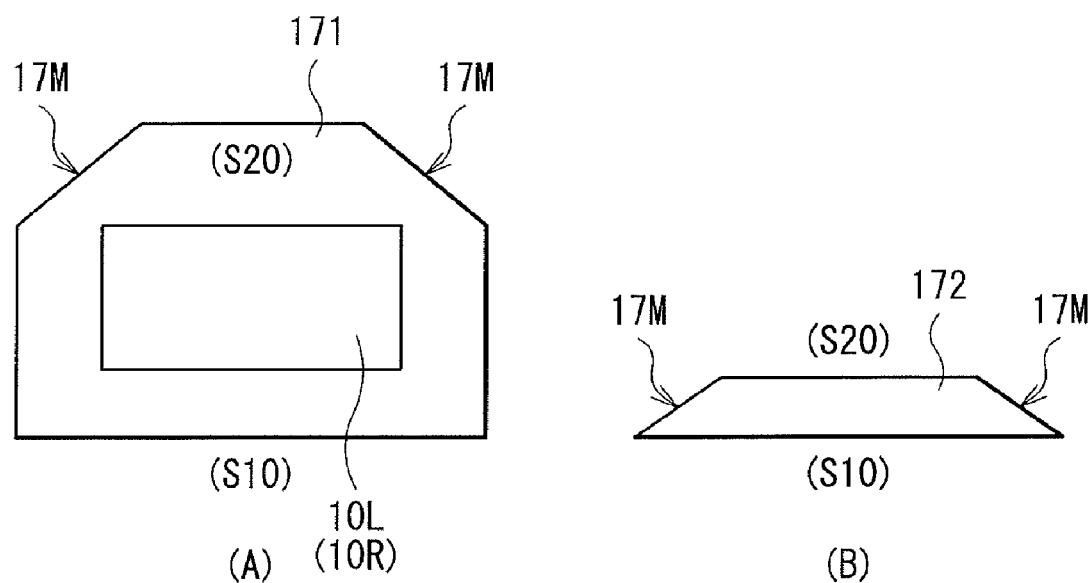
FIG. 38 is a side view illustrating a schematic configuration of a light guide section according to Modification Example 15.
Figure 39:
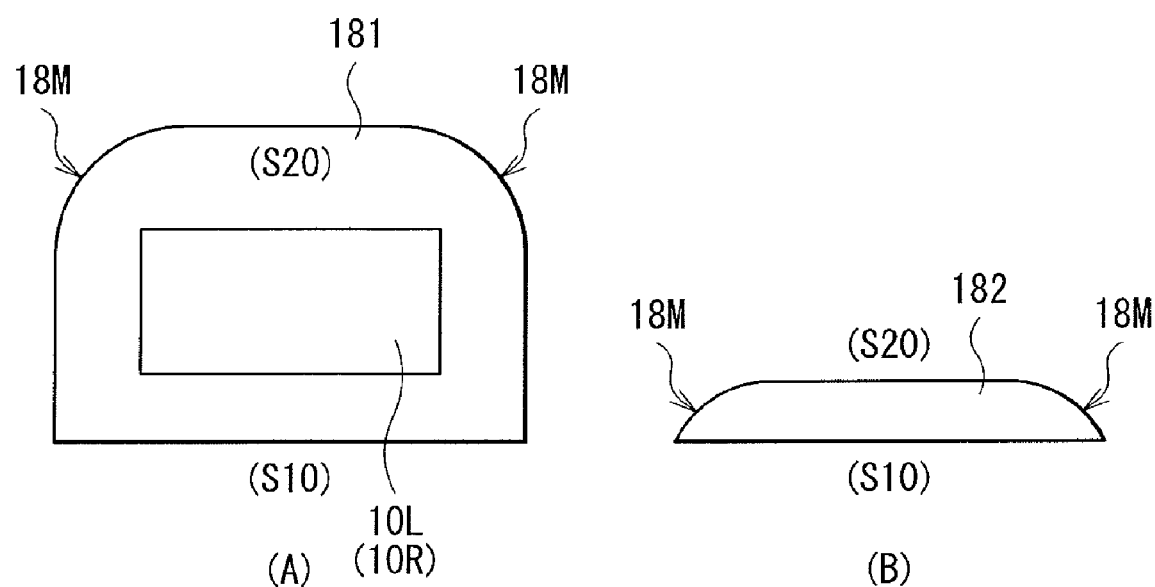
FIG. 39 is a side view illustrating a schematic configuration of a light guide section according to Modification Example 16.

FIG. 38(A) is a side view of a light guide section according to a modification example (Modification Example 15) of the light guide section 13a1 of the third embodiment viewed from a first side surface (a first side surface 171) side, and FIG. 38(B) is a side view of the light guide section viewed from a second side surface (a second side surface 172) side. FIG. 39(A) is a side view of a light guide section according to Modification Example 16 viewed from a first side surface (a first side surface 181) side, and FIG. 39(B) is a side view of the light guide section viewed from a second side surface (a second side surface 182) side.

As in the case of the light guide section 13a1 in the above-described third embodiment, the light guide sections according to Modification Examples 15 and 16 are optical members for allowing light from the light source 10L (or the light source 10R) to propagate therethrough to light emission surface. Moreover, the light guide sections each include a light emission surface S20, a reflection surface S10, a first side surface 171 or 181 and a second side surface 172 or 182, and the light source (10L or 10R) is arranged on the first side surface 171 or 181. Further, the light guide sections each have a wedge shape in which the thickness thereof decreases from the first side surface 171 or 181 to the second side surface 172 or 182, and the same processing as that performed on the light guide section 13a1 of the above-described third embodiment is performed on the reflection surface S10.

As illustrated in FIGS. 38(A) and (B), in Modification Example 15, a corner on a side closer to the light emission surface S20 of the light guide section is chamfered so as to have a flat surface (a chamfered part 17M). Moreover, as illustrated in FIGS. 39(A) and (B), in Modification Example 16, a corner on a side closer to the light emission surface S20 of the light guide section is chamfered so as to have a rounded corner (a chamfered part 18M).

Chamfering may be performed on the side closer to the light emission surface S20 of the light guide section in such a manner. In this case, the same effects as those in the above-described third embodiment are obtainable, and a change in luminance in boundaries between the light guide sections is made gentle, so that a light emission intensity distribution in which luminance unevenness is reduced as the whole light guide plate unit is allowed to be formed. The chamfered part may have a flat surface or a curved surface.

Although in Modification Examples 12 to 16 of the above-described third embodiment, a configuration in which 8 or 12 light guide sections are alternately arranged in a fixed direction is described as an example, the number of the light guide sections is not limited thereto, and may be two or more. When one light source (10L or 10R) is arranged on each of a pair of side surfaces of the light guide plate unit, the same effects as those in the above-described third embodiment and the like are obtainable. However, in the light guide plate unit, the nonuniform light emission intensity distributions formed in the respective light guide sections are superimposed on one another to form emission light consequently; therefore, to achieve natural superimposition, the number of light guide sections (the number of partitions) is preferably large.

Moreover, in the above-described third embodiment and the like, the case where the light guide sections with an identical shape are alternately arranged is described as an example, but the shapes of the light guide sections are not necessarily identical with one another. For example, a light guide section allowing light from the light source 10L to propagate therethrough and a light guide section allowing light from the light source 10R to propagate therethrough may have different thicknesses, widths or the like. Thus, different light emission intensity distributions by lighting of the light sources 10L and 10R are allowed to be formed, and when the light emission intensity distributions are superimposed on each other, various light emission intensity distributions are allowed to be formed.

Further, in the above-described third embodiment and the like, the case where each light guide section has a wedge shape in which the reflection surface thereof is inclined is described; but each light guide section may have a wedge shape in which the light emission surface thereof is inclined.

In the above-described embodiments and the like, as each of a plurality of concave sections or convex sections of the light guide control section, a prism-like section with a triangular sectional shape is described as an example, but the shape of the concave section or the convex section is not limited thereto. For example, the concave section or the convex section may have an R shape in which vertex parts of a triangular sectional shape have a curvature. Moreover, any other sectional shape, for example, a trapezoidal shape may be used. In other words, it is only necessary to form two inclined surfaces a and b which are specified by the inclined angles $\alpha$ and $\beta$ satisfying a predetermined conditional expression so as to face the light sources 10L and 10R, respectively.

Moreover, in the above-described embodiments and the like, the case where the inclined angles $\alpha$ and $\beta$ are equal to each other in a plurality of concave sections (convex sections) of the light guide control section is described as an example, but the inclined angles $\alpha$ and $\beta$ are not necessarily equal to each other in the concave sections. In other words, it is only necessary to set the inclined angles in each concave section so as to satisfy the above-described conditional expressions (1) to (3).

Figure 21:
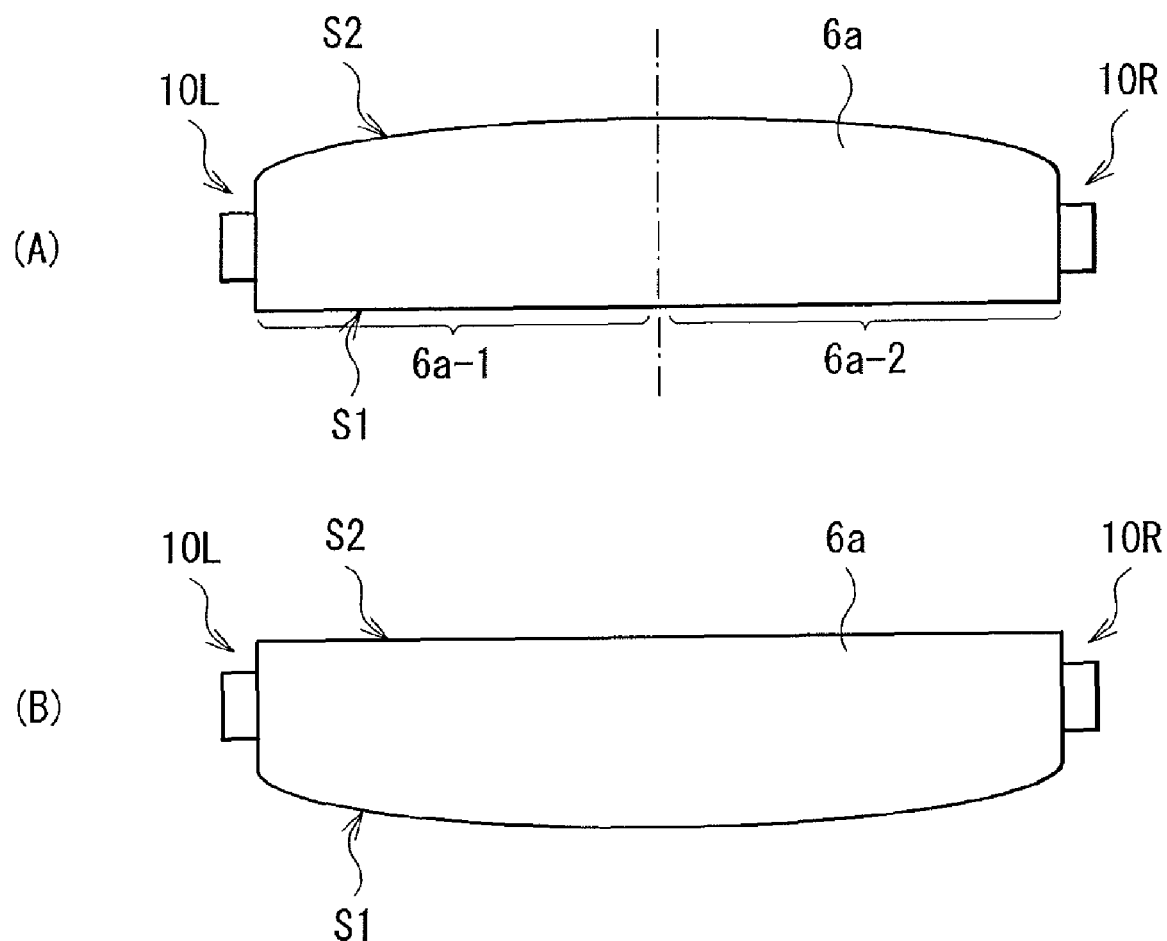
FIG. 21 is a sectional view illustrating another example of a light guide plate illustrated in FIG. 1.

Further, in the above-described embodiments and the like, a configuration using a flat light guide plate with a uniform thickness is described as an example, but the thickness of the light guide plate is not necessarily uniform. For example, as illustrated in FIGS. 21(A) and (B), the thickness of a light guide plate 6a may be changed between side surfaces where the light source 10L and 10R are arranged, respectively. More specifically, the thickness of a central part of the light guide plate 6a may be larger than those of ends thereof. For example, as illustrated in FIGS. 21(A) and (B), the thickness may be changed curvedly (other than in a linear function manner) or linearly (in a linear function manner). Further, the thickness may be changed by, in the case where the light guide control section is arranged on the reflection surface S1, forming a curved light emission surface S2 as illustrated in FIG. 21(A), and, in the case where the light guide section is arranged on the light emission surface S2, forming a curved reflection surface S1 as illustrated in FIG. 21(B). When the thickness of the light guide plate 6a is changed in such a manner, the above-described nonuniform light emission intensity distribution is easily formed. A reason for this will be described below referring to FIG. 21(A).

First, the case where the light source 10L illuminates is considered. In a region 6a-1 on a side closer to the light source 10L of the light guide plate 6a, the thickness of the light guide plate 6a increases with increasing distance from the light source 10L, and by the inclined top and bottom surfaces, light being guided is totally reflected more easily toward an in-plane direction (an xy-plane direction) than the direction (a z-axis direction) of the normal to the light emission surface S2. Therefore, in the region 6a-1, light is less likely to be emitted to the outside of the light guide plate 6a. On the other hand, in a region 6a-2 on a side closer to the light source 10R of the light guide plate 6a, the thickness of the light guide plate 6a decreases with increasing distance from the light source 10L, so by inclined top and bottom surfaces thereof, light being guided is totally reflected more easily in the direction of the normal (the z-axis direction) than the in-plane direction (the xy-plane direction) of the light emission surface. Therefore, in the region 6a-2, light is easily emitted to the outside of the light guide plate 6a. Therefore, a nonuniform light emission intensity distribution in which light emission intensity is lower and higher at places closer to and farther from the light source 10L is easily formed by the above-described shape of the light guide plate 6a. On the other hand, also in the case where the light source 10R illuminates, a nonuniform light emission intensity distribution is easily formed because of the same reason.

Moreover, in the above-described embodiments and the like, any light source emitting light may be used. It is not necessary for all light sources to emit light in one and the same wavelength range. For example, a light source emitting light with a blue wavelength, a light source emitting light with a green wavelength and a light source emitting light with a red wavelength may be used. They may be used as separate light sources, or may be packed in one unit so as to be used as one light source.

Further, a light source emitting light with blue and green wavelengths and a light source emitting light with a red wavelength may be used. They may be used as separate light sources, or may be packed in one unit so as to be used as one light source. Further, a light source emitting light with blue and red wavelengths and a light source emitting light with a green wavelength may be used. They may be used as separate light sources, or may be packed in one unit so as to be used as one light source. Moreover, two kinds of light sources, that is, a light source emitting light with green and red wavelengths and a light source emitting light with a blue wavelength may be used. They may be used as separate light sources, or may be packed in one unit so as to be used as one light source.

Moreover, for example, a light source emitting blue light and a phosphor emitting yellow light under the excitation of the light may be packed in one unit so as to be used as one light source. Moreover, for example, a light source emitting blue light and a phosphor emitting green light and red light under the excitation of the light may be packed in one unit so as to be used as one light source.

Further, for example, a light source emitting blue light, a light source emitting green light and a phosphor emitting red light under the excitation of the light may be packed in one unit so as to be used as one light source. For example, a light source emitting blue light, a light source emitting red light and a phosphor emitting green light under the excitation of the light may be packed in one unit so as to be used as one light source.

Moreover, white light may be emitted from a backlight configured by using a light source emitting blue light, and forming a phosphor emitting yellow light under the excitation of the light which in a sheet shape and using the phosphor together with an optical sheet or the like. Further, for example, white light may be emitted from a backlight configured by using a light source emitting blue light, and forming a phosphor emitting yellow light under the excitation of the light in a sheet shape and using the phosphor together with an optical sheet or the like.

Moreover, for example, white light may be emitted from a backlight configured by using a light source emitting blue light and a light source emitting green light, and forming a phosphor emitting red light under the excitation of the light in a sheet shape and using the phosphor together with an optical sheet or the like. Further, for example, white light may be emitted from a backlight configured by using a light source emitting blue light and a light source emitting red light, and forming a phosphor emitting green light under the excitation of the light in a sheet shape and using the phosphor together with an optical sheet or the like.

In addition, light from the light source is not limited to visible light and may be nonvisible light, for example, infrared light or ultraviolet light.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A surface light source device comprising:
   a light guide plate including a light emission surface, a reflection surface and a pair of facing side surfaces;
   a first light source and a second light source arranged on the pair of side surfaces of the light guide plate;
   a plurality of first inclined surfaces arranged on one or both of the light emission surface and the reflection surface and facing the first light source; and
   a plurality of second inclined surfaces arranged on one or both of the light emission surface and the reflection surface and facing the second light source,
   wherein the heights of the first inclined surfaces gradually increase with increasing distance from the first light source, and the heights of the second inclined surfaces gradually increase with increasing distance from the second light source.

2. The surface light source device according to claim 1, wherein
   a first light guide control section configured of a plurality of concave sections or convex sections which each have the first inclined surface, and a second light guide control section configured of a plurality of concave sections or convex sections which each have the second inclined surface are arranged on one or both of the light emission surface and the reflection surface.

3. The surface light source device according to claim 2, wherein
   in the first light guide control section, each concave section or each convex section includes the first inclined surface and a third inclined surface facing the second light source and having a smaller inclined angle than that of the first inclined surface, and
   in the second light guide control section, each concave section or each convex section includes the second inclined surface and a fourth inclined surface facing the first light source and having a smaller inclined angle than that of the second inclined surface.

4. The surface light source device according to claim 2, wherein
   the concave sections or the convex sections of the first light guide control section are arranged at intervals which decrease with increasing distance from the first light source, and
   the concave sections or the convex sections of the second light guide control section are arranged at intervals which decrease with increasing distance from the second light source.

5. The surface light source device according to claim 3, wherein the concave sections or the convex sections of the first light guide control section are arranged at intervals which decrease with increasing distance from the first light source, and the concave sections or the convex sections of the second light guide control section are arranged at intervals which decrease with increasing distance from the second light source.

6. The surface light source device according to claim 3, wherein the first light guide control section includes a plurality of concave sections, and in each of the concave sections, the first inclined surface and the third inclined surface are arranged on a side closer to the first light source and a side closer to the second light source, respectively, and the second light guide control section includes a plurality of concave sections, and in each of the concave sections, the fourth inclined surface and the second inclined surface are arranged on the side closer to the first light source and the side closer to the second light source, respectively.

7. The surface light source device according to claim 3, wherein the first light guide control section includes a plurality of convex sections, and in each of the convex sections, the third inclined surface and the first inclined surface are arranged on a side closer to the first light source and a side closer to the second light source, respectively, and the second light guide control section includes a plurality of convex sections, and in each of the convex sections, the second inclined surface and the fourth inclined surface are arranged on the side closer to the first light source and the side closer to the second light source, respectively.

8. The surface light source device according to claim 1, wherein height differences between the first inclined surfaces and the light emission surface or the reflection surface are changed between the pair of side surfaces, and height differences between the second inclined surfaces and the light emission surface or the reflection surface are changed between the pair of side surfaces.

9. The surface light source device according to claim 1, wherein a plurality of the light guide plates are arranged in a direction orthogonal to the pair of side surfaces, and the first light source and the second light source are arranged on a pair of side surfaces of each of the light guide plates, respectively.

10. A surface light source device comprising:

a light guide plate including a light emission surface, a reflection surface and a pair of facing side surfaces;

a first light source and a second light source arranged on the pair of side surfaces of the light guide plate;

a plurality of first inclined surfaces arranged on one or both of the light emission surface and the reflection surface and facing the first light source; and a plurality of second inclined surfaces arranged on one or both of the light emission surface and the reflection surface and facing the second light source, wherein the first inclined surfaces are arranged more closely with increasing distance from the first light source, and the second inclined surface are arranged more closely with increasing distance from the second light source.

11. A surface light source device comprising:

a light guide plate unit including a pair of facing side surfaces and a light emission surface and configured by arranging a plurality of light guide sections; and light sources arranged on both of the pair of side surfaces of the light guide plate unit, wherein each of the light guide sections includes first and second side surfaces facing each other, has a shape in which the thickness thereof gradually decreases from the first side surface to the second side surface, and is configured so that a light emission amount increases with increasing distance from the first side surface, the light source is arranged on the first side surface of each of the light guide sections, and the plurality of light guide sections include a first light guide section configured by arranging the first side surface and the second side surface on one and the other of the side surfaces of the light guide plate unit, respectively, and a second light guide section configured by arranging the second side surface and the first side surface on the one side surface and the other side surface of the light guide plate unit, respectively.

12. The surface light source device according to claim 11, wherein a plurality of the first light guide sections and a plurality of the second light guide sections are alternately arranged.

13. The surface light source device according to claim 11, wherein the widths of the first and second side surfaces are equal to each other.

14. The surface light source device according to claim 11, wherein the width of the second side surface is larger than the width of the first side surface.

15. The surface light source device according to claim 11, wherein the first and second light guide sections are molded as one unit.

16. The surface light source device according to claim 11, wherein a groove is provided between the first and second light guide sections.

17. The surface light source device according to claim 11, wherein the first and second light guide sections are molded as separate parts.

18. A display including:

a surface light source device; and a display section displaying an image by modulating light from the surface light source device based on an image signal, the surface light source device comprising a light guide plate including a light emission surface, a reflection surface and a pair of facing side surfaces, a first light source and a second light source arranged on the pair of side surfaces of the light guide plate, a plurality of first inclined surfaces arranged on one or both of the light emission surface and the reflection surface and facing the first light source, and a plurality of second inclined surfaces arranged on one or both of the light emission surface and the reflection surface and facing the second light source, wherein the heights of the first inclined surfaces gradually increase with increasing distance from the first light source, and the heights of the second inclined surfaces gradually increase with increasing distance from the second light source.

19. A display including:
a surface light source device; and
a display section displaying an image by modulating light from the surface light source device based on an image signal,
the surface light source device comprising
  a light guide plate including a light emission surface, a reflection surface and a pair of facing side surfaces,
  a first light source and a second light source arranged on the pair of side surfaces of the light guide plate,
  a plurality of first inclined surfaces arranged on one or both of the light emission surface and the reflection surface and facing the first light source, and
  a plurality of second inclined surfaces arranged on one or both of the light emission surface and the reflection surface and facing the second light source,
wherein the first inclined surfaces are arranged more closely with increasing distance from the first light source, and the second inclined surface are arranged more closely with increasing distance from the second light source.

20. A display including:
a surface light source device; and
a display section displaying an image by modulating light from the surface light source device based on an image signal,
the surface light source device comprising
  a light guide plate unit including a pair of facing side surfaces and a light emission surface and configured by arranging a plurality of light guide sections, and
  light sources arranged on both of the pair of side surfaces of the light guide plate unit,
wherein each of the light guide sections includes first and second side surfaces facing each other, has a shape in which the thickness thereof gradually decreases from the first side surface to the second side surface, and is configured so that a light emission amount increases with increasing distance from the first side surface,
the light source is arranged on the first side surface of each of the light guide sections, and
the plurality of light guide sections include a first light guide section configured by arranging the first side surface and the second side surface on one and the other of the side surfaces of the light guide plate unit, respectively, and a second light guide section configured by arranging the second side surface and the first side surface on the one side surface and the other side surface of the light guide plate unit, respectively.

\* \* \* \* \*